(12) United States Patent
Kobashi

(10) Patent No.: US 8,788,936 B2
(45) Date of Patent: Jul. 22, 2014

(54) INFORMATION PROCESSING APPARATUS AND METHOD

(75) Inventor: Kazufumi Kobashi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 276 days.

(21) Appl. No.: 13/243,881

(22) Filed: Sep. 23, 2011

(65) Prior Publication Data

US 2012/0013636 A1 Jan. 19, 2012

Related U.S. Application Data

(63) Continuation of application No. 11/684,477, filed on Mar. 9, 2007, now Pat. No. 8,056,004.

(30) Foreign Application Priority Data

Apr. 3, 2006 (JP) .................................. 2006-102089

(51) Int. Cl.
*G06F 17/00* (2006.01)
*G06F 17/21* (2006.01)

(52) U.S. Cl.
CPC .................................... *G06F 17/211* (2013.01)
USPC .......................................................... 715/246

(58) Field of Classification Search
CPC ... G06F 17/211; G06F 17/212; G06F 17/245; G06F 17/3028
USPC ......... 715/255, 204, 243, 244, 246, 247, 253, 715/765, 766, 767
See application file for complete search history.

(56) References Cited

U.S. PATENT DOCUMENTS

| | | | | |
|---|---|---|---|---|
| 5,278,946 A | * | 1/1994 | Shimada et al. | 706/53 |
| 5,459,832 A | * | 10/1995 | Wolf et al. | 715/769 |
| 5,897,647 A | * | 4/1999 | Kadosawa et al. | 715/210 |
| 7,350,142 B2 | * | 3/2008 | Kraft et al. | 715/210 |
| 7,503,015 B2 | * | 3/2009 | Chen et al. | 715/863 |
| 7,865,623 B2 | * | 1/2011 | Mayle et al. | 709/250 |
| 8,127,218 B2 | * | 2/2012 | Nishimura et al. | 715/202 |
| 8,660,357 B2 | * | 2/2014 | Oi | 382/182 |
| 2005/0223333 A1 | * | 10/2005 | Yamamoto et al. | 715/765 |
| 2010/0058175 A1 | * | 3/2010 | Itami | 715/243 |

* cited by examiner

*Primary Examiner* — Laurie Ries
(74) *Attorney, Agent, or Firm* — Canon USA, Inc., I.P. Division

(57) ABSTRACT

For each of a plurality of drawing objects, whether the drawing object is laid out on the rear side of one or more other drawing objects is determined based on an overlapped state of the plurality of drawing objects. The drawing object to be selected is decided based on the determination result.

14 Claims, 53 Drawing Sheets

| NO | ATTRIBUTE INFORMATION | | REMARKS |
|---|---|---|---|
| 1 | SHEET SIZE | ORIGINAL SIZE/FIXED SIZE | · WHEN FIXED SIZE IS SELECTED, "SHEET CHANGE" IS AUTOMATICALLY DESIGNATED<br>· WHEN PLURAL SHEETS ARE SELECTED IN BOOK, SHEET SIZE CAN BE CHANGED AMONG DESIGNATED SHEETS; SHEET SIZE CAN ALSO BE CHANGED BY DESIGNATION FOR MATCHING WITH SHEET SIZE |
| 2 | SHEET ORIENTATION | PORTRAIT/LANDSCAPE | · SELECTABLE ONLY IN THE CASE OF FIXED SIZE |
| 3 | N-up PRINTING DESIGNATION | PAGE NUMBER/LAYOUT ORDER/ BOUNDARY LINE/ LAYOUT POSITION, ETC. | · 9 PATTERNS OF LAYOUT POSITIONS<br>· SAME-MAGNIFICATION PRINTING CAN BE DESIGNATED |
| 4 | SCALING-UP/DOWN | ON/OFF | · WHEN FIXED SIZE IS SELECTED AS SHEET SIZE OR WHEN N-up PRINTING IS SELECTED, ON/OFF CAN BE AUTOMATICALLY DESIGNATED |
| 5 | WATERMARK | DISPLAY/NOT-DISPLAY | · DESIGNATION ON WHETHER WATERMARKS DESIGNATED IN BOOK ARE ALL DISPLAYED |
| 6 | HEADER/FOOTER | DISPLAY/NOT-DISPLAY | · DESIGNATION ON WHETHER HEADERS/FOOTERS DESIGNATED IN BOOK ARE ALL DISPLAYED |
| 7 | SHEET EJECTION METHOD | STAPLING | · WHEN STAPLING IS DESIGNATED IN BOOK, IT CAN BE TURNED OFF; DEFAULT IS ON |

FIG. 4

| FIG. 4A |
|---|
| FIG. 4B |

FIG. 4A

| NO | ATTRIBUTE INFORMATION | | REMARKS |
|---|---|---|---|
| 1 | PRINTING METHOD | SIMPLEX/DUPLEX/ BOOKBINDING PRINTING | |
| 2 | SHEET SIZE | ORIGINAL SIZE/FIXED SIZE | · WHEN "A4 + A3", "B4 + B3", AND "LETTER + LEDGER (11 × 17)" ARE DESIGNATED, Z-FOLD IS DESIGNATED<br>· WHEN BOOKBINDING PRINTING OR N-up PRINTING IS DESIGNATED, ORIGINAL SIZE OF FIRST CHAPTER/FIRST PAGE IS AUTOMATICALLY SELECTED |
| 3 | SHEET ORIENTATION | PORTRAIT/LANDSCAPE | · SELECTABLE ONLY IN THE CASE OF FIXED SIZE |
| 4 | BINDING MARGIN/ BINDING ORIENTATION | | · SHIFT AND ENLARGEMENT/REDUCTION CAN BE DESIGNATED |
| 5 | N-up PRINTING | PAGE NUMBER/LAYOUT ORDER/ BOUNDARY LINE/ LAYOUT POSITION, ETC. | · 9 PATTERNS OF LAYOUT POSITIONS<br>· SAME-MAGNIFICATION PRINTING CAN BE DESIGNATED |
| 6 | SCALING-UP/DOWN | ON/OFF | · WHEN FIXED SIZE IS SELECTED AS SHEET SIZE OR WHEN N-up PRINTING IS SELECTED, ON/OFF CAN BE AUTOMATICALLY DESIGNATED |
| 7 | WATERMARK | | · WATERMARK CAN BE INDIVIDUALLY DESIGNATED IN UNITS OF LOGICAL PAGE OR PHYSICAL PAGE<br>· ALL CHAPTERS/ALL PAGES ARE COVERED |

FROM FIG. 4A

| | | | |
|---|---|---|---|
| 8 | HEADER/FOOTER | | · HEADER/FOOTER CAN BE INDIVIDUALLY DESIGNATED IN UNITS OF LOGICAL PAGE OR PHYSICAL PAGE<br>· ALL CHAPTERS/ALL PAGES ARE COVERED |
| 9 | SHEET EJECTION METHOD | STAPLING/PUNCHING | · STAPLING/PUNCHING CAN BE DESIGNATED ONLY IN SIMPLEX/DUPLEX PRINTING<br>· STAPLING IS DESIGNATED AT ONE/TWO POSITIONS |
| 10 | DETAILS OF BOOKBINDING | SPREADING DIRECTION/ SADDLE STITCH/DESIGNATION OF ENLARGEMENT AND REDUCTION/ BINDING MARGIN/DESIGNATION OF SEPARATE BINDING, ETC. | · ONLY IN BOOKBINDING PRINTING |
| 11 | COVER/BACK COVER | | · DESIGNATION OF PRINTING ON 1/2 OF COVER AND 1/2 OF BACK COVER<br>· DESIGNATION OF SHEET FEED PORT (INCLUDING INSERTER) |
| 12 | INDEX SHEET | | · PRINTING OF CHARACTER STRING ON INDEX PORTION AND ANNOTATION ON INDEX SHEET CAN BE SET<br>· INDEX SHEET CANNOT BE DESIGNATED IN BOOKBINDING PRINTING |
| 13 | SLIP SHEET | | · DESIGNATION OF SHEET FEED PORT (INCLUDING INSERTER)<br>· ORIGINAL DATA CAN BE PRINTED ON INSERTED SHEET<br>· INDEX SHEET CANNOT BE DESIGNATED IN BOOKBINDING PRINTING |
| 14 | CHAPTER BREAK | "NONE"/"PAGE CHANGE"/ "SHEET CHANGE" | · "SHEET CHANGE" IS FIXEDLY SET WHEN INDEX SHEET AND SLIP SHEET ARE DESIGNATED<br>· "SHEET CHANGE" IS SET IN SIMPLEX PRINTING |

FIG. 5

| NO | ATTRIBUTE INFORMATION | | REMARKS |
|---|---|---|---|
| 1 | SHEET SIZE | ORIGINAL SIZE/FIXED SIZE | · WHEN FIXED SIZE IS SELECTED, "SHEET CHANGE" IS AUTOMATICALLY DESIGNATED<br>· WHEN PLURAL SHEETS ARE SELECTED IN BOOK, SHEET SIZE CAN BE CHANGED AMONG DESIGNATED SHEETS; SHEET SIZE CAN ALSO BE CHANGED BY DESIGNATION FOR MATCHING WITH SHEET SIZE |
| 2 | SHEET ORIENTATION | PORTRAIT/LANDSCAPE | · SELECTABLE ONLY IN THE CASE OF FIXED SIZE |
| 3 | N-up PRINTING DESIGNATION | PAGE NUMBER/LAYOUT ORDER/ BOUNDARY LINE/ LAYOUT POSITION, ETC. | · 9 PATTERNS OF LAYOUT POSITIONS<br>· SAME-MAGNIFICATION PRINTING CAN BE DESIGNATED |
| 4 | SCALING-UP/DOWN | ON/OFF | · WHEN FIXED SIZE IS SELECTED AS SHEET SIZE OR WHEN N-up PRINTING IS SELECTED, ON/OFF CAN BE AUTOMATICALLY DESIGNATED |
| 5 | WATERMARK | DISPLAY/NOT-DISPLAY | · DESIGNATION ON WHETHER WATERMARKS DESIGNATED IN BOOK ARE ALL DISPLAYED |
| 6 | HEADER/FOOTER | DISPLAY/NOT-DISPLAY | · DESIGNATION ON WHETHER HEADERS/FOOTERS DESIGNATED IN BOOK ARE ALL DISPLAYED |
| 7 | SHEET EJECTION METHOD | STAPLING | · WHEN STAPLING IS DESIGNATED IN BOOK, IT CAN BE TURNED OFF; DEFAULT IS ON |

FIG. 6

| NO | ATTRIBUTE INFORMATION | | REMARKS |
|---|---|---|---|
| 1 | PAGE ROTATION DESIGNATION | | · 0/90/180/270 DEGREES CAN BE DESIGNATED |
| 2 | WATERMARK | DISPLAY/NOT-DISPLAY | · DESIGNATION ON WHETHER WATERMARKS DESIGNATED IN BOOK ARE ALL DISPLAYED |
| 3 | HEADER/FOOTER | DISPLAY/NOT-DISPLAY | · DESIGNATION ON WHETHER HEADERS/FOOTERS DESIGNATED IN BOOK ARE ALL DISPLAYED |
| 4 | ZOOM | 50% – 200% | · RELATIVE ZOOM FACTOR IS DESIGNATED WITH SIZE FIT TO VIRTUAL LOGICAL PAGE AREA BEING 100% |
| 5 | LAYOUT POSITION | | · DESIGNATION OF FIXED 9 PATTERNS AND OPTIONAL POSITION |
| 6 | ANNOTATION | | |
| 7 | VARIABLE ITEM | | |
| 8 | PAGE DIVISION | | |

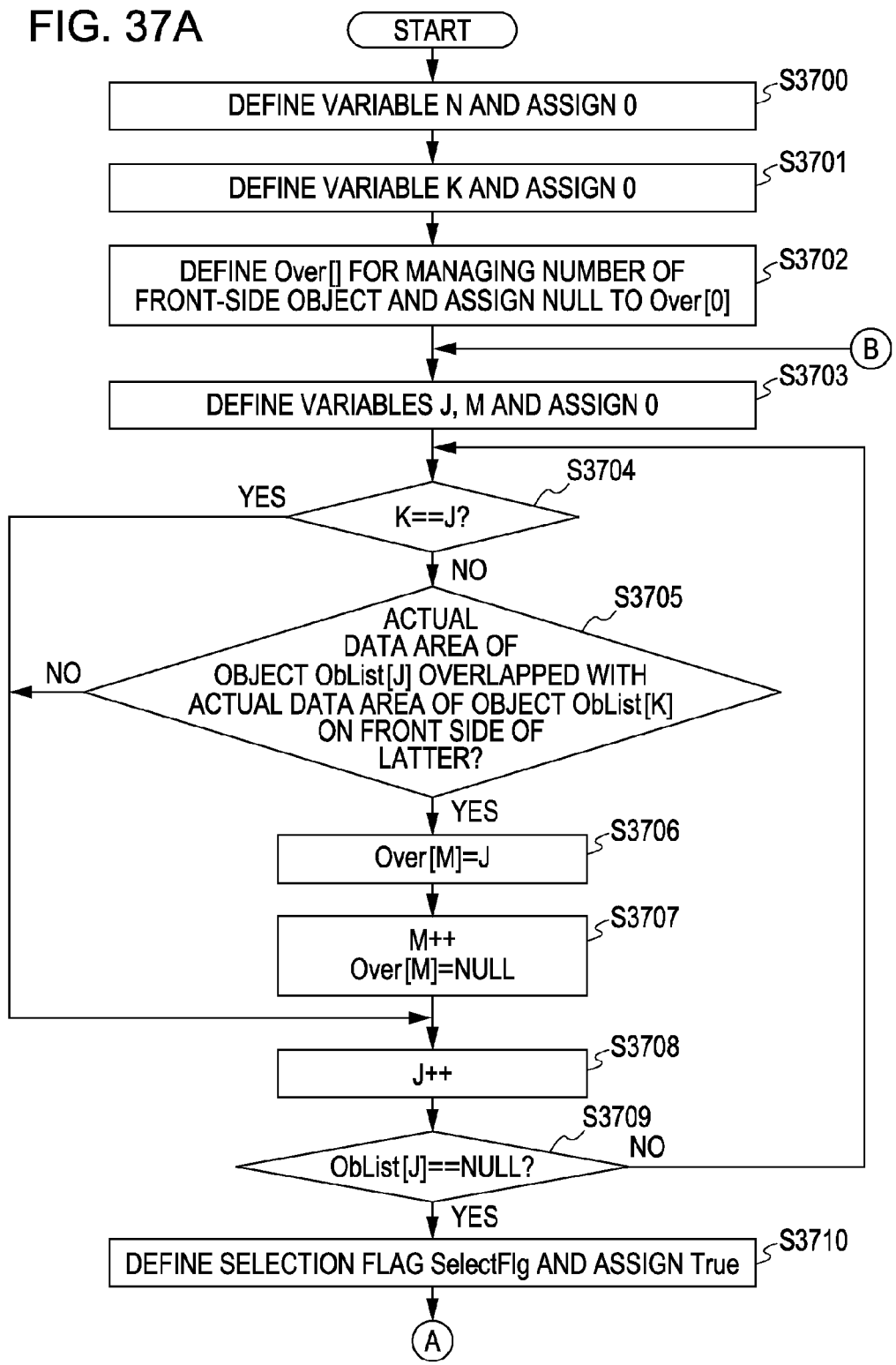

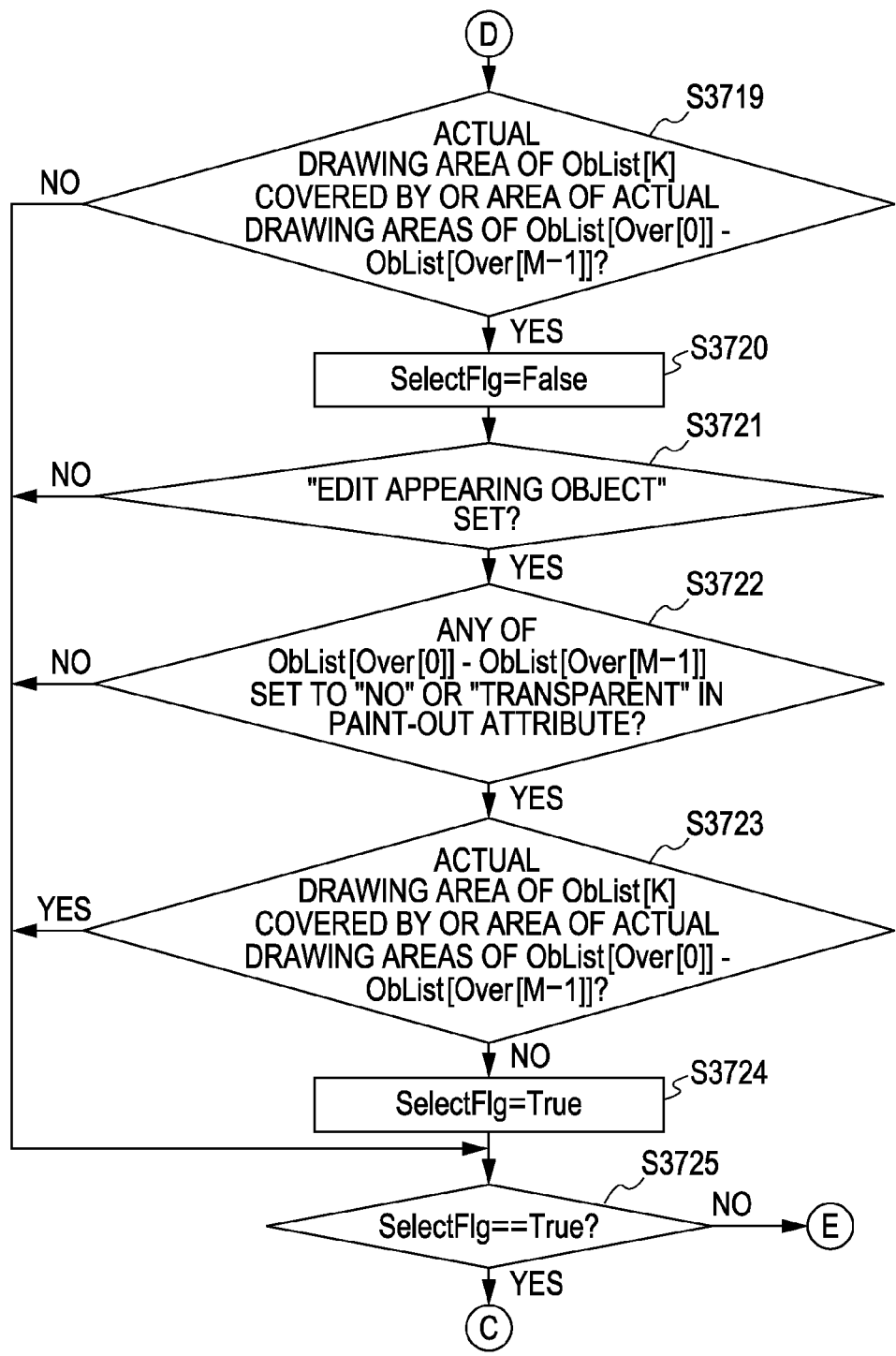

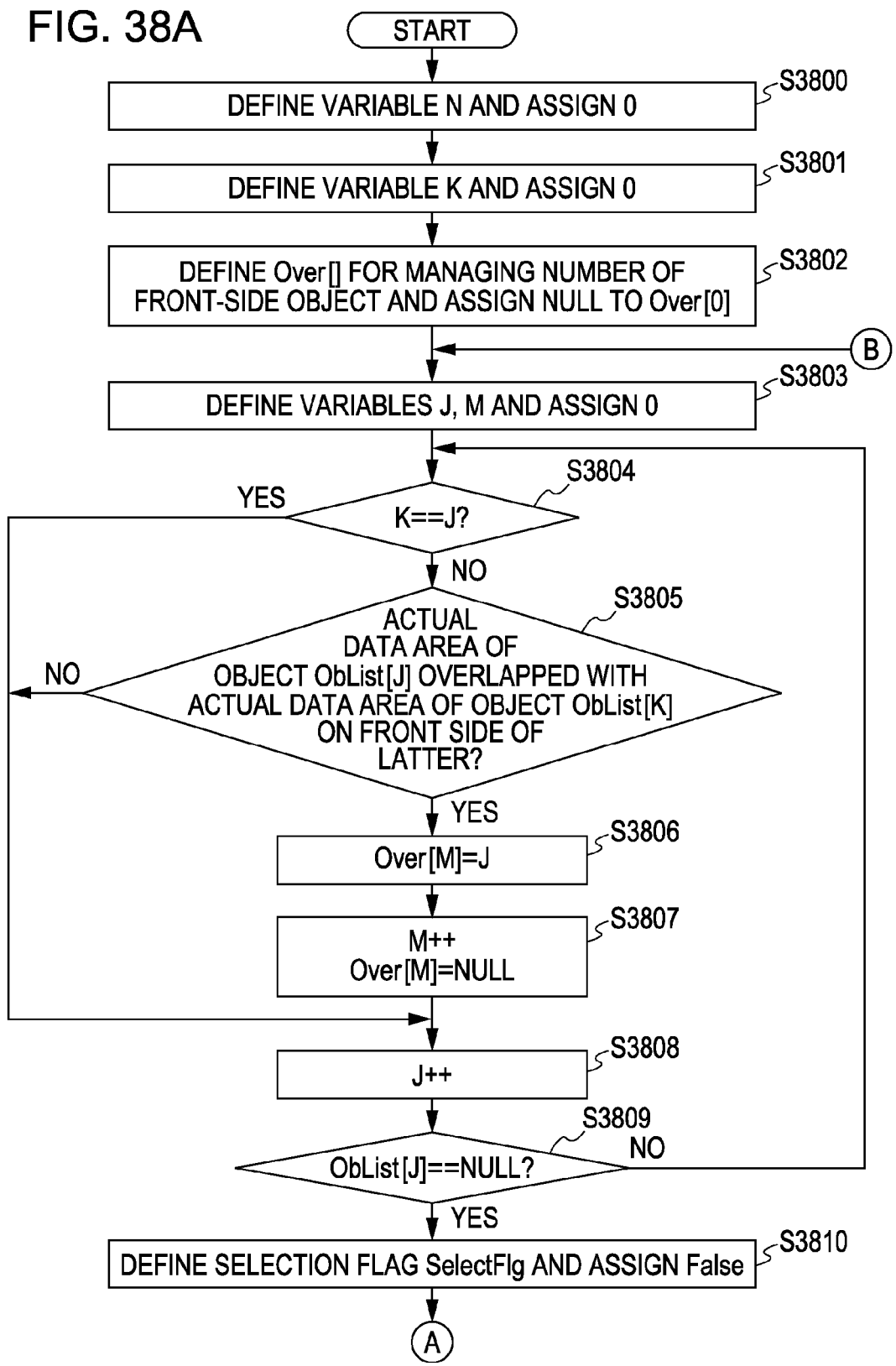

FIG. 44

| | ACTUAL DRAWING AREA | ACTUAL DATA AREA | DISPLAY ATTRIBUTE | ORDER OF FORMATION |
|---|---|---|---|---|
| OBJECT 4006 | (17, 13), (17, 27), (33, 27), (33, 13) | (17, 13), (17, 27), (33, 27), (33, 13) | TRANSPARENT | 1 |
| OBJECT 4007 | (15, 30), (14, 10), (15, 25) | (15, 30), (13, 40), (22, 15), (14, 10) | NO PRINT-OUT | 2 |
| OBJECT 4009 | (3, 7), (3, 33), (40, 33), (40, 7) | (3, 7), (3, 33), (40, 33), (40, 7) | TRANSPARENT | 3 |

INFORMATION PROCESSING APPARATUS AND METHOD

CROSS REFERENCE OF RELATED APPLICATIONS

This application is a continuation of U.S. patent application Ser. No. 11/684,477 filed Mar. 9, 2007 which claims the benefit of Japanese Application No. 2006-102089 filed Apr. 3, 2006, which is hereby incorporated by reference herein in its entirety.

BACKGROUND OF THE INVENTION

1. Field of the Invention

The present invention relates to an information processing apparatus such as a personal computer, and more particularly to an information processing apparatus capable of editing electronic data.

2. Description of the Related Art

Hitherto, there has been generally known a process of reading a document in the form of paper by a scanner and outputting read image data to a printer, while adding a retouch instruction and treatment instructions such as duplex printing, stapling, punching, etc.

It has also been generally known to convert document data prepared using an application stored in an information processing apparatus to electronic data that does not depend on the application used for preparing the data, and to output the electronic data to a printer while adding treatment instructions such as duplex printing, stapling, punching, etc.

Further, a technique of taking in plural groups of document data prepared using plural kinds of application software, and converting the document data to electronic data that does not depend on the applications used for preparing the data has been generally known. The electronic data includes a plurality of drawing objects, and a user can make editing, such as deletion, on the desired drawing object.

In execution of the editing, a plurality of drawing objects are often edited together to increase efficiency of the editing operation. With one generally known technique, when the user designates a selection range by using an input unit, e.g., a mouse, a plurality of drawing objects included in the selection range are all selected. Then, when the user executes a desired editing process while holding the selected state, a plurality of drawing objects can be edited together.

In editing a plurality of drawing objects, it is also generally known to change the order in which the drawing object are overlapped with each other. Such an editing process is generally executed by a method of selecting an object which is to be changed in the overlapping order, and moving the selected object to the front side or the rear side of the other object(s). The "move-to-forefront side" function of moving the selected object to the forefront side and the "move-to-rearmost side" function of moving the selected object to the rearmost side are further generally known.

When objects are overlapped with each other and an object on the rear side is completely hidden, the user cannot see the rear-side object on a screen image displayed. A technique for efficiently editing the objects in such a state is disclosed in Japanese Patent Laid-Open No. 08-272993. According to an information processing apparatus disclosed in Japanese Patent Laid-Open No. 08-272993, in the state of objects overlapping one another, when the user clicks a mouse at a position where the hidden drawing object exists, the hidden object is selected and displayed on the forefront side.

With the information processing apparatus disclosed in Japanese Patent Laid-Open No. 08-272993, however, there is a risk that when many objects are overlapped, an object not demanded by the user may be selected and displayed on the forefront side.

One example of problems caused in editing a plurality of drawing objects together will be described below with reference to FIG. 33. FIG. 33 shows a state where groups of table objects in the table format overlap. Each table object group appears as one object on a preview of a general application. In fact, however, the table object group is formed by a plurality of drawing objects, such as rectangle objects 3302 and text objects 3303. In other words, when a general application is used to output an object which is not expressed with a drawing function, such as a table, to a printer driver, etc., an assembly of plural drawing objects is output.

Japanese Patent Laid-Open No. 2003-91518 discloses a system similar to that shown FIG. 1 attached herewith. With the description in that publication, a general application selects an electronic original (document) writer as an output destination, and drawing data prepared by the general application is output to a bookbinding application via the electronic original writer. Also in the disclosed system, for an object which is not expressed with a drawing function, the general application outputs an assembly of plural drawing objects. Therefore, the electronic original writer converts individual drawing objects, which constitute the assembly of drawing objects, to data for the bookbinding application, and outputs the converted data to the bookbinding application. Accordingly, when the bookbinding application edits the bookbinding application-adapted data prepared by the electronic original writer, it has to edit the drawing objects individually as shown in FIG. 33. On that occasion, one solution for efficiently executing the editing operation is to select the table object group intended by the user and to edit them together.

When the user selects and edits a table object group 3300, the user designates a selection range 3305 including the entirety of the table object group 3300. Rectangle objects and text objects in the table object group 3300 surrounded by the selection range 3305 are put into a selected state and selection handles are displayed. By executing the editing while holding that selected state, the editing is reflected on the rectangle objects and the text objects in the selected state. Because of the rectangle objects and the text objects in the selected state being all edited, when a "move" process is executed as one example of the editing, the editing result is obtained as indicated by 3307 and 3308. More specifically, the selection range 3305 designated by the user further includes rectangle objects and text objects forming a table object group 3301 which is not intended as a selection target by the user. This means that some rectangle objects and text objects not intended by the user are also put into the selected state as indicated by 3306. As a result of the "move" process, therefore, the rectangle objects and the text objects not intended by the user are also moved together. This causes a drawback that, when a desired drawing object is selected in the state of plural drawing object groups overlapping each other, the user is required to carefully select the desired drawing object in consideration of other drawing objects on the rear side, which are not visually recognized on a screen image displayed. This can make such operations difficult or time consuming.

SUMMARY OF THE INVENTION

The present invention addresses the above-described problems in the related art and provides a technique for enabling a user to easily select a desired drawing object even if plural drawing objects overlap each other.

To realize such a technique, the present invention is constituted as follows.

An information processing apparatus capable of executing editing on a plurality of drawing objects includes a designating unit configured to designate a selection range, a determining unit configured to determine, for each of drawing objects included in the selection range designated by the designating unit, whether the drawing object is laid out on a rear side of one or more other drawing objects, based on an overlapped state of the drawing objects, and a deciding unit configured to decide, as a selection target, the drawing object which is determined as being laid out on a front side of one or more other drawing objects by the determining unit, without setting, as the selection target, the drawing object which is determined as being laid out on the rear side of the other drawing objects by the determining unit.

Further features of the present invention will become apparent from the following description of exemplary embodiments with reference to the attached drawings.

BRIEF DESCRIPTION OF THE DRAWINGS

FIGS. 4A and 4B is a table showing a list of book attributes.

FIG. 5 is a table showing a list of chapter attributes.

FIG. 6 is a table showing a list of page attributes.

FIGS. 37A-37D are flowcharts executed with an overlapped state detecting procedure in a "front-side object selection mode" in the present invention.

FIGS. 38A-38D are flowcharts executed with the overlapped state detecting procedure in a "rear-side object selection mode" in the present invention.

FIG. 44 is a table showing one example of object information in the present invention.

DESCRIPTION OF THE EMBODIMENTS

Embodiments of the present invention will be described in detail below with reference to the drawings.

[Outline of System]

First, an outline of a document processing system according to the present invention will be described below with reference to FIGS. 1-12. The document processing system includes an electronic original (document) writer for converting a data file prepared by a general application to an electronic original file, and a bookbinding application for providing the function of editing the electronic original file. With the bookbinding application, a document containing plural groups of prepared data collected together can be formed and edited, and operability can be improved to increase efficiency of the document editing.

[System Configuration and Operation]

Figure 1:
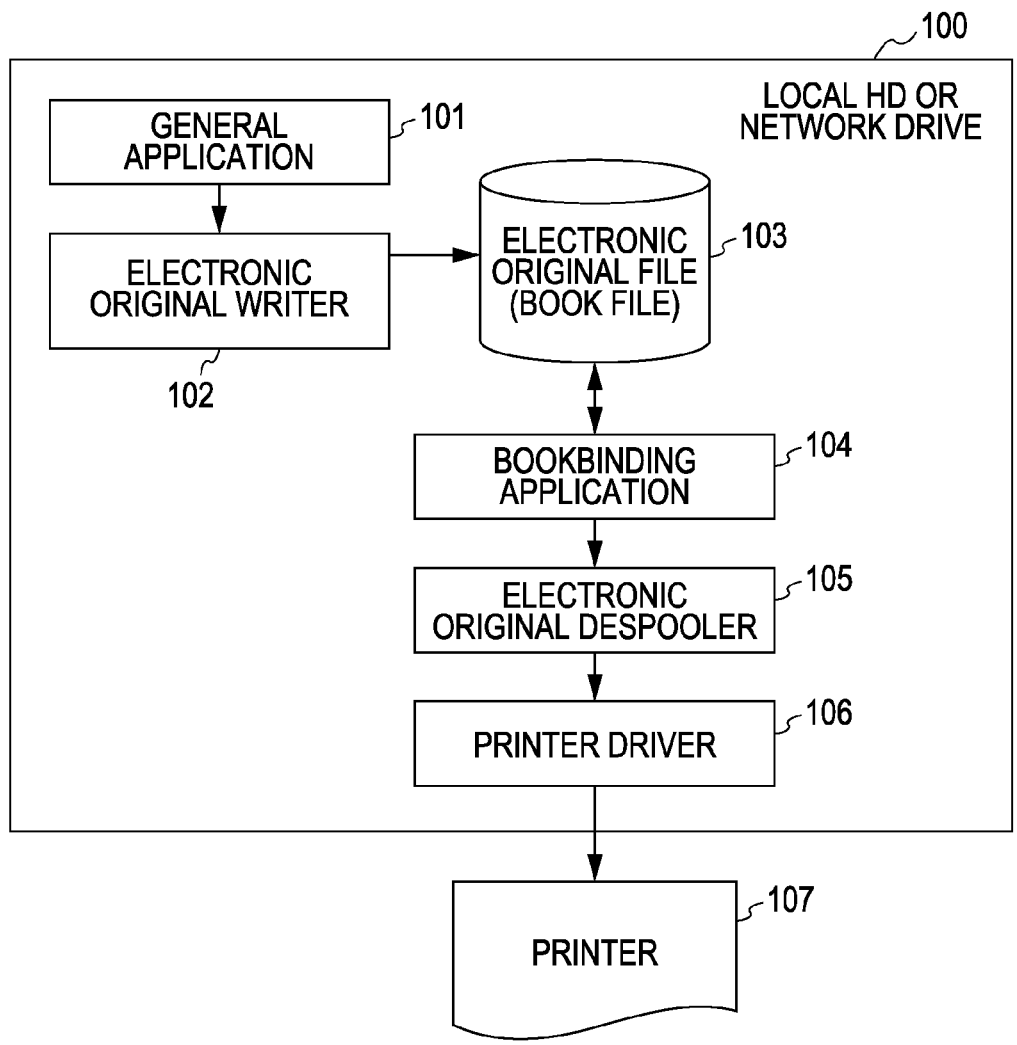
FIG. 1 is a block diagram showing an example of software configuration of a standalone document processing system in a basic mode.

FIG. 1 shows an example of the software configuration of a document processing system in a basic mode. The document processing system is constituted by a digital computer 100 (hereinafter referred to also as a "host computer") which is one suitable form in which an information processing apparatus of the present invention is realized. A general application 101, shown in FIG. 1, is an application program providing not only various functions of word processing, spread sheet, photo retouch, draw or paint, presentation, text editing, etc., but also the print function adapted for an operating system (OS). When application data (drawing data), such as prepared document data and image data, are printed, the application program utilizes a predetermined interface (generally called GDI (Graphic Device Interface)) which is provided by the OS. In other words, to print the prepared drawing data, the general application 101 transmits an output command (called the GDI function) in a format depending on the interface. An output module receiving the output command converts the output command to a format capable of being processed by a printer driver and outputs a converted command (called a DDI (Device Driver Interface) function). Because the format capable of being processed by an output device differs depending on various device types and individual makers, a device driver is provided per device. The device driver converts the output command (e.g., the DDI function) to generate print data interpretable by the printer, and brings the print data into one lot by using JL (Job Language), thus generating a print job. When Windows by Microsoft Co. is used as the OS, a GDI module corresponds to the above-mentioned output module.

An electronic original writer 102 is an improved version of the above-mentioned device driver and is a software module provided to realize the document processing system. However, the electronic original writer 102 is not intended for a particular output device, and it converts the output command to the format capable of being processed by a bookbinding application 104 and a printer driver 106 which will be described in detail later. The format (hereinafter referred to as the "electronic original format") after the conversion by the electronic original writer 102 is just required to be able to express an original per page in detailed format. The electronic original format may be provided by, e.g., the PDF format or the SVG format, available from Adobe Systems Inc., among practical standard formats.

When the general application 101 utilizes the electronic original writer 102, printing is executed after designating the electronic original writer 102 as the device driver used for outputting. However, an electronic original file prepared by the electronic original writer 102 has not a complete format required as the electronic original file. For that reason, the bookbinding application 104 designates the electronic original writer 102 as the device driver, and conversion of application data to the electronic original file is executed under management of the bookbinding application 104. The electronic original file generated by the electronic original writer 102 is completed by the bookbinding application 104 into an electronic original file having a later-described format. In the following description, when such a difference has to be clearly distinguished, a file prepared by the electronic original writer 102 is called an "electronic original file", and an electronic original file prepared by the bookbinding application 104 to have a specific structure is called a "book file". Also, when there is no need of distinguishing the difference, a document file, an electronic original file, and a book file prepared by the application are all called a "document file (document data)".

As described above, the bookbinding application 104 designates the electronic original writer 102 as the device driver and causes the general application 101 to print data. Thus, the application data is converted to an electronic original format per page (hereinafter referred to also as "logical page or original page") defined by the general application 101, and is stored as an electronic original file (book file) 103 in a storage medium, e.g., a hard disk. The hard disk may be a local drive incorporated in a computer for implementing the document processing system in the basic mode. When the document processing system is connected to a network, the hard disk may be a drive available on the network.

The bookbinding application 104 gives the user the function of reading the electronic original file (or the book file) 103 and editing it. However, the bookbinding application 104 does not provide the function of editing the contents of each page, and it provides the function of editing structures of a chapter and a book, described later, which are constituted with a page being a minimum unit.

When the book file 103 edited by the bookbinding application 104 is printed, an electronic original despooler 105 is started up by the bookbinding application 104. The electronic original despooler 105 is a program module which is installed in the computer along with the bookbinding application 104 and is used to output drawing data to the printer driver when a document (book file) prepared by the bookbinding application 104 is printed. To print each page in the format described in the book file, the electronic original despooler 105 reads the designated book file from the hard disk, generates an output command adapted for an output module (not shown) of the OS, and outputs the output command to the output module. At that time, the printer driver 106 for a printer 107 used as the output device is designated as the device driver. The above-mentioned output module converts the received output command to a device command and outputs the device command to the printer driver 106 for the printer 107. The printer driver 106 converts the device command to a command described in the page description language, for example, which is interpretable by the printer 107. The converted command is transmitted from the printer driver 106 to the printer 107 via a system spooler (not shown), and an image corresponding to the command is printed by the printer 107.

Figure 2:
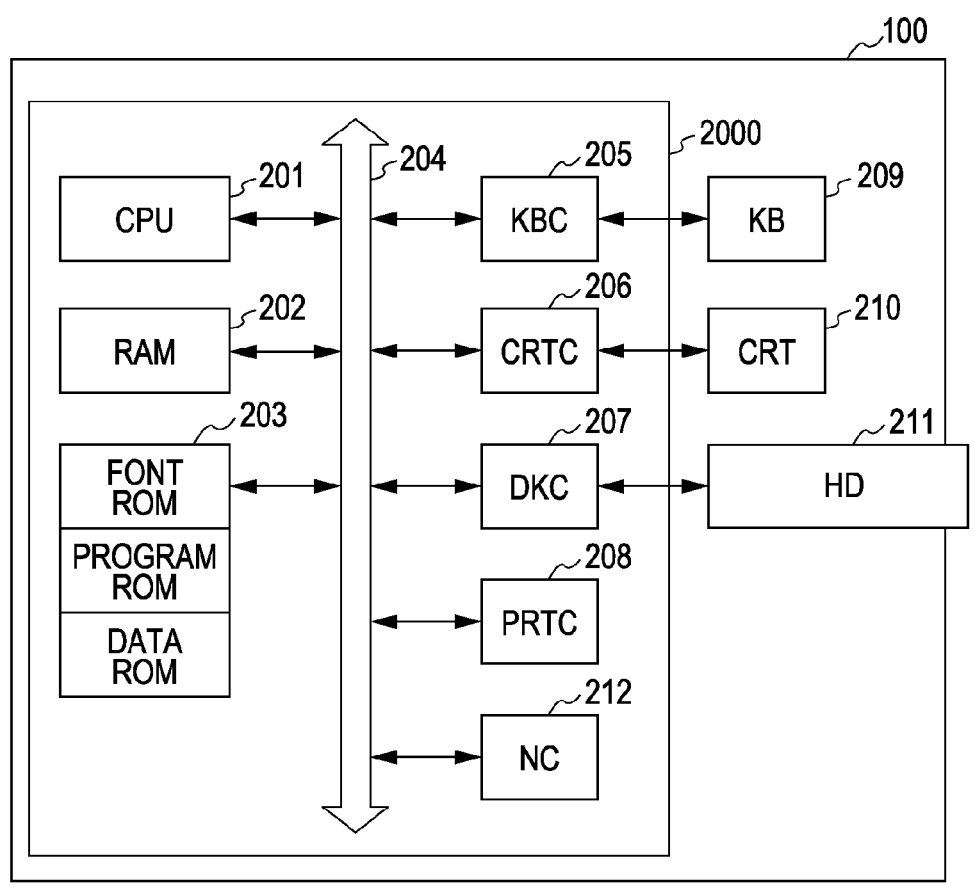
FIG. 2 is a block diagram showing an example of hardware configuration for realizing the document processing system in the basic mode.

FIG. 2 is a hardware block diagram of the computer 100. In FIG. 2, a CPU 201 executes programs, such as the OS and applications, which are stored in a program ROM of a ROM 203 or are loaded in a RAM 202 from a hard disk 211.

The RAM 202 serves as, e.g., a main memory and a work area for the CPU 201. A keyboard controller (KBC) 205 controls key inputs from a keyboard 209 and a pointing device (not shown). A CRT controller (CRTC) 206 controls the display operation of a CRT display 210. A disk controller (DKC) 207 controls access to the hard disk (HD) 211, a Floppy (registered trade name) disk (FD), etc., which store a boot program, various applications, font data, an editing file (described later), etc. A printer controller (PRTC) 208 controls exchange of signals between the computer 100 and the printer 107 connected to the computer 100. A network controller (NC) 212 is connected to a network and executes a communication control process with respect to other equipment connected to the network.

[Format of Electronic Original Data]

Prior to describing the bookbinding application 104 in detail, the data format of the book file is described. The book file has a three-layered structure analogous to a book using a paper medium. An upper layer is called a "book" which imitates one book and defines overall attributes of the book. An intermediate layer under the upper layer corresponds to a chapter in a book and is called a "chapter". Chapter attributes can also be defined per chapter. A lower layer is called a "page" and corresponds to each page defined in the application program. Page attributes can also be defined per page. Further, one book may include a plurality of chapters and one chapter may include a plurality of pages.

Figure 3A:
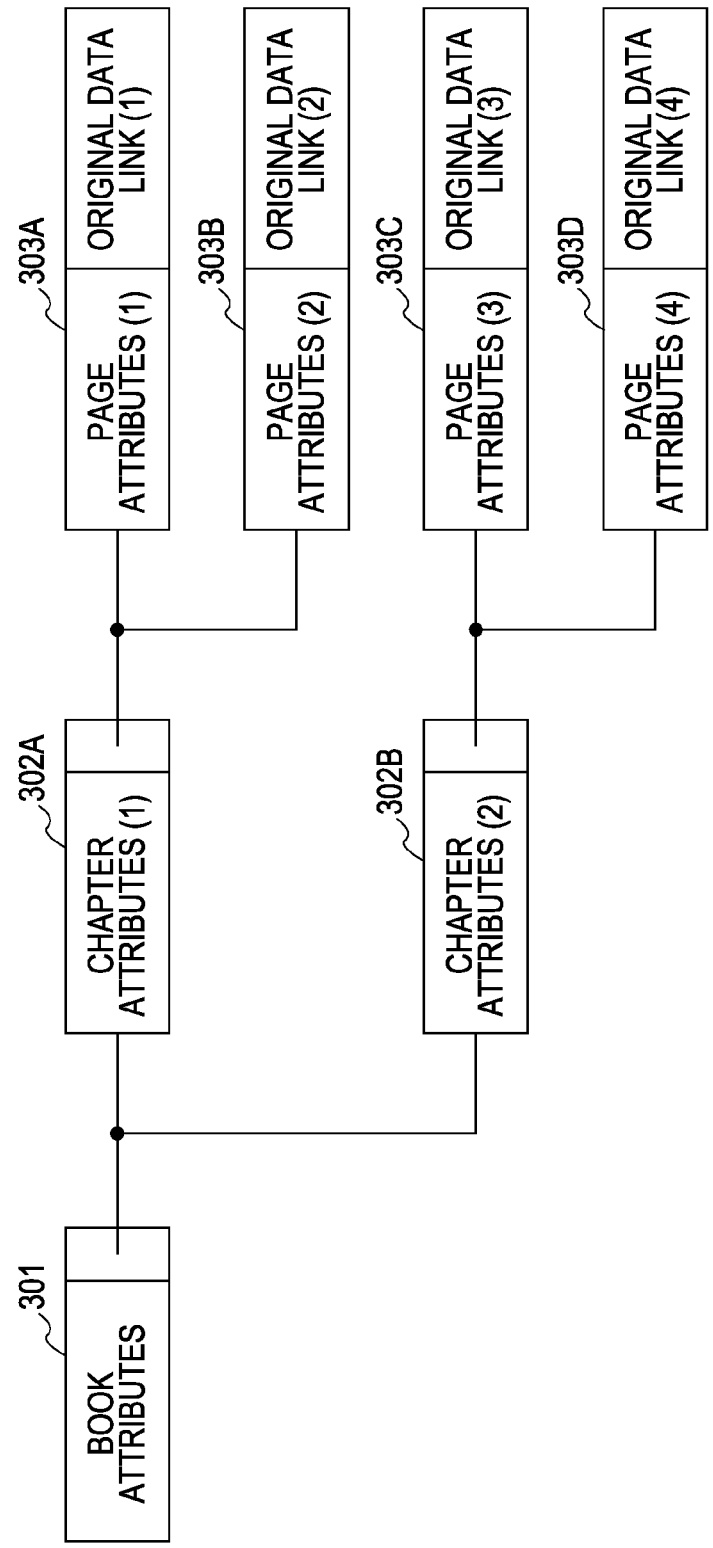
FIGS. 3A and 3B show one example a book file structure.

FIG. 3A schematically shows one example of the book file format. In this example, as shown, a book, a chapter, and a page in the book file are indicated by respective corresponding nodes. One book file includes one book. Because the book and the chapter are concepts for defining the structure as a book, the book and the chapter each contain, as substantial contents, defined attribute values and a link to the lower-level layer. The page contains, as substantial contents, the data output by the application program per page. Therefore, the page contains not only attribute values, but also substantial contents of the original data (original page data) and a link to the original page data.

In some cases, one print page output on a paper medium, for example, includes a plurality of original pages. Such a structure is not indicated by a link, but it is indicated as attributes in each layer of the book, the chapter and the page.

Figure 3B:
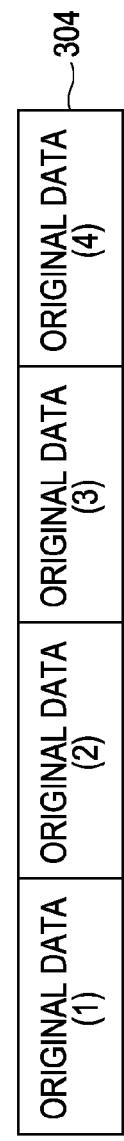

In FIG. 3, a book 301 includes definition of book attributes and is linked to two chapters 302A and 302B. These links indicate that the chapters 302A and 302B are included in the book 301. The chapter 302A is linked to pages 303A and 303B, thus indicating that the pages 303A and 303B are included in the chapter 302A. The pages 303A and 303B include definitions of respective attribute values and also include links to respective original page data (1) and (2), i.e., substantial contents thereof. As shown in FIG. 3B, those links indicate respectively data (1) and (2) in original page data 304, thus representing that the substantial contents of the pages 303A and 303B are respectively the original page data (1) and (2).

FIGS. 4A and 4B show a list of the book attributes. For an item which can be defined in an overlapping relation to an item in the lower-level layer, its attribute value in the lower-level layer is employed with priority. More specifically, for an item included only in the book attributes, therefore, a value defined in the book attributes becomes a value effective over the entire book. On the other hand, for an item in an overlapping relation to an item in the lower-level layer, its value serves as a default value when that item is not defined in the lower-level layer. Note that each item shown in FIGS. 4A and 4B is not always in correspondence to one item and it may include a plurality of related items.

FIG. 5 shows a list of chapter attributes, and FIG. 6 shows a list of page attributes. The relationship between the chapter attributes and the page attributes is similar to that between the book attributes and the attributes in the lower-level layer.

As seen from FIGS. 4-6, the book attributes include six specific items, i.e., printing method, details of bookbinding, cover/back cover, index sheet, inserted sheet, and chapter break. These items are defined throughout the book. As attributes of the printing method, three values indicating simplex printing, duplex printing, bookbinding printing can be designated. The term "bookbinding printing" means a method of printing data in a form enabling the bookbinding to be performed such that sheets in number designated separately are folded double in a bundle and the bundle of sheets are bound together. As attributes of the details-of-bookbinding, the spreading direction, the number of sheets put into a bundle, etc. can be designated when the bookbinding printing is designated.

The cover/back cover attribute includes designation of adding sheets which are used as a cover and a back cover, and designation of contents printed on the added sheets, when an electronic original file to be bound to a book is printed. The index sheet attribute includes designation of insertion of an eared index sheet for a chapter break, which is separately prepared in the printer, and designation of contents printed on an index (ear) portion. This index sheet attribute is made effective when an inserter with the insert function of inserting a sheet prepared separately from print sheets to a desired position is included in the printer used, or when a plurality of sheet feed cassettes can be used. Such a point is similarly applied to the inserted sheet attribute.

The inserted sheet attribute includes, for example, designation of insertion of a sheet for a chapter break, which is fed from the inserter or the sheet feed cassette, and designation of a sheet feed source when the inserted sheet is inserted.

The chapter break attribute includes, for example, designation of using a new sheet, or using a new print page, or instructing nothing. In simplex printing, the use of a new sheet and the use of a new print page have the same meaning. In duplex printing, designation of "use of a new sheet" means that successive chapters are not printed on one sheet, while designation of "use of a new print page" means that successive chapters are possibly printed on the front side and the rear side of one sheet.

The chapter attributes have no items specific to the chapter and are all overlapped with the book attributes. Accordingly, if the definition in the chapter attributes differs from the definition in the book attributes, values defined in the chapter attributes have priority. There are five items common to only both the book attributes and the chapter attributes, i.e., sheet size, sheet orientation, N-up printing designation, scaling-up/down, and sheet ejection method. Among them, the attribute of N-up printing designation represents an item to designate the number of original pages included in one print page. Examples of layout capable of being designated include 1×1, 1×2, 2×2, 3×3, and 4×4. The attribute of sheet ejection method represents an item of designating whether ejected sheets are stapled. Effectiveness of the attribute of sheet ejection method depends on whether the printer used has the stapling function.

Items specific to the page attributes include page rotation designation, zoom, layout designation, annotation, page division, etc. The page rotation attribute represents an item of designating a rotational angle set when an original page is arranged on a print page. The zoom attribute represents an item of designating a zoom factor of the original page. The zoom factor is designated on an assumption that the size of a virtual logical page area is 100%. The term "virtual logical page area" means an area occupied by one original page when original pages are arranged in accordance with the designation of, e.g., N-up printing. For example, in the case of 1×1, the virtual logical page area is an area corresponding to one print (physical) page. In the case of 1×2, the virtual logical page area is an area having each side reduced to about 70% of the corresponding side of one print (physical) page.

Attributes common to all of the book, the chapter and the page include a watermark attribute and a header/footer attribute. The term "watermark" means an image, a character string, or the like which is separately designated and is printed in an overlying relation to the data prepared by the application. The term "header/footer" means a watermark printed in an upper and/or lower margin of each page. The header/footer attribute includes an item that can be designated as a variable, e.g., a page number and date. The contents capable of being designated in the watermark attribute and the header/footer attribute are common to the chapter and the page except for the book. In the book, it is possible to set the contents of the watermark and the header/footer, and to designate what watermark and/or header/footer is to be printed throughout the book. On the other hand, the chapter and the page can designate whether the watermark and/or the header/footer set in the book is printed in the relevant chapter and page.

[Procedures for Generating Book File]

The book file has the structure and the contents described above. The procedures for generating the book file by the bookbinding application 104 and the electronic original writer 102 will be described below. The procedures for generating the book file is realized as a part of the book file editing operation of the bookbinding application 104.

Figure 7:
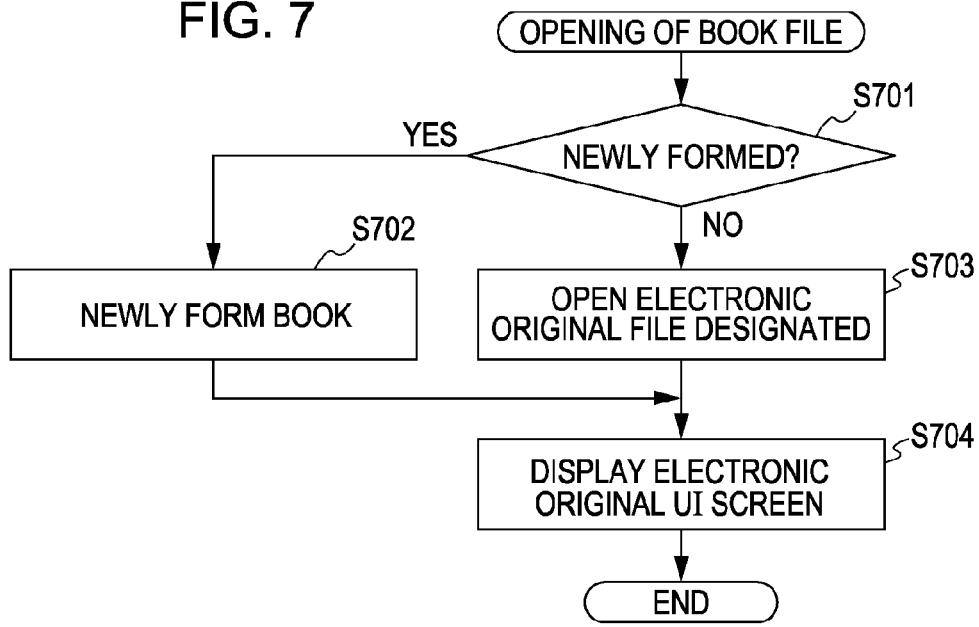
FIG. 7 is a flowchart showing an example of procedures for opening a book file.
Figure 11:
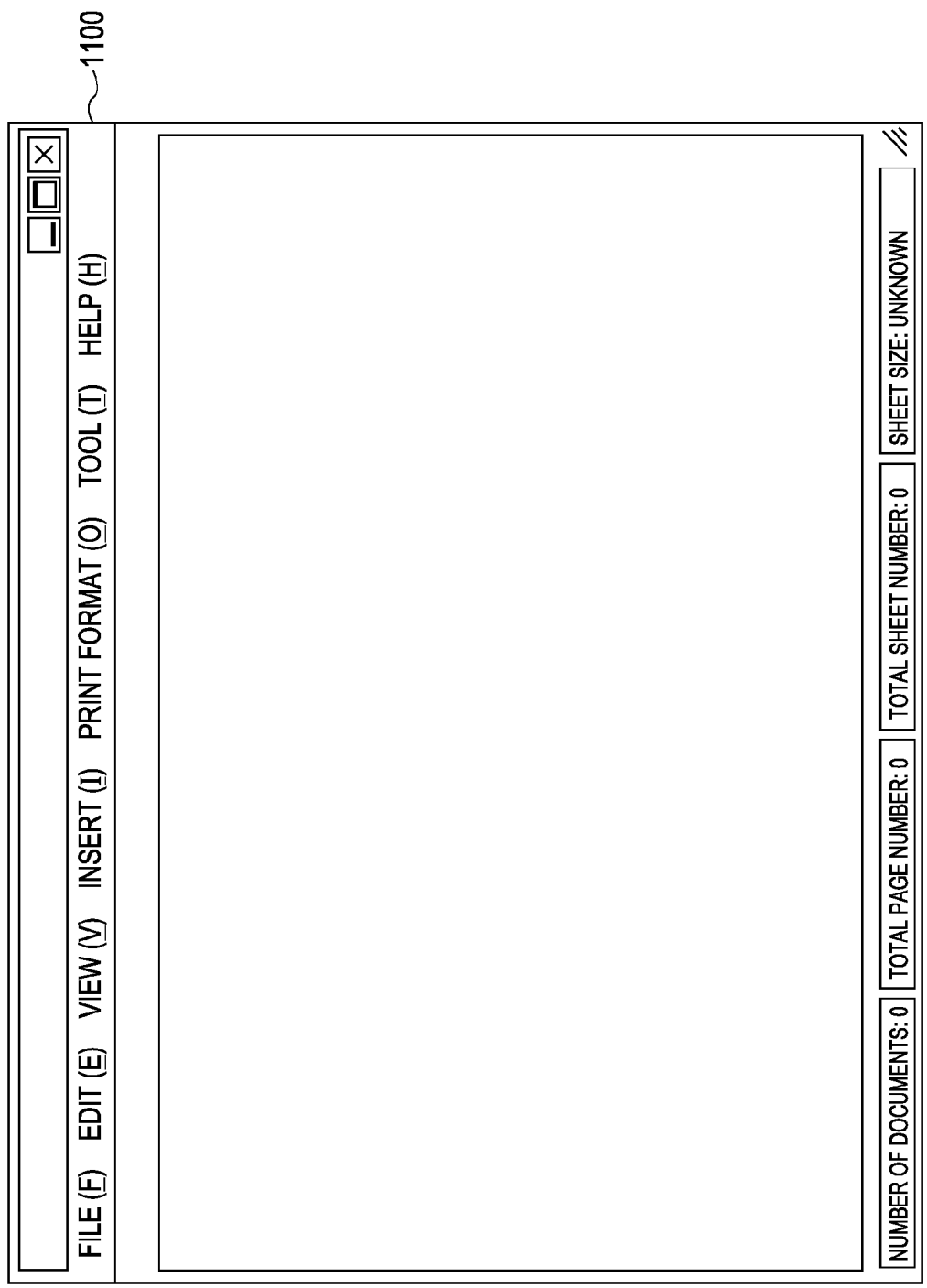
FIG. 11 shows a UI screen when a book file is newly formed.

FIG. 7 is a flowchart showing procedures for opening the book file by the bookbinding application 104. Steps in the flowchart are executed by the CPU 201. First, the bookbinding application 104 determines whether the book file to be opened is a newly formed file or an existing file (step S701). If it is determined as being a newly formed file, the bookbinding application 104 newly forms a book file including no chapters (step S702). Referring to the example of FIG. 3, the newly formed book file has only the book node 301 in which there are no links to any chapter node. As the book attributes, a set of book attributes prepared in advance for the newly formed book file is employed. Then, the bookbinding application 104 displays a user interface (UI) screen for editing the newly formed book file (step S704). FIG. 11 shows one example of the UI screen when the book file is newly formed. In this case, because the book file includes no substantial contents, nothing is displayed on a UI screen 1100.

Figure 10:
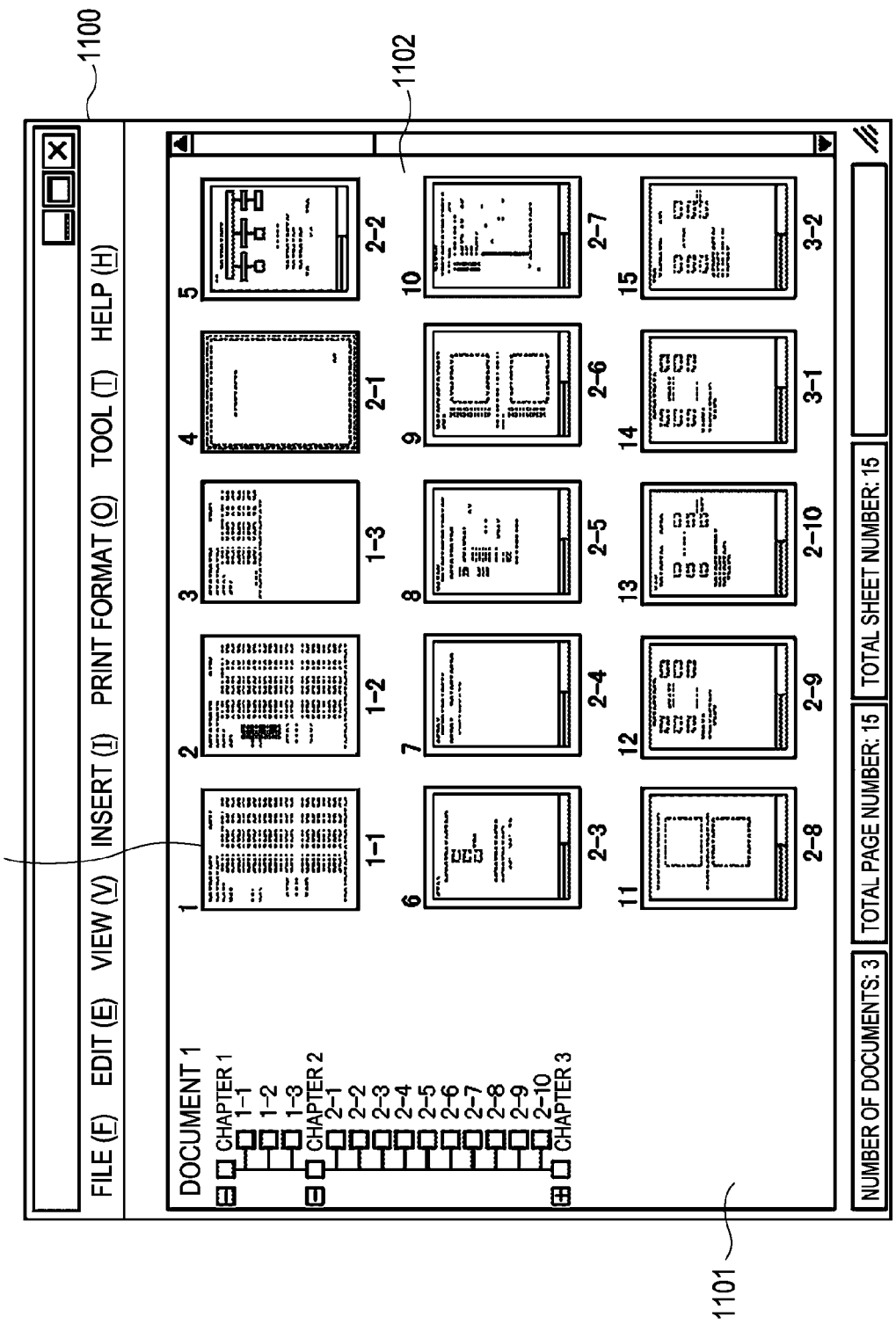
FIG. 10 shows a UI screen of a bookbinding application.

On the other hand, if the presence of the existing book file is determined, the bookbinding application 104 opens the designated book file (step S703) and displays a user interface (UI) screen in accordance with the structure, attributes and contents of the book file (step S704). FIG. 10 shows one example of the UI screen which displays the book file designated from among the existing book files. The UI screen 1100 includes a tree region 1101 indicating the book structure and a preview region 1102 indicating the printed state. The tree region 1101 displays chapters included in the book and pages included in each chapter in the form of a tree structure, as shown in FIG. 3A. Pages displayed in the tree region 1101 represent original pages. The preview region 1102 displays the contents of the print pages at a reduced scale. The order in display of the print pages reflects the book structure.

Application data having been converted to an electronic original file by the electronic original writer 102 can be added, as a new chapter, to the opened book file. Such a function is called the electronic original import function. By importing the electronic original file to the newly formed book file in accordance with the procedures shown in FIG. 7, the bookbinding application 104 generates a book file including the imported electronic original file. That function is started up by dragging and dropping the application data to the screen of FIG. 10.

Figure 8:
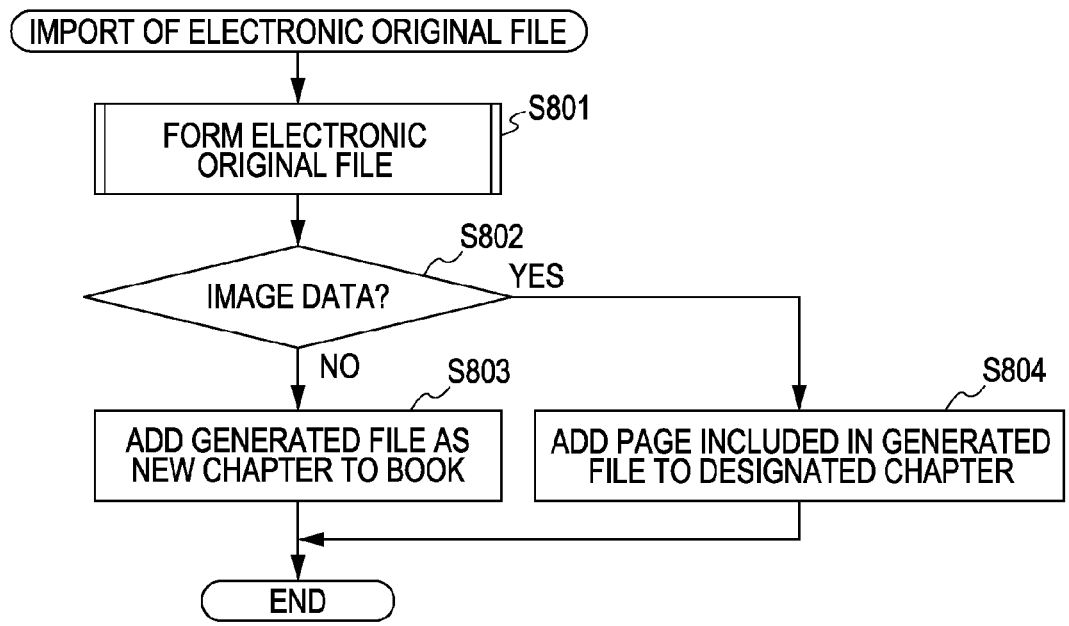
FIG. 8 is a flowchart showing an example of procedures for importing an electronic original file to the book file.

FIG. 8 shows the procedures for importing the electronic original file. In the first step, after starting up the application program used to generate the designated application data, the bookbinding application 104 designates the electronic original writer 102 as the device driver and outputs the application data to the electronic original writer 102. Thus, the bookbinding application 104 converts the application data to electronic original data (step S801). After completion of the conversion, the bookbinding application 104 determines whether the converted data is image data (step S802). This determination is made based on a file extension of the application data when the computer is operated under the Windows OS. If the extension is "bmp", for example, this means that the converted data is Windows bit map data. Also, "jpg" means jpeg-compressed image data, and "tiff" means image data in the TIFF format. In the case of such image data, the electronic original file can be directly generated from the image data without starting up the application as in step S801.

If the converted data is not image data, the bookbinding application 104 adds, as a new chapter, the electronic original file generated in step S801 to the book of the currently opened book file (step S803). As chapter attributes, those ones common to the book attributes are given by copying values of the book attributes, and other ones are set to default values prepared in advance.

If the converted data is determined as being image data in step S802, the bookbinding application 104 does not add a new chapter in principle and adds each original page included in the electronic original file, which is generated in step S801, to the designated chapter (step S804). However, if the book file is a newly formed file, a new chapter is formed and each original page included in the electronic original file is added as a page belonging to that chapter. As page attributes, those ones common to the attributes in the upper-level layer are given as the same attribute values. Also, when the attributes defined in the application data are handed over to the electronic original file, values of those attributes are set as the page attributes. For example, when the N-up printing is designated in the application data, the attribute value representing the N-up printing is handed over as it is. In such a manner, a new book file is formed, or a new chapter is added.

Figure 9:
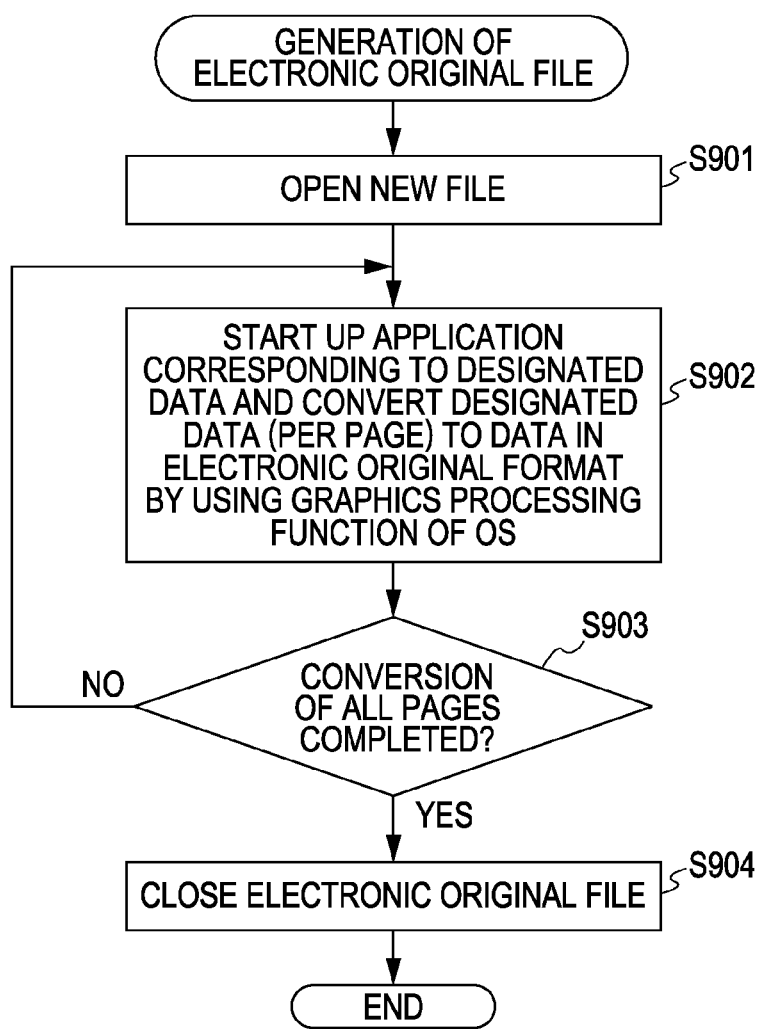
FIG. 9 is a flowchart showing an example of procedures, shown in step S801 of FIG. 8, for converting application data to the electronic original file.

FIG. 9 is a flowchart showing the procedures for generating the electronic original file by the electronic original writer 102 in step S801 of FIG. 8. First, the bookbinding application 104 forms and opens a new electronic original file (step S901). The bookbinding application 104 starts up the application corresponding to the designated application data such that the application transmits an output command to the output module of the OS after designating the electronic original writer 102 as the device driver. The output module converts the received output command to data in the electronic original format by the electronic original writer 102 and then outputs the converted data (step S902). The output destination of the data in the electronic original format is the electronic original file opened in step S901. The bookbinding application 104 determines whether the conversion of all the designated data is completed (step S903). If completed, the electronic original file is closed (step S904). The electronic original file thus generated by the electronic original writer 102 is a file containing the substantial contents of the original page data shown in FIG. 3B.

[Editing of Book File]

As described above, the book file can be formed from the application data. By using the bookbinding application 104, the user can perform editing operations, given below, on chapters and pages of the generated book file.

(1) Newly add
(2) Delete
(3) Copy
(4) Cut (Tear-off)
(5) Paste
(6) Move
(7) Change chapter name
(8) Renumber and rename page
(9) Insert cover
(10) Insert slip sheet (inserted sheet)
(11) Insert index sheet
(12) Page layout on each original page In addition, the bookbinding application 104 can execute an operation of canceling the editing operation which has been made before, and an operation of redoing the canceled operation. With those editing functions, the bookbinding application 104 can perform various editing operations such as combining a plurality of book files, rearranging or deleting chapters or pages in the book file, changing layout of each original page, and inserting an inserted sheet and an index sheet. By executing the editing operations, the results of those operations are reflected on the setting of the attributes shown in FIGS. 4 and 5, or on the structure of the book file. For example, when an operation of newly adding a blank page is executed, the blank page is inserted at the designated position. The inserted blank page is handled as an original page. Also, when the layout of an original page is changed, details of the change are reflected on the attributes such as the printing method, N-up printing, cover/back cover, index sheet, inserted sheet, and chapter break.

[Output of Book File]

The book file thus formed and edited is intended to be finally output by printing. When the user selects a file menu on the UI screen 1100 of the bookbinding application 104, shown in FIG. 10, and selects "print", the book file is printed by the designated output device. At that time, the bookbinding application 104 first forms a job ticket from the currently opened book file and then hands over the job ticket to the electronic original despooler 105. The electronic original despooler 105 converts the job ticket to an output command of the OS, e.g., the GDI function of Windows, and transmits the output command to the output module, e.g., the GDI. The command output from the output module is converted by the designated printer driver 106 to a command adapted for the relevant device, and the converted command is transmitted to that device.

The term "job ticket" means data having a structure in which the original page is contained as a minimum unit. The structure of the job ticket defines the layout of the original page on a sheet. The job ticket is issued one per job. Therefore, a document node exists at an uppermost level and defines attributes of the entire document, such as duplex/simplex printing. A paper node underlies the document node and includes attributes such as an identifier of a sheet of paper to be used and designation of the sheet feed port in the printer. A "sheet" node belongs to each paper node and indicates a "sheet" printed using that type of paper. One "sheet" corresponds to one sheet of paper. One or more print pages (physical pages) belong to each "sheet". In the case of simplex printing, one physical page belongs to one "sheet", and in the case of duplex printing, two physical pages belongs to one "sheet". Each physical page contains one or more original pages arranged on it. Also, the attributes of the physical page include the layout of the original page.

The electronic original despooler 105 converts the job ticket to the output command adapted for the output module.

[Other System Configurations]

The outline of the document processing system in the basic mode is as per described above. While the described system is a standalone system, an expanded server-client system can also be used to form and edit the book file by utilizing substantially the same construction and procedures. However, the book file and the printing process are managed by the server.

Figure 12:
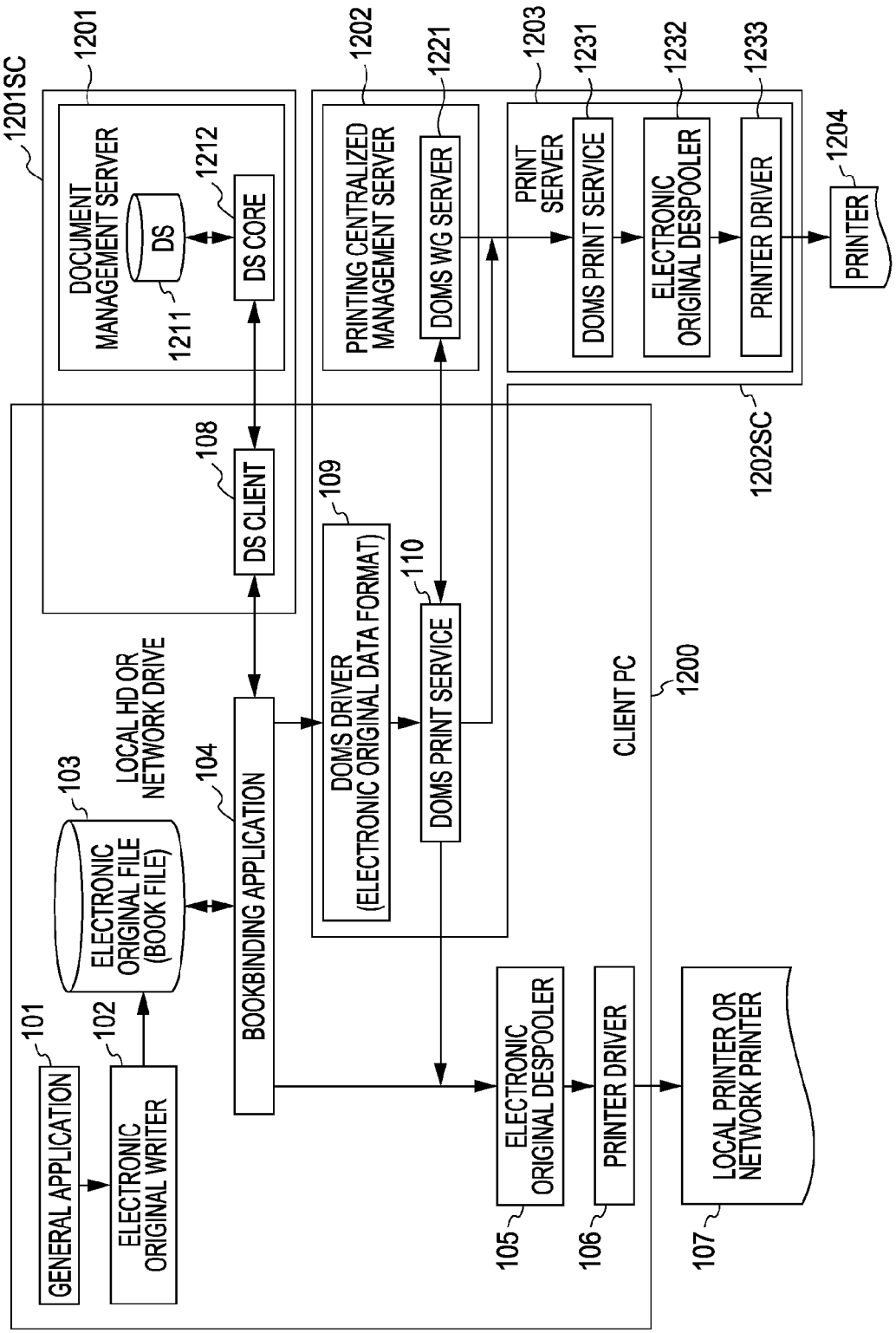
FIG. 12 is a block diagram showing an example of software configuration of a client-server document processing system.

FIG. 12 is a block diagram showing an example of the software configuration of a server-client document processing system. A client document processing system 1200 is constituted by adding, to the standalone system, a DOMS driver 109, a DOMS print service module 110, and a DS (Document Service) client module 108, which are all client modules. DOMS implies Document Output Management Service. A document management server 1201, a printing centralized management server 1202, and a print server 1203 are connected to the client document processing system 1200. Those servers are usually connected to the client document processing system 1200 via a network. However, when the servers function as clients simultaneously, both the sides are connected via inter-process communication that simulates communication between networks.

Although the document management server 1201 and the printing centralized management server 1202 are both connected to the client in the example shown in FIG. 12, any one of those two servers may be present on the network.

The document management server 1201 is a server for storing the book file formed and edited by the bookbinding application 104. When the book file is managed by the document management server 1201, the book file is stored in a database 1211 of the document management server 1201 instead of a local HD in a client PC or in addition to it. Storage and reading of the book file between the bookbinding application 104 and the document management server 1201 are performed via a DS client 108 and a DS core 1212.

The printing centralized management server 1202 is a server for managing printing of the book file which is stored in the client document processing system 1200 or the document management server 1201. A printing request from the client is transmitted to a DOMS WG service module 1221 of the printing centralized management server 1202 via a DOMS driver 109 and a DOMS print service module 110. When printing is performed by a client printer, the printing centralized management server 1202 hands over the electronic original data to the electronic original despooler 105 via the DOMS print service module 110 of the client. When printing is performed by the print server 1203, the printing centralized management server 1202 transmits the electronic original data to a DOMS print service module 1231 of the print server 1203. The printing centralized management server 1202 makes a security check regarding, e.g., whether the user having issued the printing request for the stored book file is a qualified person, or it stores a log of printing processes. Thus, the document processing system can be realized as any of the standalone system and the client server system.

[Contents of Preview Display]

As described above, when the book file is opened by the bookbinding application 104, the UI screen 1100 shown in FIG. 10 is displayed. The tree region 1101 displays a tree showing the structure of the opened book file (hereinafter referred to as the "target book"). For the preview region 1102, three display methods are prepared selectively depending on designation by the user. The first method is called an original view mode for displaying the original pages as they are. In this original view mode, the contents of the original pages belonging to the target book are displayed in reduced scale.

Note that layout is not reflected on the display in the preview region 1102. The second method is called a print view mode. In this print view mode, the original pages are displayed in the preview region 1102 while the layout of the original pages is reflected on the display. The third method is called a simple print view mode. In this simple print view mode, the contents of the original pages are not reflected on the display in the preview region 1102, and only the layout is reflected.

[Stapling Control]

Stapling control executed by the bookbinding application 104 in the host computer 100, which is connected to a printer having the stapling function, will be described below.

Figure 13:
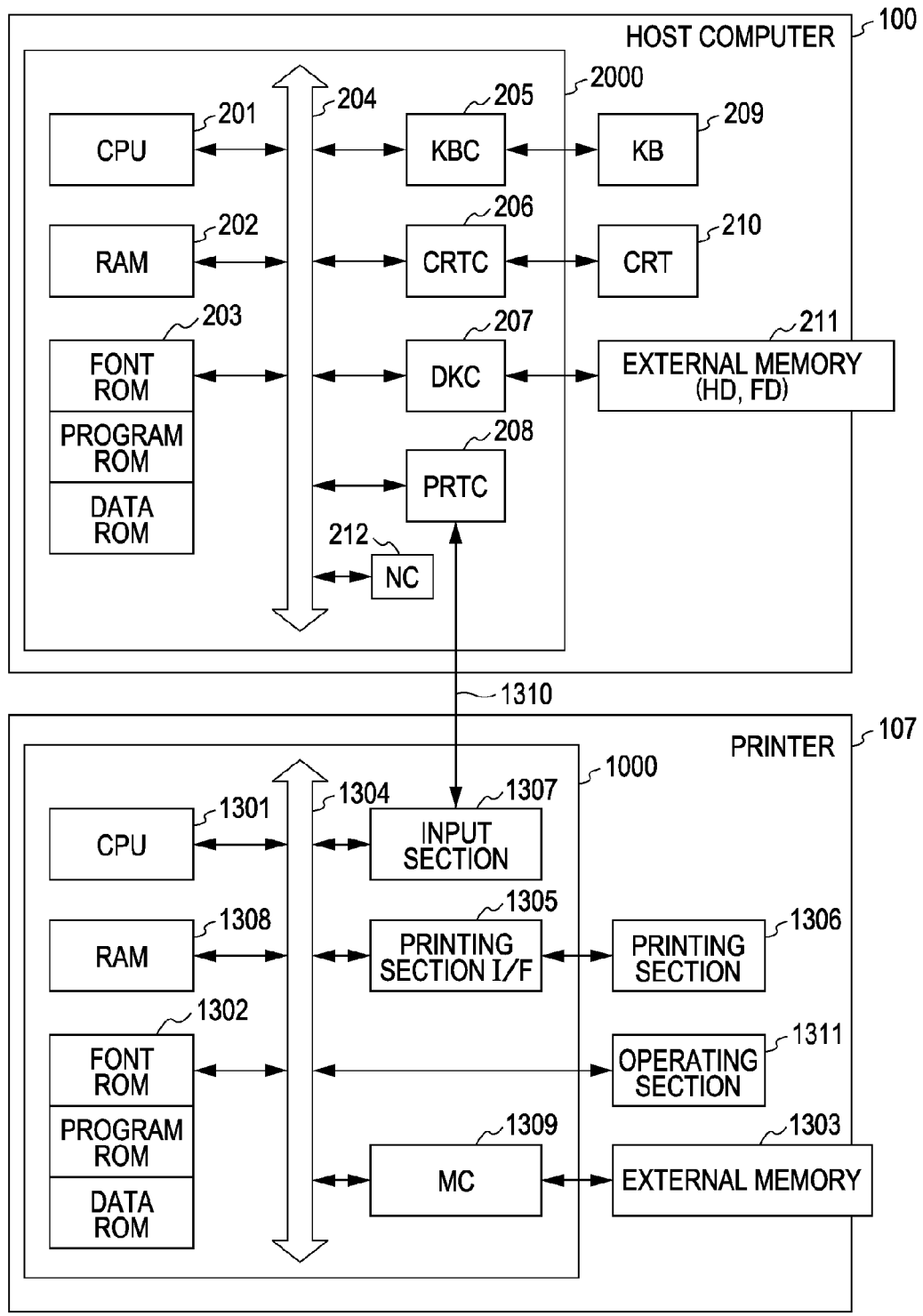
FIG. 13 is a block diagram showing a configuration of a stapling control system.

FIG. 13 is a block diagram showing a configuration of a stapling control system. As shown, the stapling control system comprises the host computer 100, shown in FIG. 2, and the printer 107 having the stapling function.

The construction of the printer 107 will be described below. The present invention can be applied to any of a single printer unit, a printing system made up of a plurality of units, and a system in which a printer is connected and processed via a network, e.g., LAN or WAN, so long as the functions required in the present invention are realized.

As shown in FIG. 13, the printer 107 includes a printer CPU 1301. The CPU 1301 outputs an image signal, as output information, to a printing section (printer engine) 1306 via a printing section I/F 1305, which is connected to a system bus 1304, in accordance with a control program, etc. stored in a ROM 1302 or an external memory 1303. A program ROM in the ROM 1302 stores, for example, a control program for the CPU 1301. A font ROM in the ROM 1302 stores, for example, font data used in generating the output information. A data ROM in the ROM 1302 stores, for example, information used by the host computer 100 when the printer does not include the external memory 1303, e.g., a hard disk.

The CPU 1301 is capable of communicating with the host computer 100 via an input section 1307 so that information in the printer 107, etc. can be notified to the host computer 100. A RAM 1308 serves as a main memory, a work area and so on for the CPU 1301, and its memory capacity can be expanded by using an optional RAM connected to an add-on port (not shown).

The RAM 1308 is also used as an output information developing area, an environment data storage area, an NVRAM, etc. Access to the external memory 1303, e.g., a hard disk (HD) or an IC card, is controlled by a memory controller (MC) 1309. The external memory 1303 is connected as an option and stores font data, an emulation program, form data, etc. A control panel (operating section) 1311 is constituted by switches, an LED indicator, etc. for input operations.

The external memory 1303 is not limited to one in number. For example, a plurality of external memories may be provided, for example by connection of an optional card which stores fonts in addition to the built-in font and of another external memory which stores a program for interpreting different printer control languages. Further, an additional NVRAM (not shown) may be provided to store the printer mode setting information from the control panel 1311.

[Editing Functions of Book File]

Figure 14:
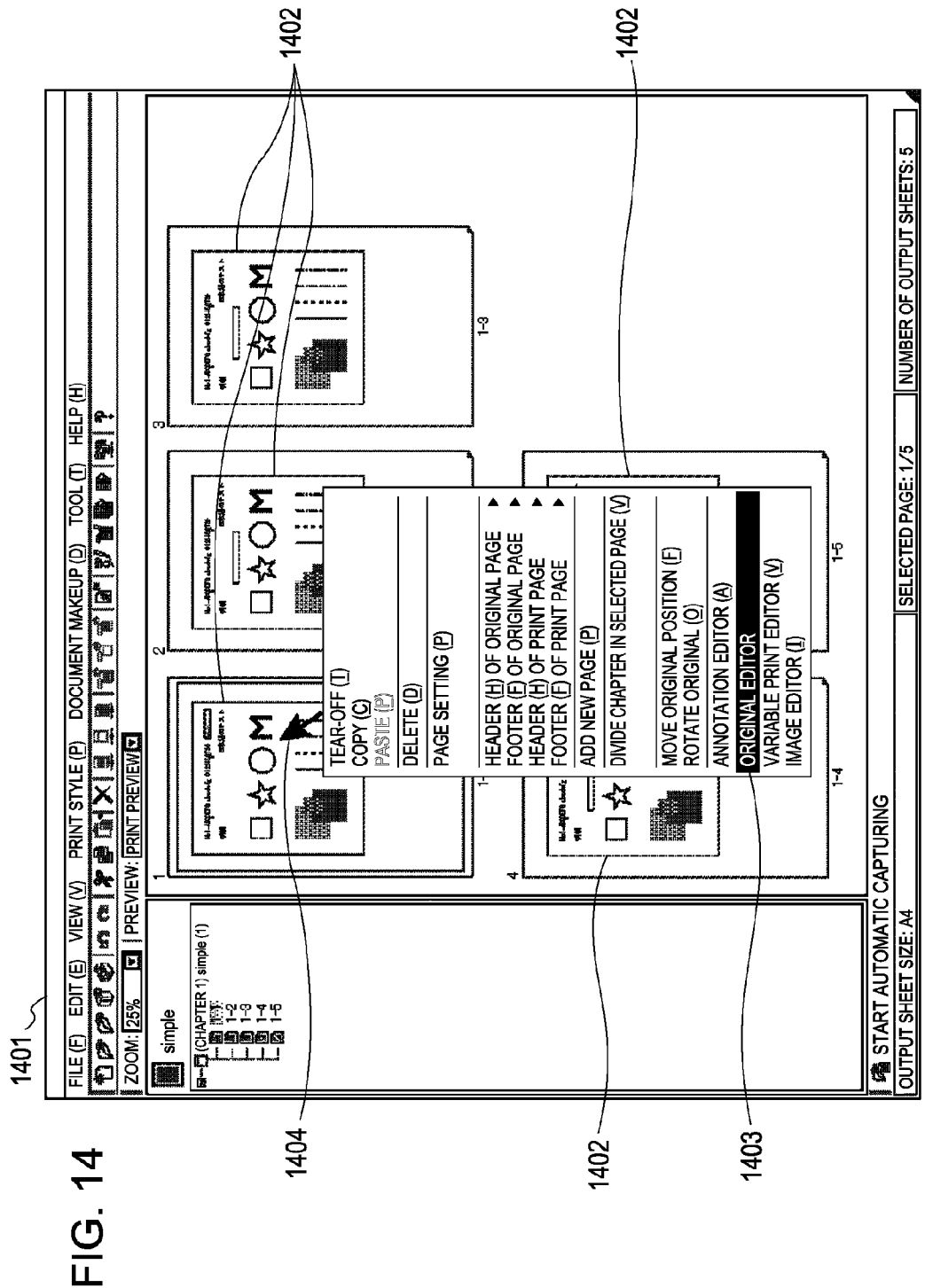
FIG. 14 shows an example of a UI screen for starting up an original editor according to the present invention.
Figure 15:
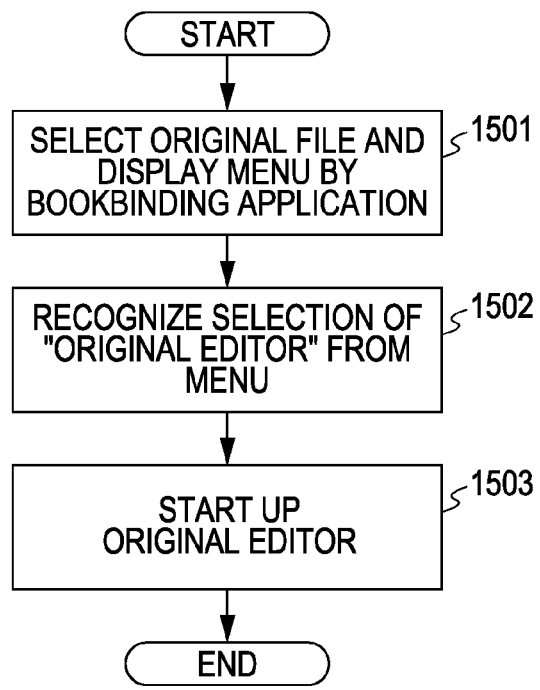
FIG. 15 is a flowchart showing startup procedures for the original editor.

The bookbinding application 104 includes an original editor capable of editing writings and images with respect to the generated book file. The original editor is started up by the bookbinding application 104 and is able to edit the book file per logical page. FIG. 15 shows a flowchart for starting up the original editor. The bookbinding application 104 first displays a menu for the selected original file (step 1501) and then recognizes an event that "ORIGINAL EDITOR" is selected from the menu (step 1502). Further, the bookbinding application 104 starts up the original editor and displays a main screen (step 1503). FIG. 14 shows an example of a UI screen for starting up the original editor from the bookbinding application 104. Numeral 1401 indicates a main screen displayed by the bookbinding application 104, and 1402 indicates an imported original file. Numeral 1403 indicates a popup menu displayed when the original file is selected in step 1502 of FIGS. 15, and 1404 indicates a cursor or mouse pointer. The original editor is started up by selecting the imported original file with the mouse pointer, displaying the popup menu, and by selecting "ORIGINAL EDITOR" in the popup menu. While the original editor is started up from the popup menu in the above description with reference to FIG. 15, the startup may be performed by another suitable method (such as utilizing a tool button or a menu item).

Figure 16:
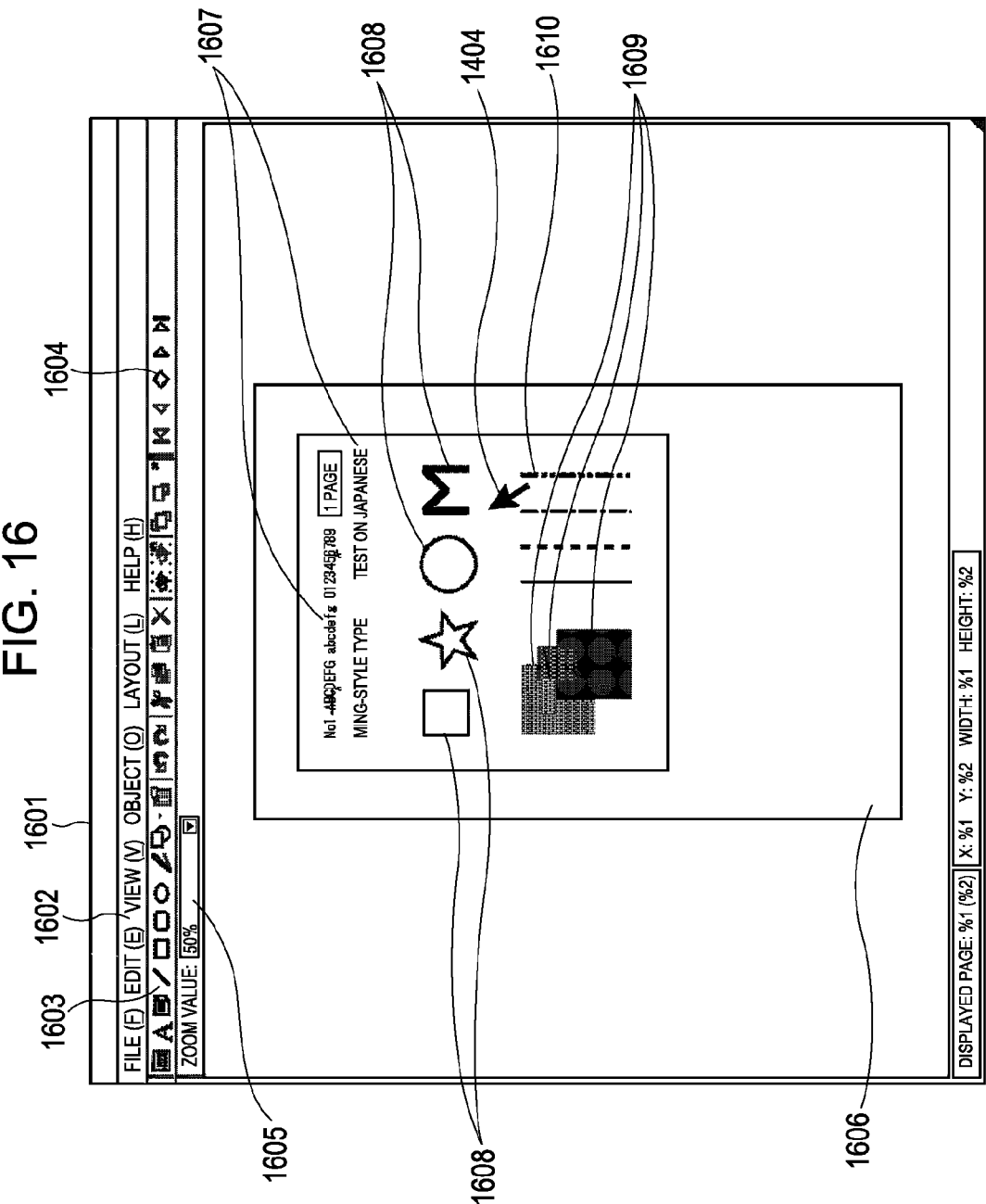
FIG. 16 shows a main UI screen of the original editor.

The editing functions capable of being executed by the original editor will be described below. FIG. 16 shows the entire UI screen of the original editor. The UI screen includes an original editor screen 1601, a menu bar 1602, a tool button 1603, a page move button 1604, and a zoom designation box 1605. Further, numeral 1606 displayed in the original editor screen 1601 indicates an original file to be edited, 1607 indicates a text object, 1608 and 1609 indicate figure objects, and 1610 indicates a linear line object. The editing functions will be described one by one based on the screen of FIG. 16.

[Text Editing Function]

Figure 17:
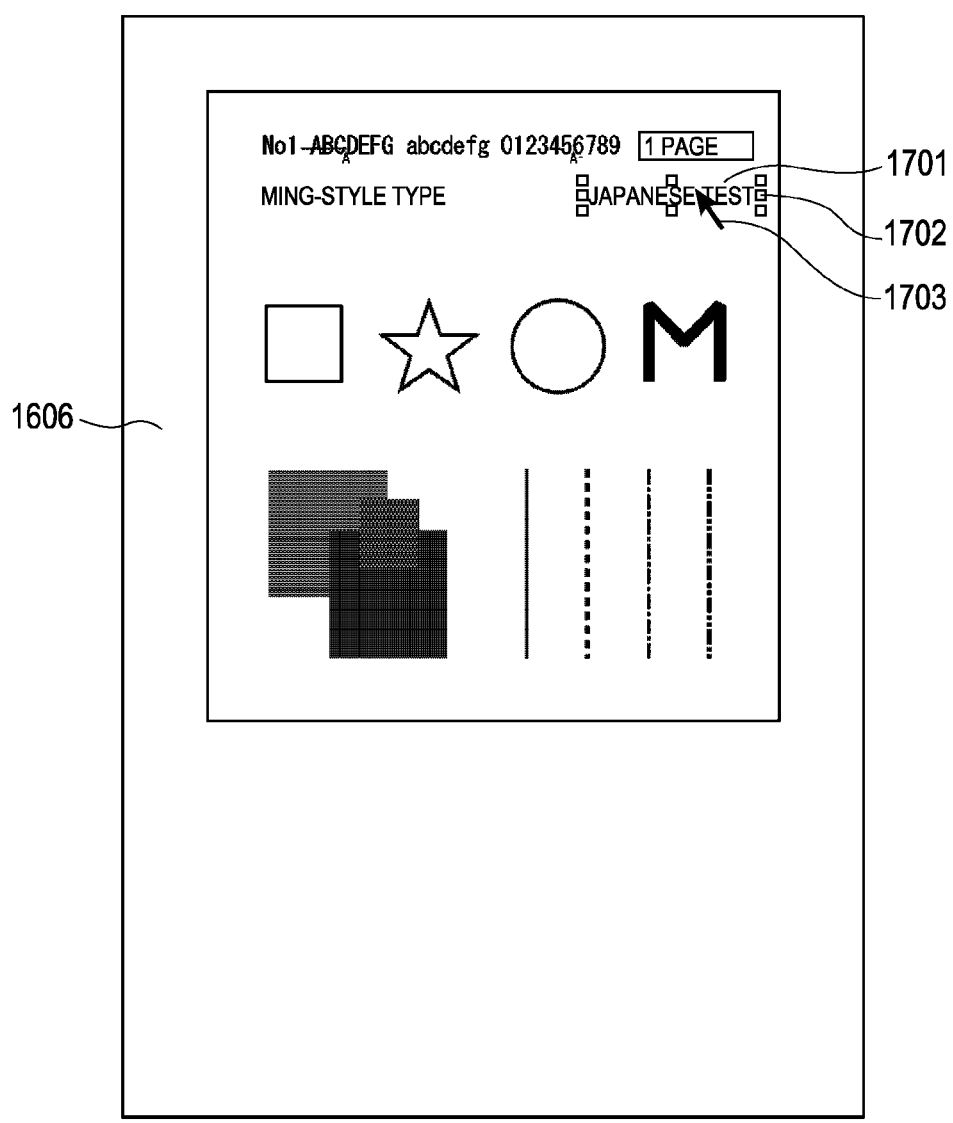
FIG. 17 is an illustration for explaining selection of a text object in text editing.

FIG. 17 shows an example of text object selection and shows in detail the original file 1606 shown in FIG. 16. In FIG. 17, numeral 1701 indicates a text object, 1702 indicates an object control handle, and 1703 indicates a mouse pointer or cursor. When a text in the original file is selected by the mouse pointer, matching of the selected text with the object is established and the object is put into a selected state. The control handle is displayed on the object in the selected state, as indicated by 1702, so that selection of the text object is notified to the user. While the control handle is displayed in the illustrated example, a rectangle circumscribing the text object may be displayed instead. Various operations such as moving or deleting the object, changing text attributes, and adding or deleting a text can be performed on the selected text object.

Figure 18:
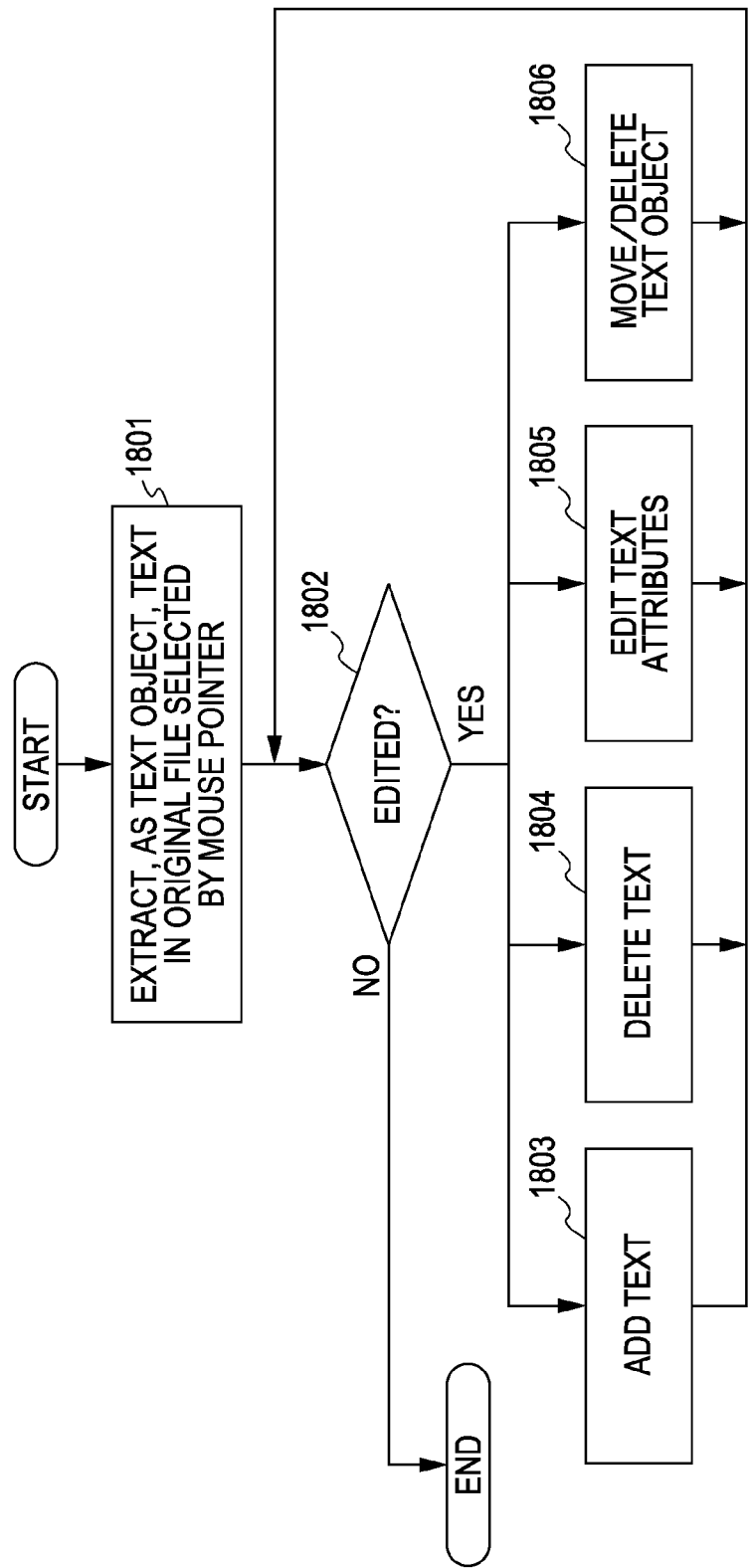
FIG. 18 is a flowchart showing execution procedures of the text editing.
Figure 19:
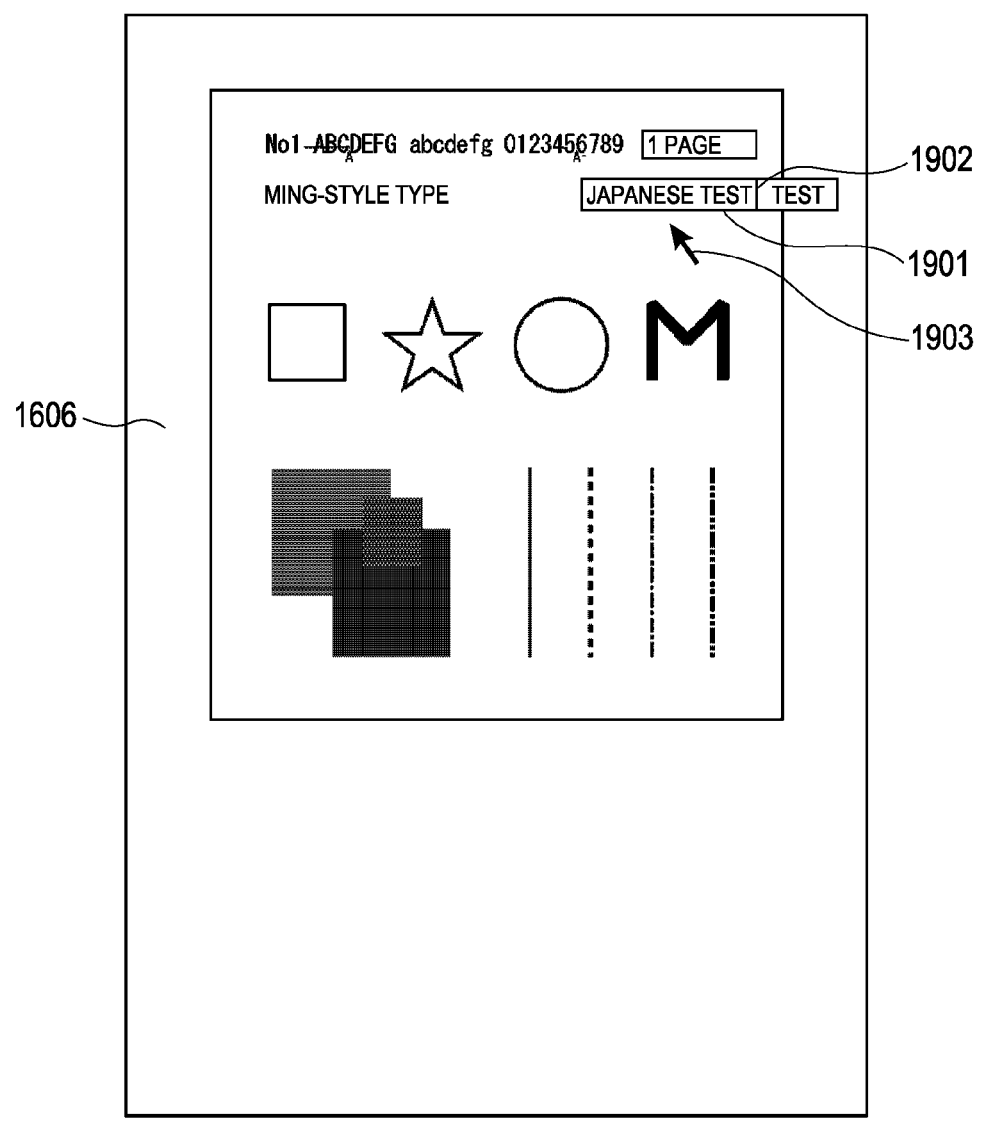
FIG. 19 is an illustration for explaining addition of a text in the text editing.

FIG. 18 shows a flowchart for the text editing process. First, the original editor extracts, as the text object, a text in the original file which has been selected by the mouse pointer (step 1801). Then, the original editor performs editing operations, such as addition and deletion of a text, changes of text attributes, and movement and deletion of the text object, on the extracted text object (steps 1802-1806). Thereafter, the editing is brought to an end. FIG. 19 shows an example of text addition. In other words, a text is added to the text object 1701 shown in FIG. 17. When the text object in the selected state is selected again by the mouse pointer 1903, the text object is surrounded by a rectangle 1901 and an edit cursor 1902 is displayed. By moving the edit cursor 1902 to a position where the text is to be added and inputting characters, the input characters are added to the text object. In the example of FIG. 19, "TEST" is added to "JAPANESE TEST" at a position after "TEST".

Figure 20:
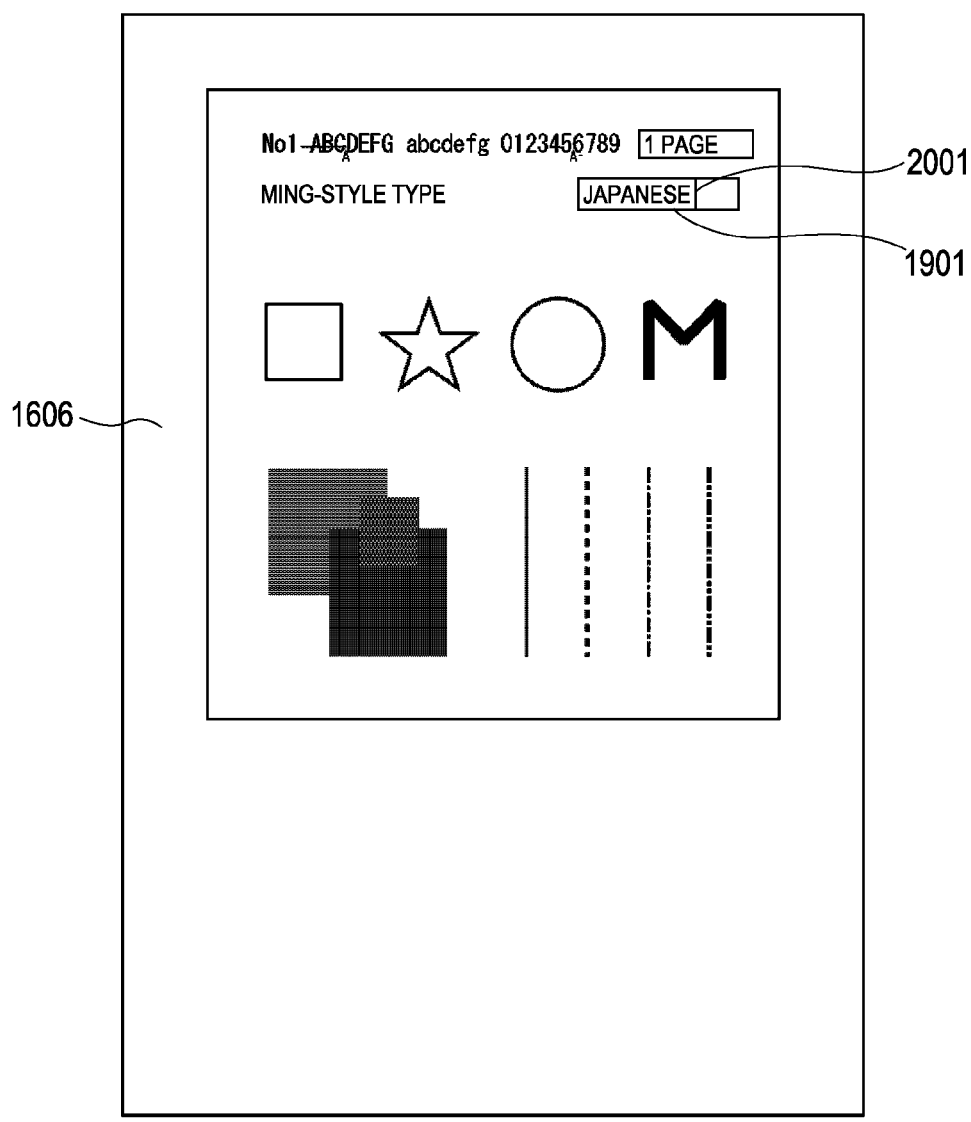
FIG. 20 is an illustration for explaining deletion of a text in the text editing.

FIG. 20 shows an example of text deletion. In other words, a text is deleted from the text object 1701 shown in FIG. 17. In a similar manner to that in the text addition, the text object is surrounded by a rectangle and an edit cursor 2001 is displayed. By touching a backspace key or executing deletion in that state, characters located in front of the edit cursor are deleted. In the example of FIG. 20, "TEST" in "JAPANESE TEST" is deleted.

The text in each text object has text attributes, and the text attributes can also be edited. The text attributes includes font, style, size, color, character decoration, character interval, horizontal scaling factor, etc. Since the meanings of those text attributes and the method of setting them are known, a description thereof is omitted here.

[Text Box Editing Function]

Figure 21:
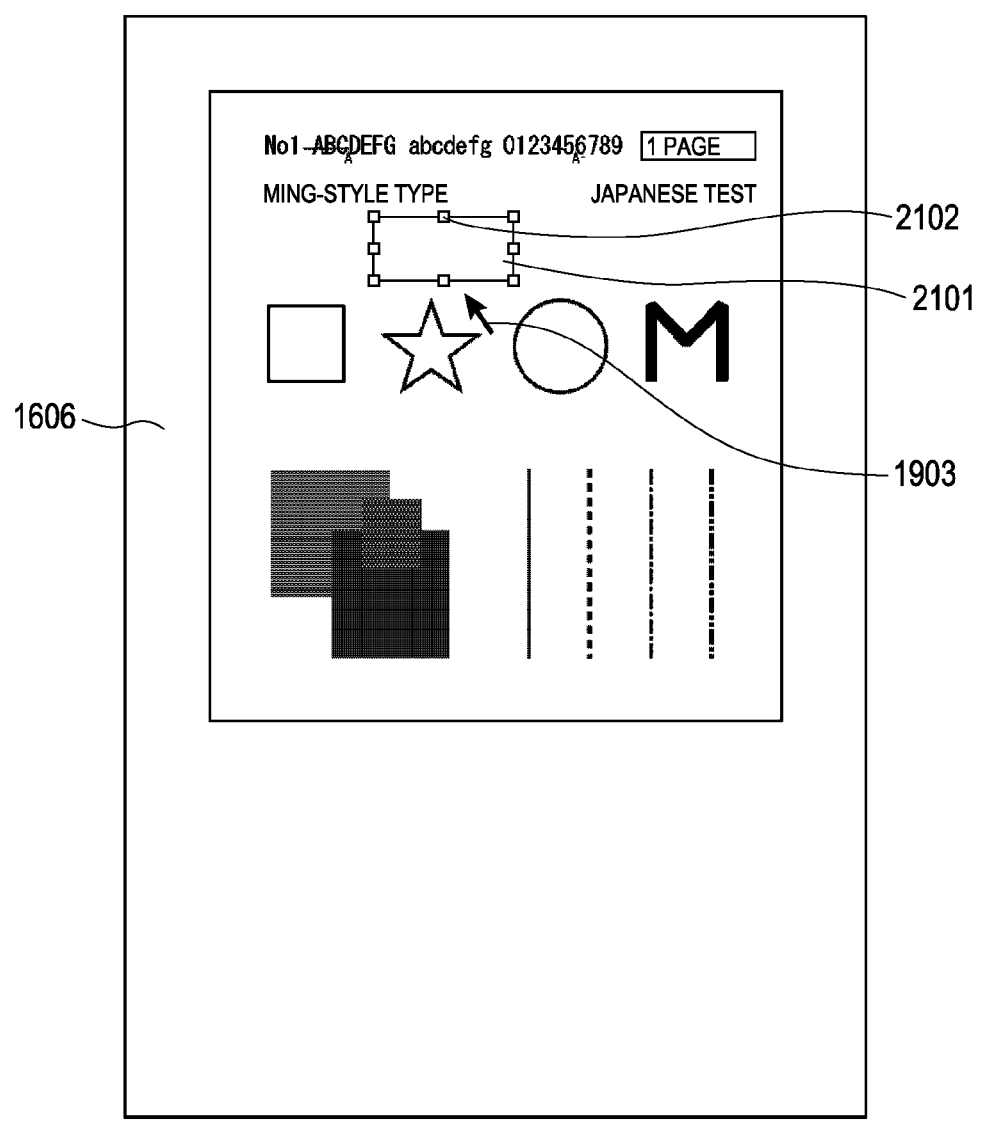
FIG. 21 is an illustration for explaining formation of a text box in the text editing.
Figure 22:
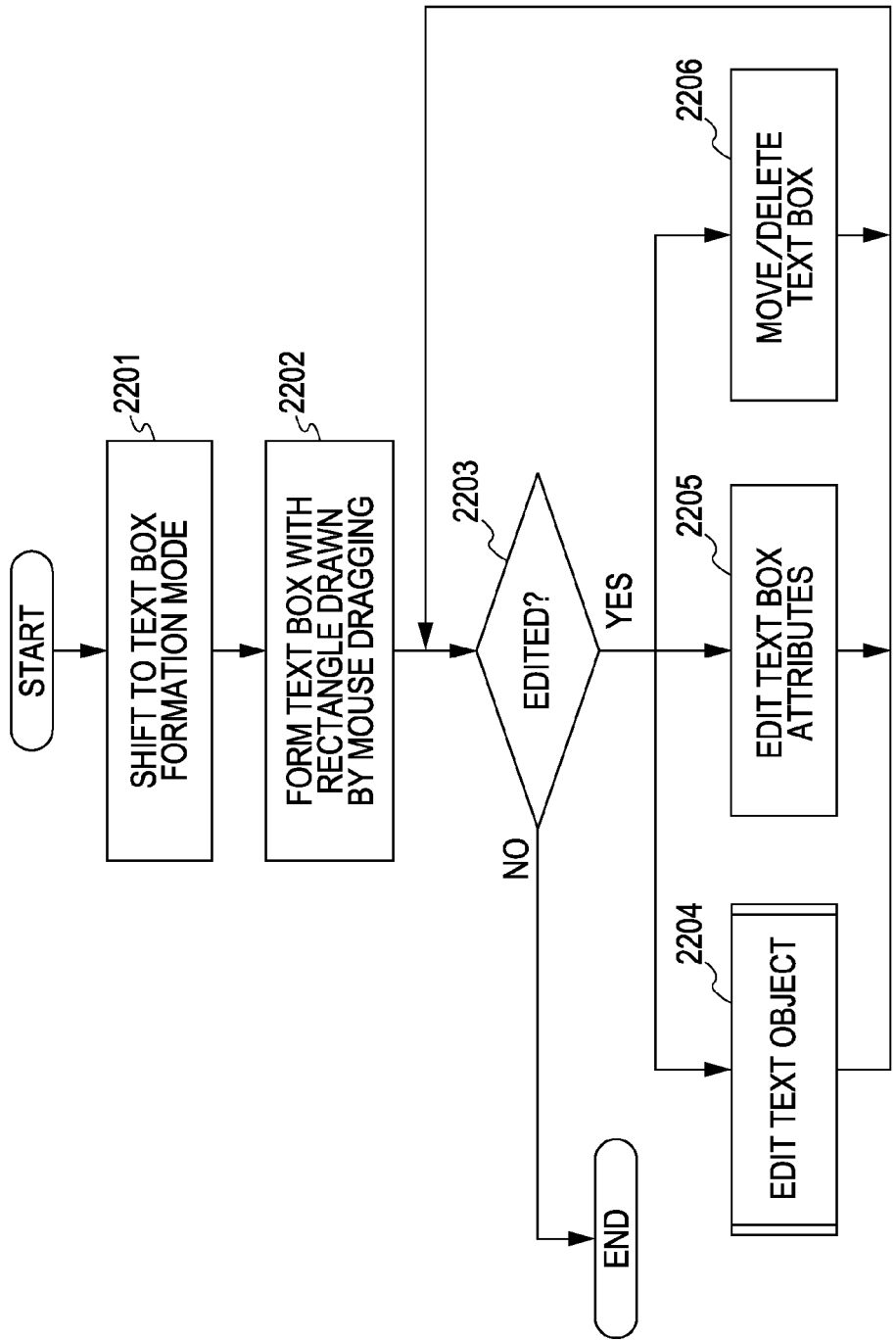
FIG. 22 is a flowchart showing procedures for editing the text box.

While the above text object has been described as editing a text limited in one line, the original editor has the function of newly forming a text over a plurality of lines. A text box is used in the case of forming a text over plural lines. FIG. 22 is a flowchart for editing the text box. First, the original editor shifts to a text box formation mode (step 2201) and forms the text box with a rectangle drawn by mouse dragging (step 2202). Then, the original editor executes editing operations in the formed text box, i.e., editing of the text object (which is the same as the above-described editing of the 1-line text), editing of text box attributes, and editing such as movement and deletion of the text box (steps 2203-2206). Thereafter, the editing is brought to an end. FIG. 21 shows an example of formation of the text box. More specifically, when a rectangle is drawn on the original file 1606 in a text box formation mode by using the mouse pointer 1903, a text box 2101 is formed. Control handles 2102 are displayed in the formed text box when the box is newly formed or selected. By dragging the control handles 2102 with the mouse pointer, the box size can be resized.

Figure 23:
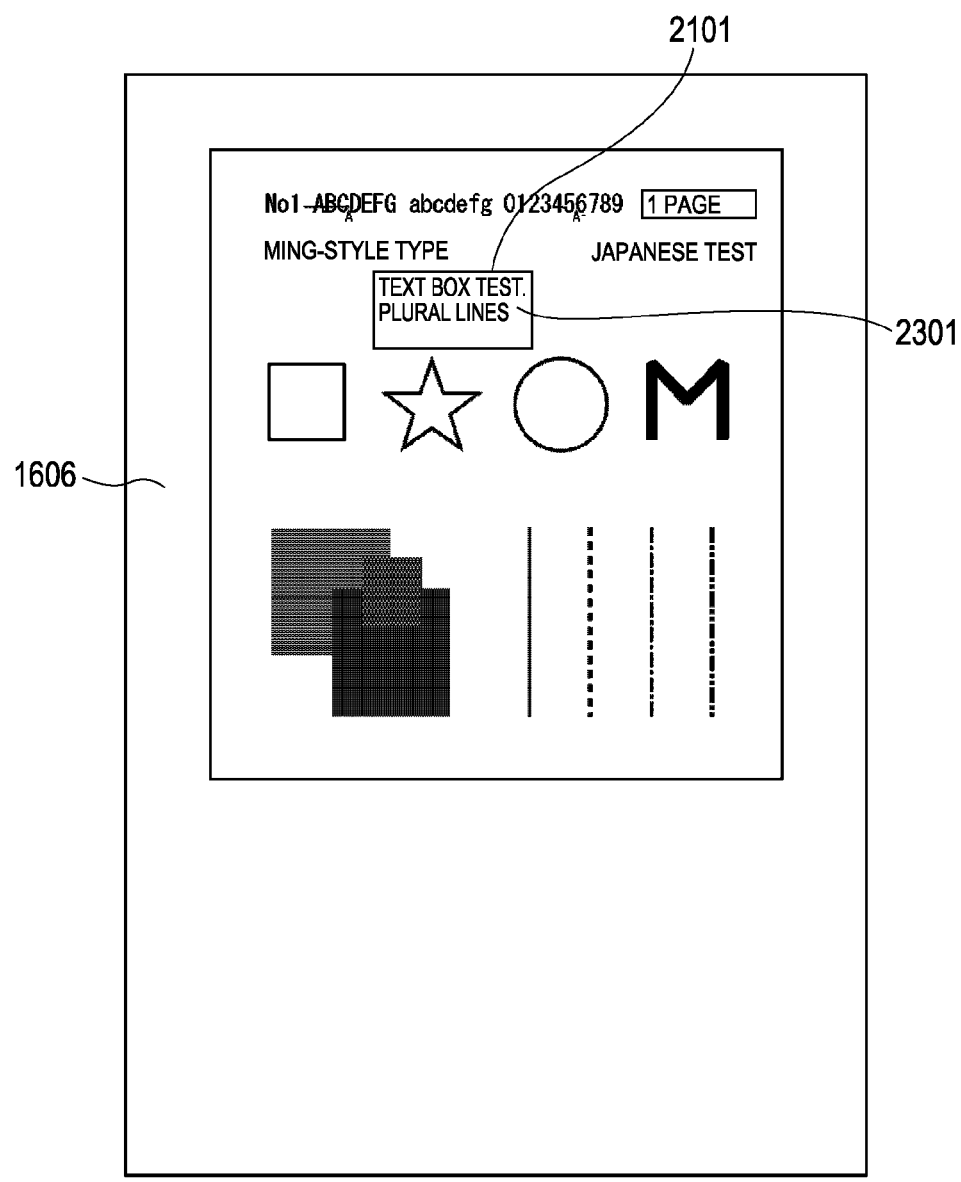
FIG. 23 is an illustration for explaining addition of a text into the text box.

FIG. 23 shows an example of addition of a text into the text box. When the text box in the selected state is selected again by the mouse pointer, the edit cursor is displayed in the text box as in the case of editing the text object. By inputting a text in that state, the text can be added into the text box. Also, a text can be deleted in a similar manner to that in the case of editing the text object. In the example of FIG. 23, a text "TEXT BOX TEST. PLURAL LINES" is added into the text box 2101. As described above, the text box supports a text over plural lines. A text continuing beyond the right end of a line is displayed after return to a new line (as indicated by 2301).

The text box and the text in the text box can also be edited in their attributes similarly to the text object. The attributes of the text box include line type, line width, line color, paint-out, opaqueness, etc. The attributes of the text in the text box are the same as those of the text object. Since the meanings of those attributes and the method of setting them are known, a description thereof is omitted here.

[Image Editing Function]

The image editing function of the original editor will be described below. The image editing function includes "image insertion" and "image export".

Figure 24:
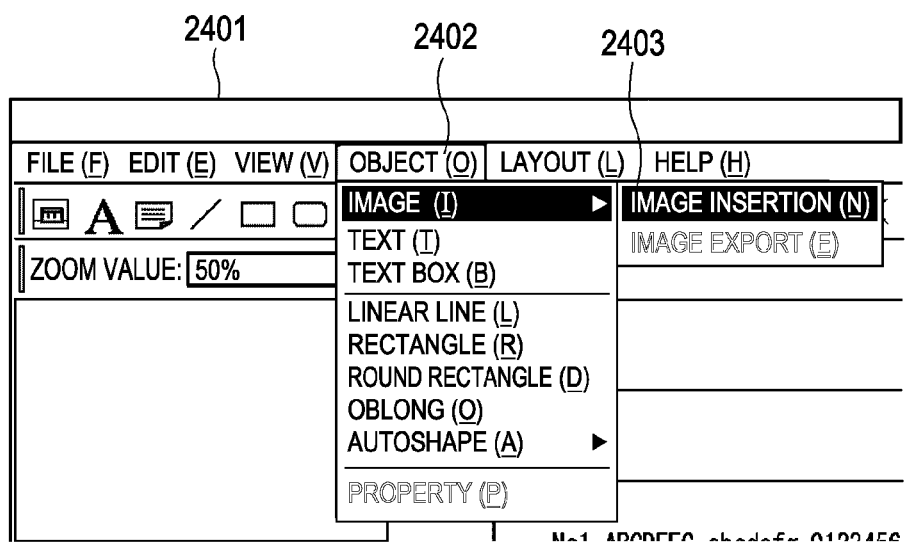
FIG. 24 shows an example of an image insertion menu in image editing.
Figure 25:
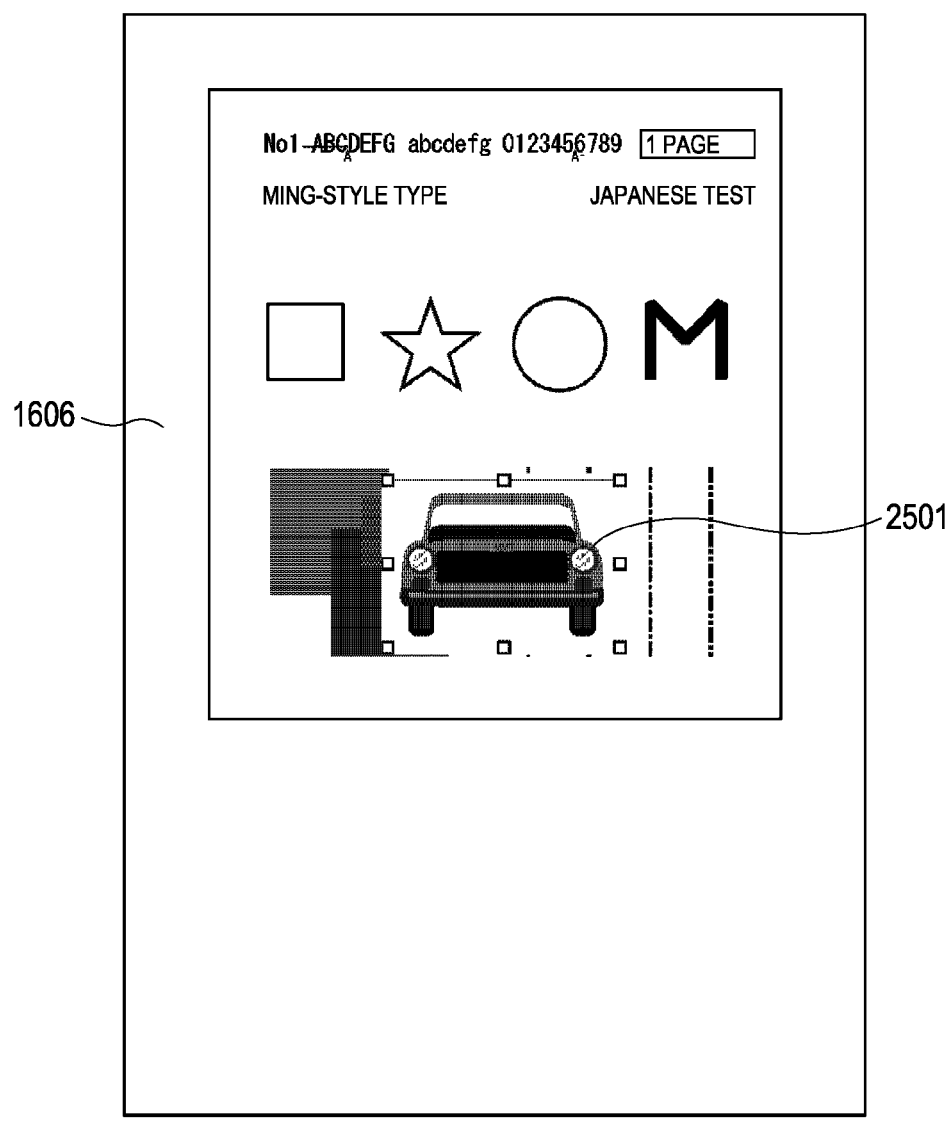
FIG. 25 is an illustration for explaining an example of image insertion in the image editing.
Figure 27:
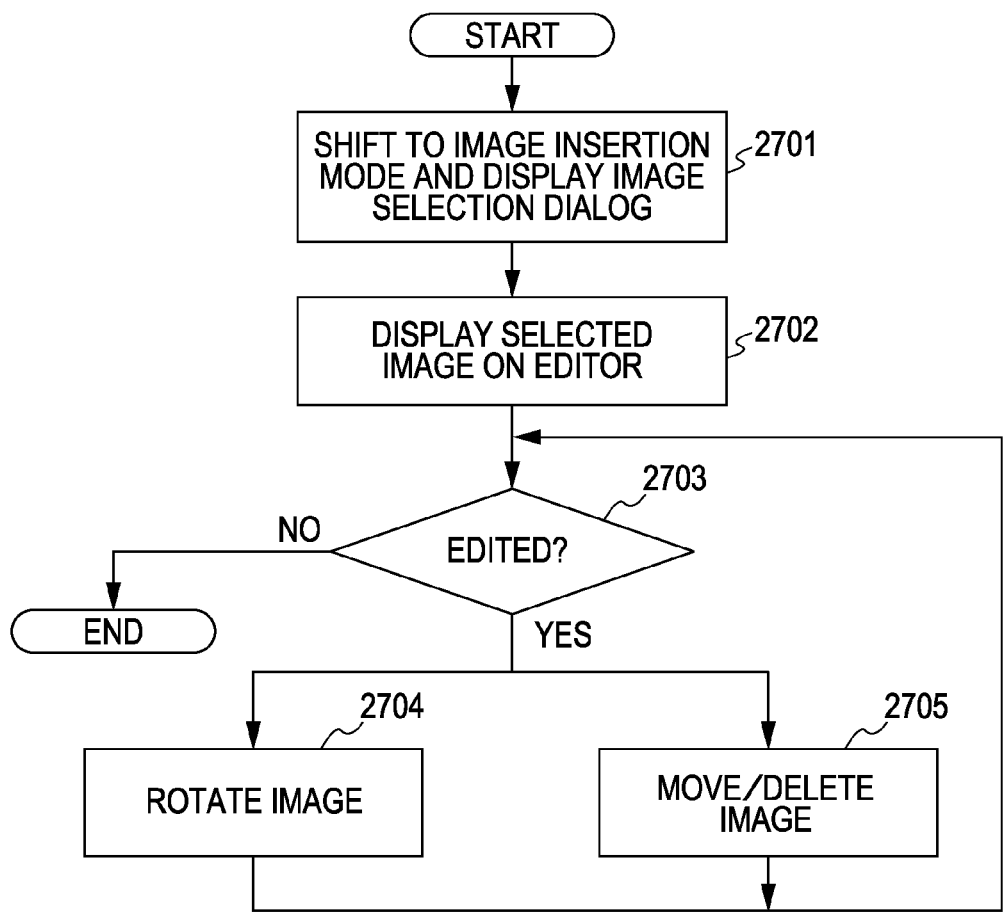
FIG. 27 is a flowchart showing procedures for image insertion.

A description is first made of the image insertion. FIG. 27 is an overall flowchart for inserting, rotating, moving and deleting an image. The original editor first shifts to an image insertion mode and displays an image selection dialog (step 2701). Then, the original editor displays (step 2702) an image selected in the dialog displayed in step 2701. The original editor executes editing operations, such as rotation, movement and deletion, on the displayed image (steps 2703-2705). Thereafter, the editing is brought to an end. FIG. 24 shows an example of a UI screen for shifting to the image insertion mode. In FIG. 24, numeral 2401 indicates a screen displayed by the original editor, 2402 indicates a menu, and 2403 indicates an image insertion mode menu. When "IMAGE INSERTION" is selected from the menu bar of the original editor, the image selection dialog is displayed. By selecting an image file to be inserted from the image selection dialog, an image is inserted as an image object on the original file. FIG. 25 shows an example of the inserted image. As shown in FIG. 25, when the image insertion is selected from the screen displayed by the original editor, an image 2501 is inserted on the original file 1606. The position where the image is inserted is a center of the original file 1606. In consideration of usability, the inserted position of the image may be optionally set with a datum being set to an upper left corner or a lower left corner of the original file, for example, without being limited to the center. Also, the image may be inserted by using a tool button, for example, instead of using the menu.

Figure 26:
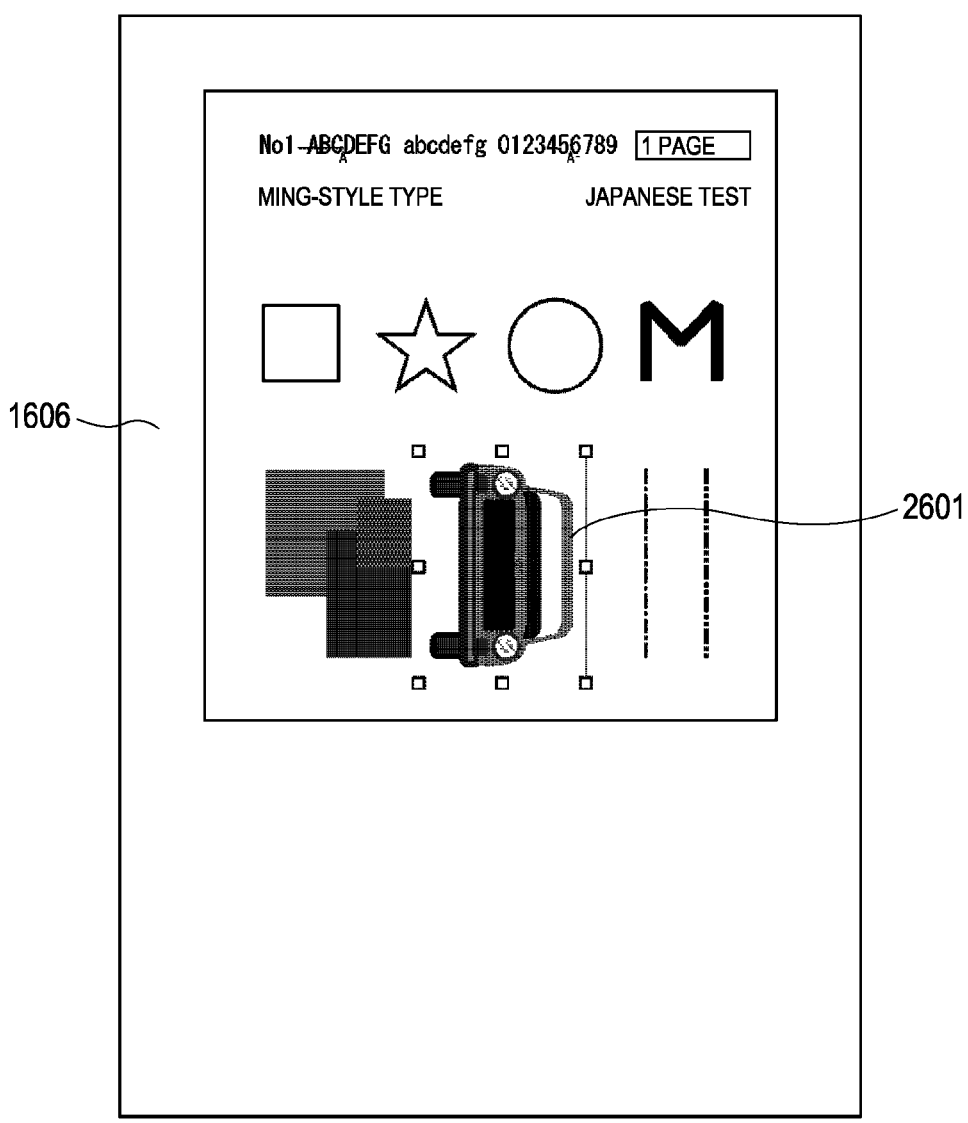
FIG. 26 is an illustration for explaining an example of image rotation in the image editing.

Editing operations, such as rotation, movement and deletion, can be executed on the inserted image or the image object arranged on the original file. FIG. 26 shows an example of the image rotation. In FIG. 26, numeral 2601 indicates an image rotated 90 degrees clockwise. Since the movement and deletion of the image are known, a description thereof is omitted here.

Figure 28:
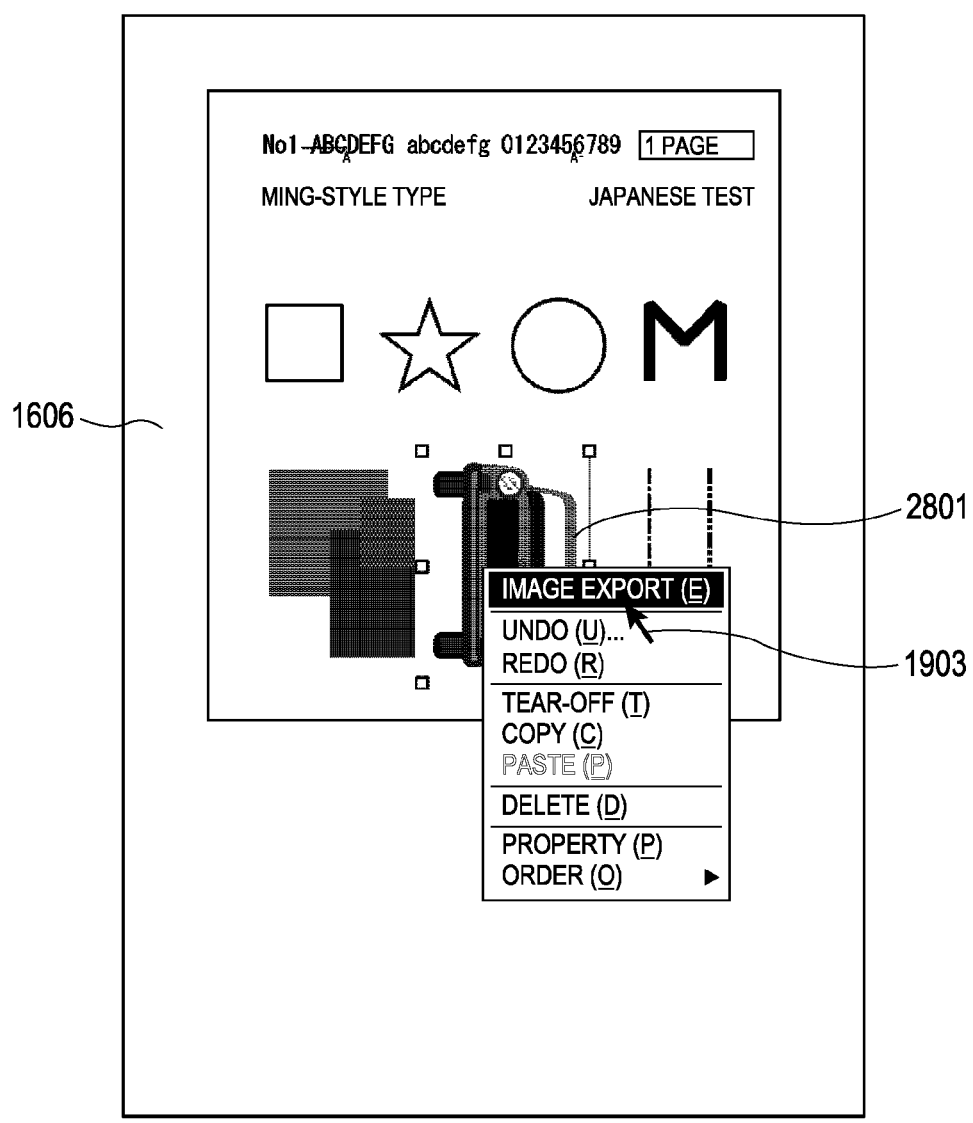
FIG. 28 shows an example of an image export menu in the image editing.
Figure 29:
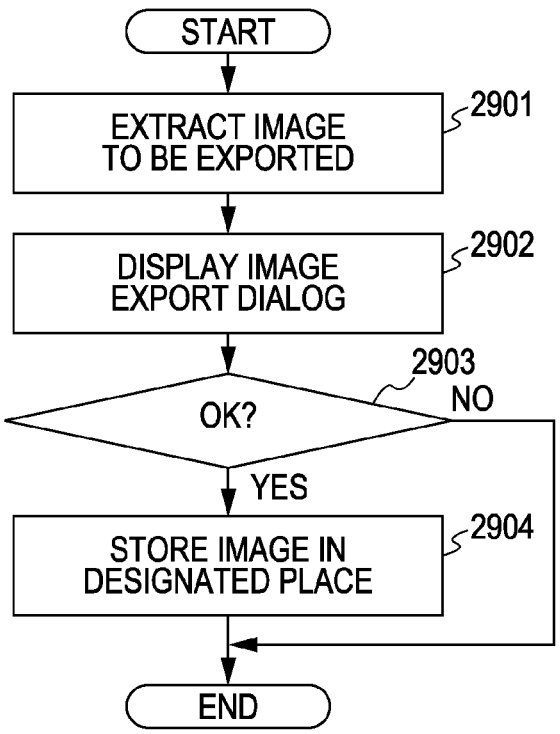
FIG. 29 is a flowchart showing procedures for image export.

The image export will be described below. FIG. 29 is an overall flowchart for the image export. The original editor first extracts an image to be exported (step 2901). Then, the original editor displays an image export dialog from, e.g., a popup menu (step 2902). The original editor prompts the user to input the export destination (place), the file name of the exported image, etc. and to confirm the input, followed by storing the image in the designated place (steps 2903-2904). FIG. 28 shows an example of the image export. More specifically, the image export is performed through the steps of selecting the image 2601 to be exported, displaying a popup menu 2801, and designating "IMAGE EXPORT" in the menu by the mouse pointer 1903. Upon the designation of "IMAGE EXPORT", the original editor displays the image export dialog. After accepting the export place and the image file name set in the displayed dialog, the original editor exports the image.

[Object Editing Function]

Figure 32:
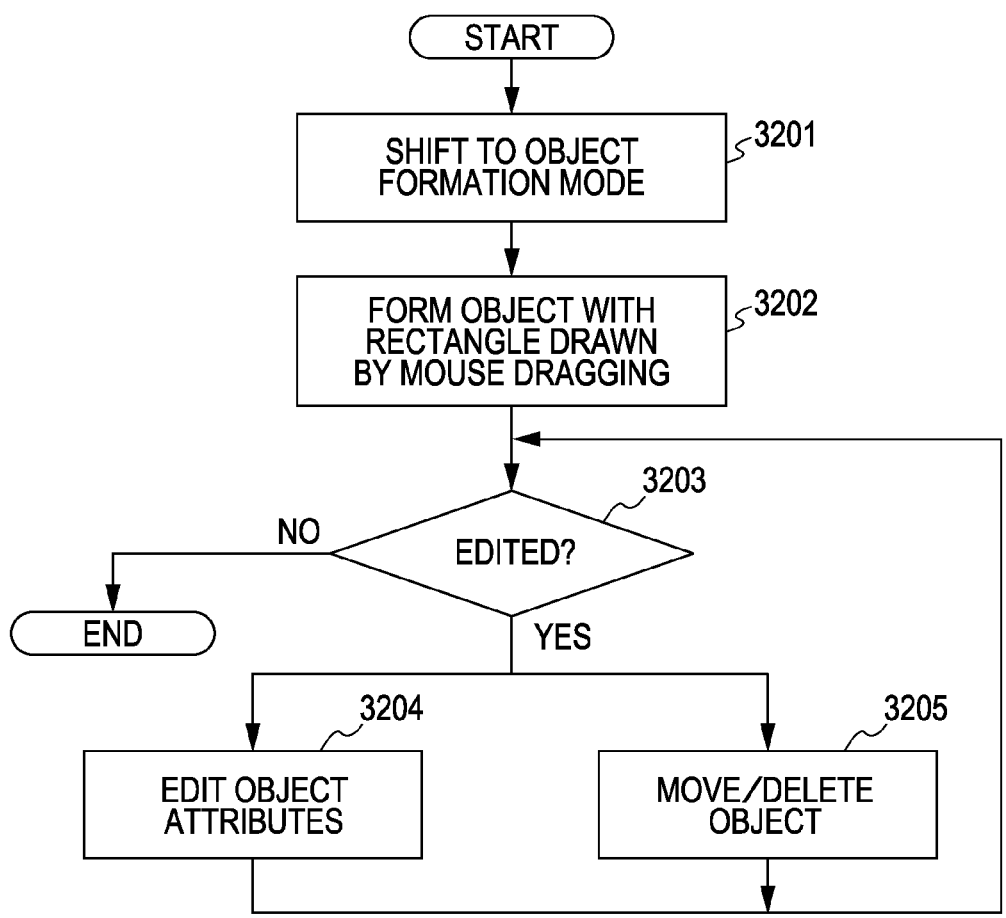
FIG. 32 is a flowchart showing an example of procedures for newly forming an object in the object editing.

The object editing function of the original editor will be described below. Object types include a rectangle, an oblong, a round rectangle, a linear line, autoshape, and other optional figures. The original editor can newly form and edit those objects. The original editor can also select and edit an object drawn in the original file. Since operations of newly forming and editing the object, including movement and deletion of the object and change of its attributes (such as color and line type), are known, a description thereof is omitted here. FIG. 32 is a flowchart for editing of the object. The original editor first shifts to an object formation mode (step 3201) and forms an object with a rectangle drawn with mouse dragging (step 3202). Then, the original editor executes editing operations (such as editing of attributes and movement and deletion of the object) on the formed object (steps 3203-3205). Thereafter, the editing is brought to an end. The procedures for newly forming an oblong will be described below as one example of the object editing function executed by the original editor.

Figure 30:
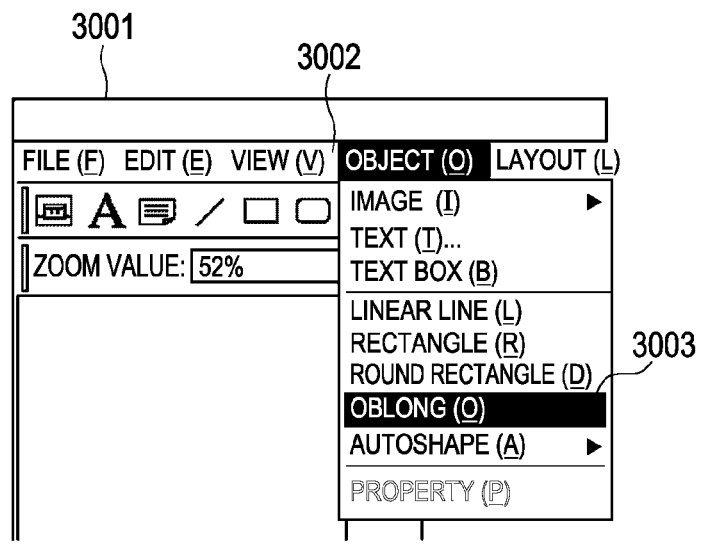
FIG. 30 shows an example of an ellipse forming menu in object editing.
Figure 31:
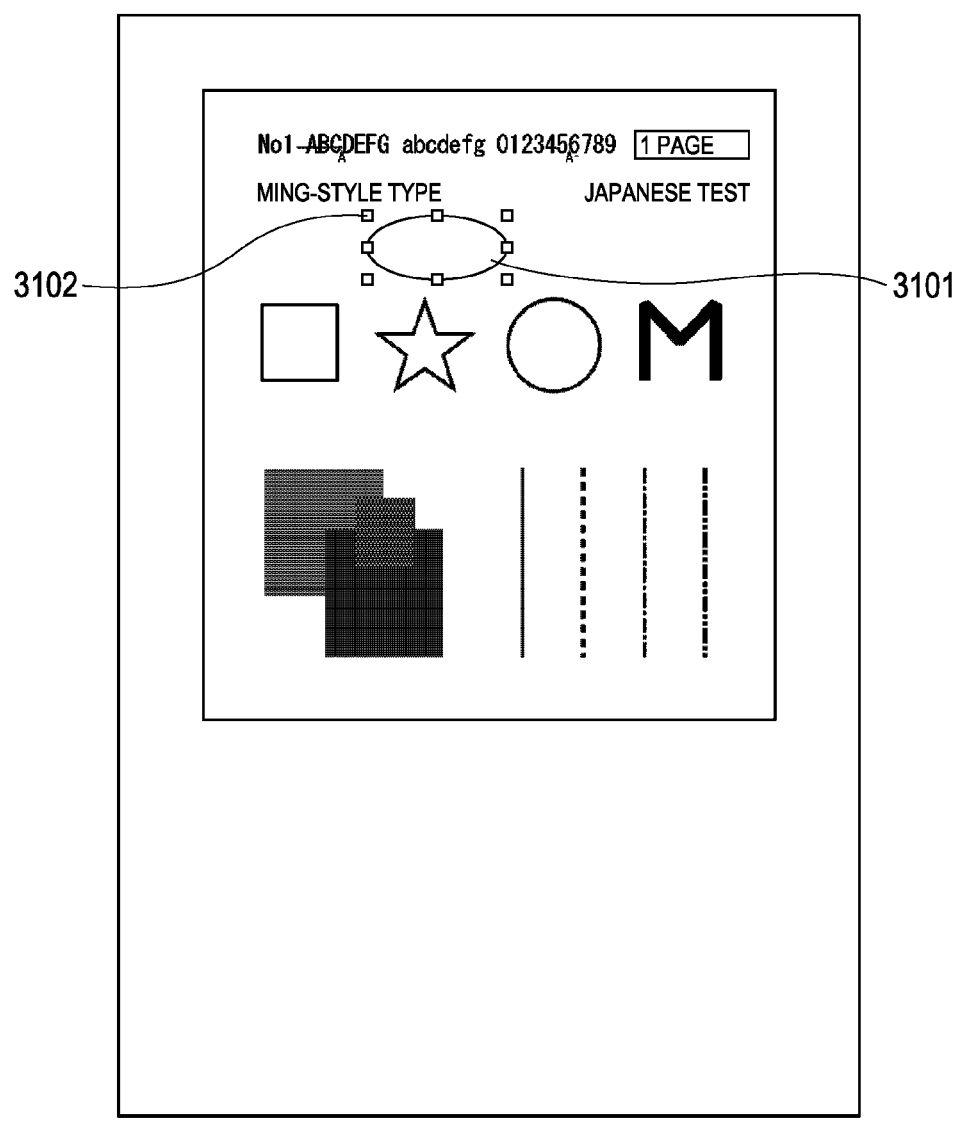
FIG. 31 is an illustration for explaining an example of formation of an ellipse in the object editing.

FIG. 30 shows an example of a UI screen for shifting to the mode of newly forming an oblong object. In FIG. 30, numeral 3001 indicates a screen displayed by the original editor, 3002 indicates a menu, and 3003 indicates an oblong formation mode shift menu. The original editor can form the oblong object by recognizing a process of selecting "OBLONG" 3003 on the oblong formation mode shift menu by the user, and by recognizing a process of moving the mouse on the original editor screen 3001. FIG. 31 shows an example of formation of the oblong object. When a formed oblong object 3101 is put into a selected state, control handles 3102 are displayed such that the user can recognize selection of the oblong object 3101.

[Overall Processing Steps]

Figure 33:
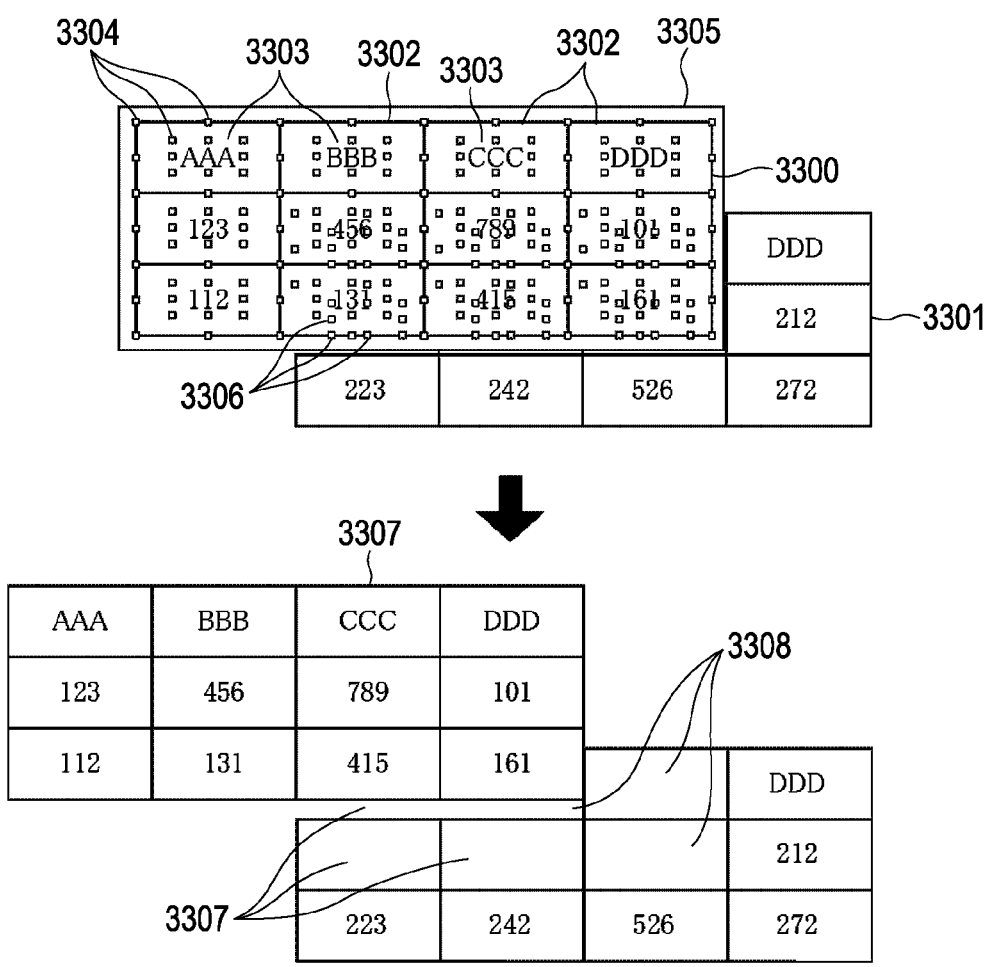
FIG. 33 is an explanatory view for explaining one example of problems to be solved by the present invention.
Figure 34:
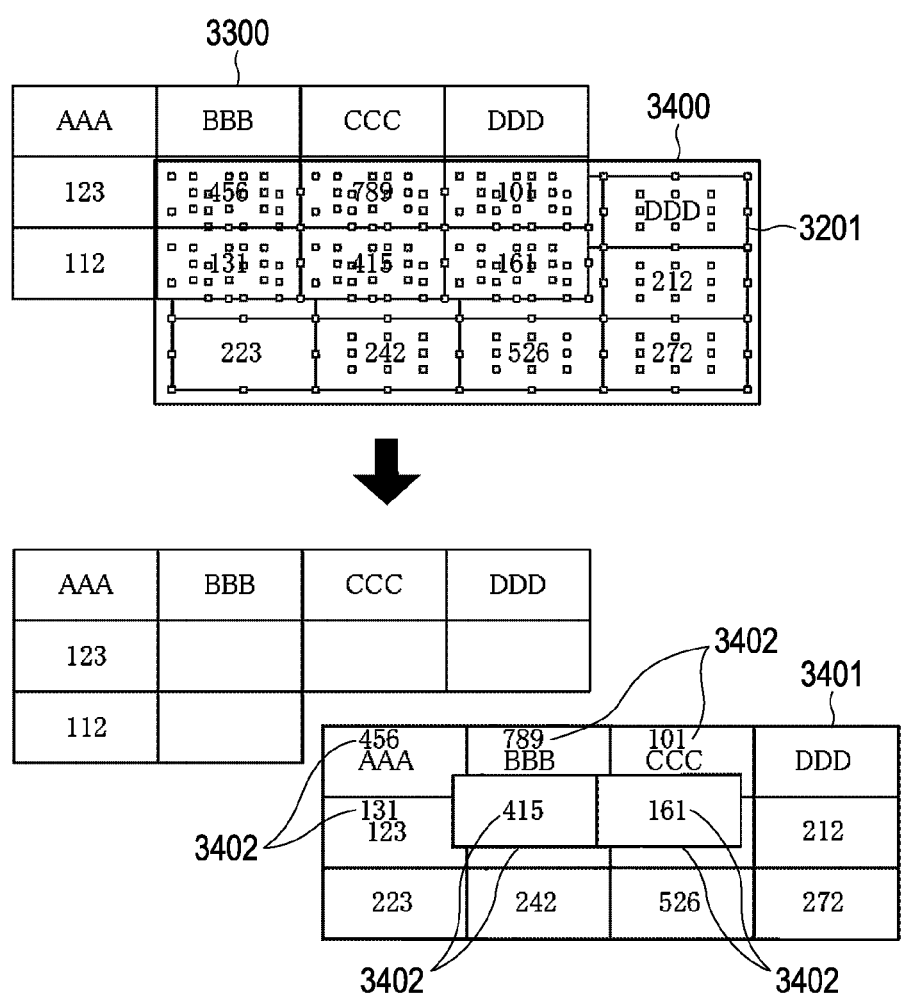
FIG. 34 is an explanatory view for explaining another example of problems to be solved by the present invention.

FIG. 34 shows one example of the problem to be solved by the present invention. As in FIG. 33, FIG. 34 shows a state where objects in the table format are overlapped with each other. It is also assumed that individual objects are the same as those shown in FIG. 33. In FIG. 34, a selection range 3400 is designated to select a table object group 3201 on the rear side. However, the selection range 3400 includes a part of a table object group 3300 arranged on the front side as well, which is not intended here as the selection target. Accordingly, when the user moves the table object group 3201 on the rear side as indicated by 3401, a drawing object 3402 as a part of the table object group 3300 arranged on the front side is also moved. In other words, the object selection method with the related art has the problem that, because objects falling within the selection range are all selected, the drawing object (3402 in FIG. 34) not intended by the user is also selected and subjected to the editing process. The present invention enables a user to easily select the desired object even in the case of the overlapping objects.

First Embodiment

Figure 35:
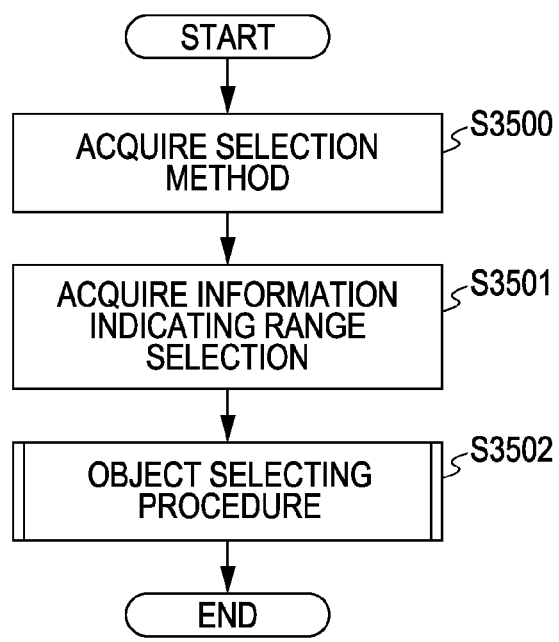
FIG. 35 is a flowchart showing overall processing in a first embodiment of the present invention.
Figure 39A:
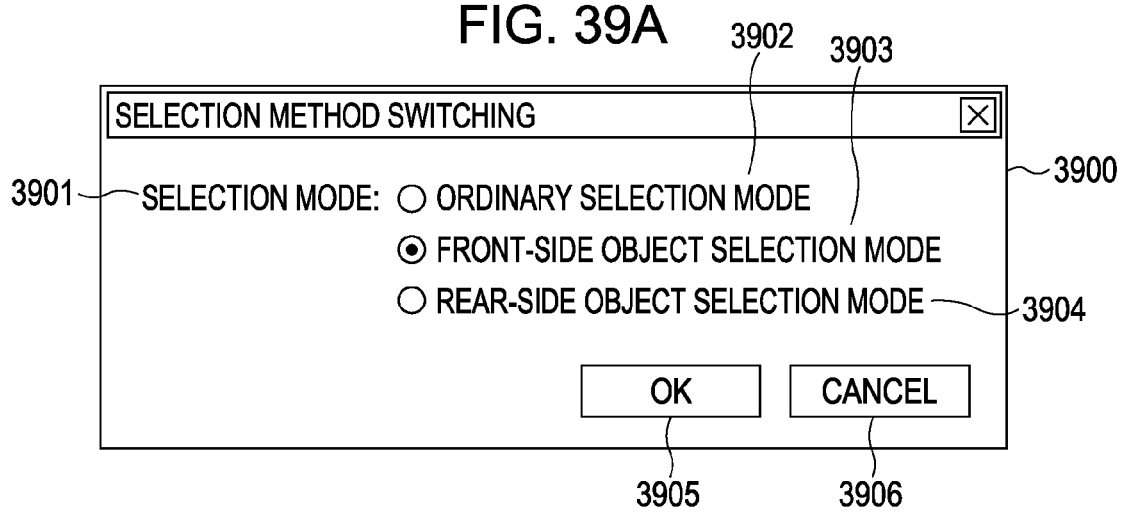
FIGS. 39A-39C show an example of a switching dialog UI (FIG. 39A) for designating switching of a selection method in the present invention, and examples of designation dialog UIs (FIGS. 39B and 39C) for designating a determination method.

FIG. 35 is a flowchart showing overall processing steps in a first embodiment of the present invention. The processing steps will be described below one by one. In step S3500, the bookbinding application 104 acquires a selection method. In this first embodiment, the selection method is acquired as one of the following: a first method in which the bookbinding application selects the object appearing on the front side; a second method in which the bookbinding application selects the object hidden on the rear side; and an ordinary selection method. The selection methods can be set in the bookbinding application by using a selection method switching dialog shown in FIG. 39A. In FIG. 39A, numeral 3900 indicates the selection method switching dialog. Numeral 3901 indicates a title for control of selecting one of the three selection methods. Numeral 3902 indicates the ordinary selection method when the present invention is not applied. Numeral 3903 indicates the selection method of selecting only the object appearing on the front side. Numeral 3904 indicates the selection method of selecting only the object hidden on the rear side. Control processes of the selection methods 3902-3904 have to be set in an exclusive relationship. If the control processes can be set in an exclusive relationship, those processes may be presented in other suitable formats instead of the radio button format shown in FIG. 39A. Numeral 3905 indicates an OK button for causing the selection, which is designated from among 3902-3904, to be applied to the system. Numeral 3906 indicates a cancel button for closing the dialog without applying the selection to the system. Thus, on the screen of FIG. 39A, the user can set the first selection method (3903) of selecting the drawing object laid out on the front side or the second selection method (3904) of selecting the drawing object laid out on the rear side. More specifically, when the first selection method 3903 is set, the bookbinding application 104 decides, as the selection target, the drawing object which has been determined as being laid out on the front side or top, without selecting, as the selection target, the drawing object which has been determined as being laid out on the rear side or bottom of one or more other drawing objects. On the other hand, when the second selection method 3904 is set, the bookbinding application 104 decides, as the selection target, the drawing object which has been determined as being laid out on the rear side or bottom of the other drawing objects.

Figure 38B:
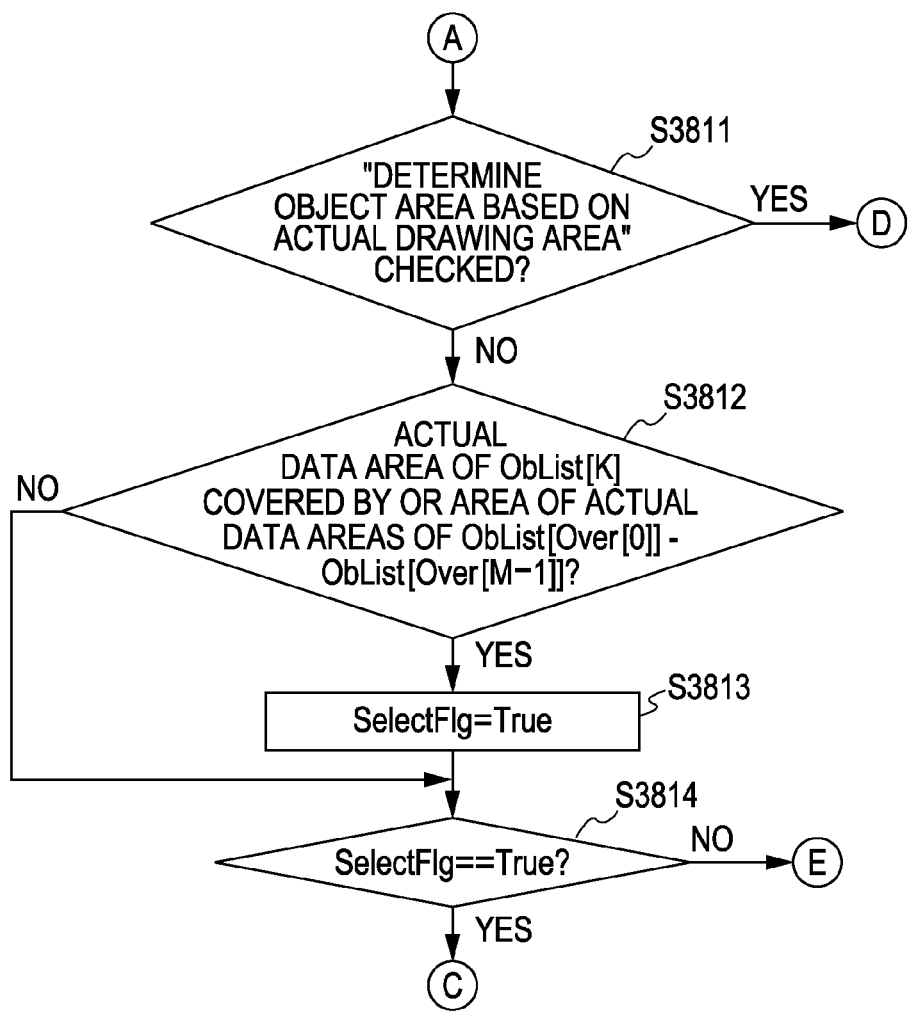
Figure 38C:
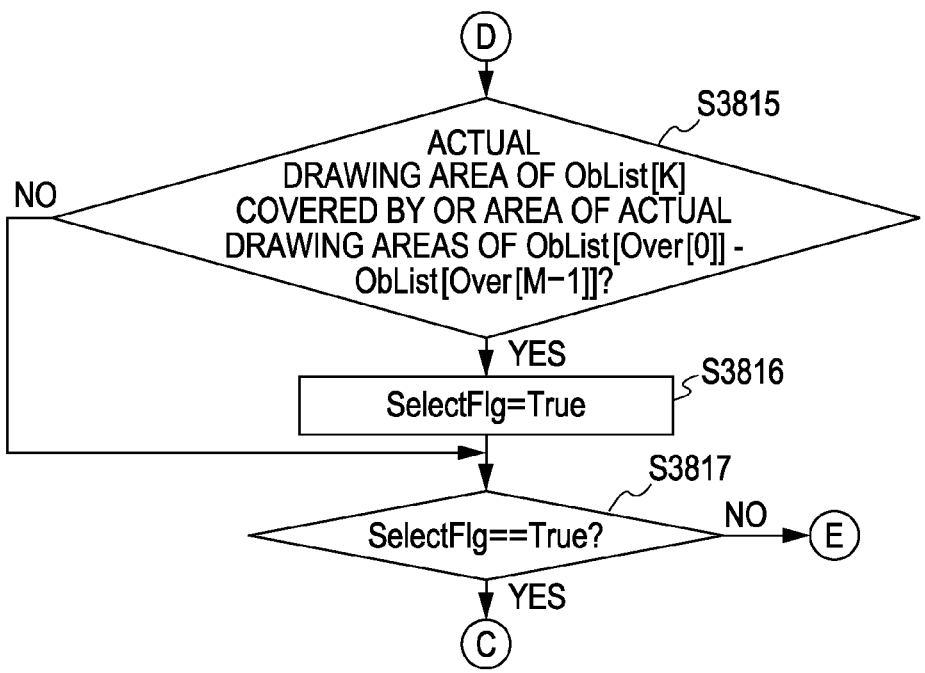
Figure 38D:
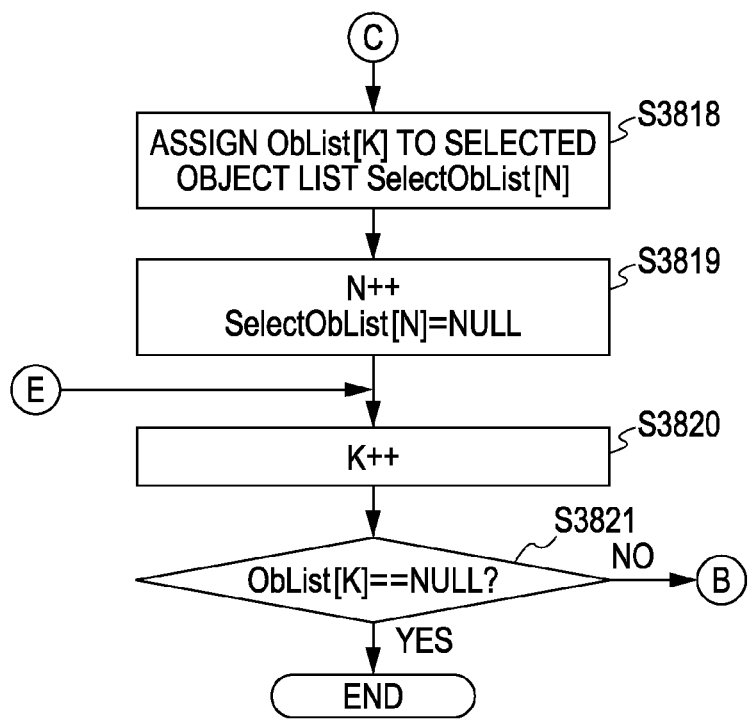
Figure 39B:
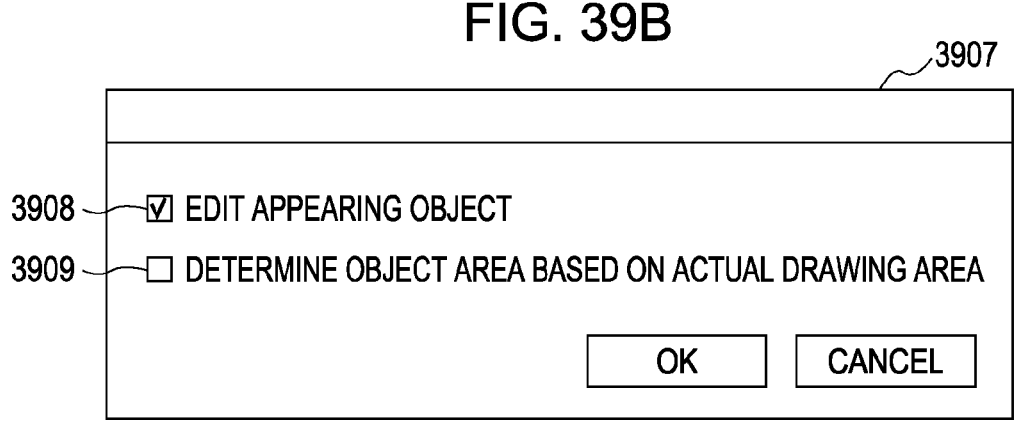
Figure 39C:
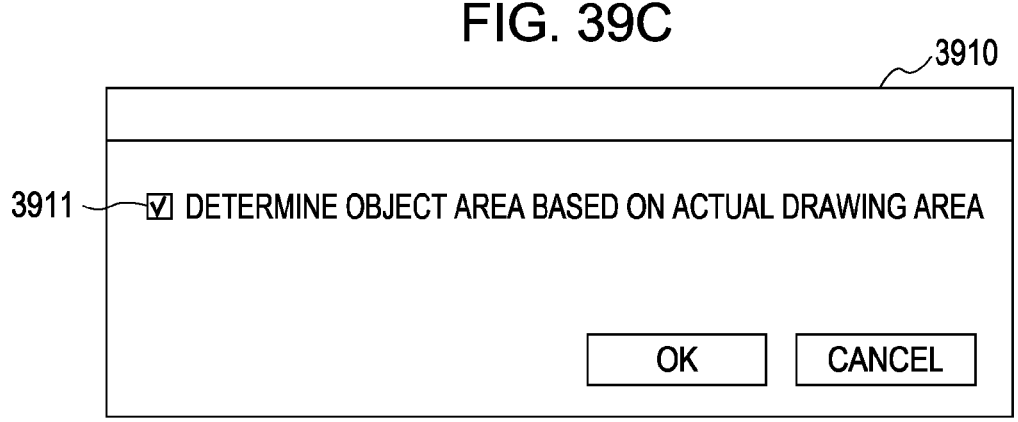

When the "FRONT-SIDE OBJECT SELECTION MODE" 3903 is selected and the OK button is depressed in FIG. 39A, a UI screen shown in FIG. 39B is displayed. On the UI screen of FIG. 39B, the user can select either "EDIT APPEARING OBJECT" 3908 or "DETERMINE OBJECT AREA BASED ON ACTUAL DRAWING AREA" 3909. Depending on the selection in FIG. 39B, processing steps executed with an overlapped state detecting procedure, shown in FIGS. 37A-37D, are changed. Details of the overlapped state detecting procedure will be described later with reference to FIGS. 37A-37D. On the other hand, when the "REAR-SIDE OBJECT SELECTION MODE" 3904 is selected and the OK button is depressed in FIG. 39A, a UI screen shown in FIG. 39C is displayed. Additionally, when "DETERMINE OBJECT AREA BASED ON ACTUAL DRAWING AREA" 3911 is selected on the UI screen of FIG. 39C, later-described processing steps shown in FIG. 38C are executed.

In step S3501, the bookbinding application 104 acquires information indicating that range selection has been made. The range selection can be made, for example, by the user drawing a rectangle with mouse dragging, as indicated by 3305 in FIG. 33, so that an object included in the drawn rectangle is put into a selected state. In step S3502, the bookbinding application 104 executes an object selecting procedure according to the present invention. Details of the object selecting procedure in S3502 will be described later with reference to FIGS. 36, 37A-37D and 38A-38D. When the predetermined object is put into the selected state by the bookbinding application 104 with the object selecting procedure, the overall processing steps of FIG. 35 are brought to an end. By executing the overall processing steps of FIG. 35 in such a way, the bookbinding application 104 enables only the desired object to be put into the selected state in accordance with the selection method and the determination method which are designated by the user.

[Object Table Forming Method]

Figure 49:
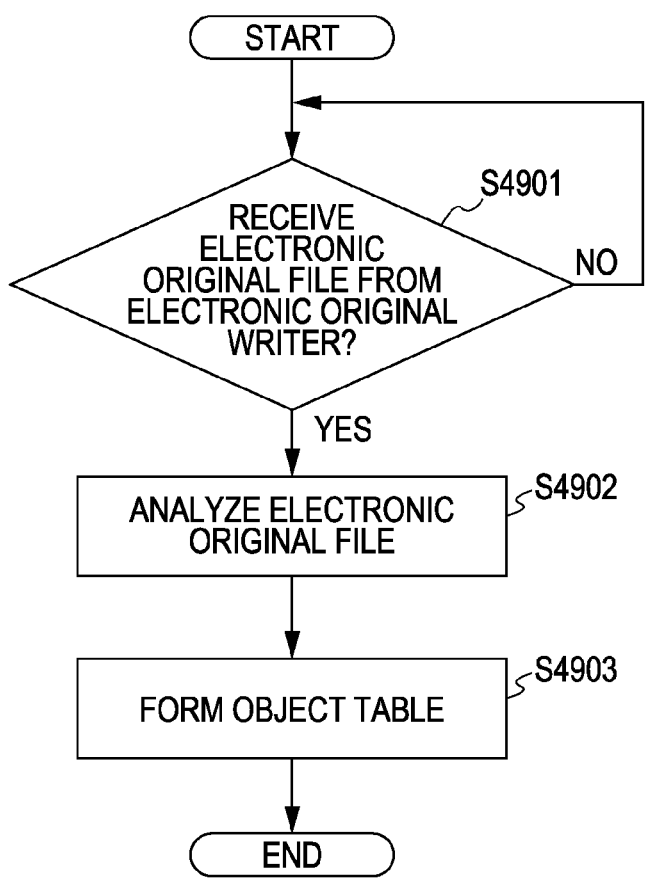
FIG. 49 is a flowchart for forming an object table in the present invention.

FIG. 49 is a flowchart for explaining a method of forming an object table which stores, for each object, information described later with reference to FIG. 44.

The bookbinding application 104 determines whether an electronic original file is received from the electronic original writer 102 (step S4901). The bookbinding application temporarily stores the received electronic original file in the RAM 202.

When the bookbinding application 104 receives the electronic original file from the electronic original writer 102, it analyzes the received electronic original file (step S4902). By analyzing the electronic original file, the bookbinding application acquires an actual drawing area per object, an actual data area per object, and display attribute information per object. Also, the bookbinding application can analyze the order in which respective objects have been formed, based on the order of descriptions of information regarding the object. In other words, the bookbinding application 104 analyzes such that object information, which is described at a position closer to the head of the electronic original file, represents an object which has been formed at an earlier time. The term "actual data area" means an area which is designated as a data area by the electronic original writer 102. For example, in the case of a rectangular drawing object one half of which is to be clipped and the other of which is to be displayed, the entirety of the rectangular drawing object is the actual data area. On the other hand, the term "actual drawing area" means an area which is actually displayed in a display section. For example, in the case of a rectangular drawing object one half of which is to be clipped and the other of which is to be displayed, an area left after removing the clipped area from the rectangular drawing object is the actual drawing area.

In accordance with the analysis result of the electronic original file, the bookbinding application 104 forms an object table shown in FIG. 44 (step S4903). The formed object table is stored in the RAM 202. By using the object table, the bookbinding application executes the overlapped state detecting procedure that will be described later with reference to FIGS. 37A-37D and 38A-38D.

[Object Selecting Procedure]

Figure 36:
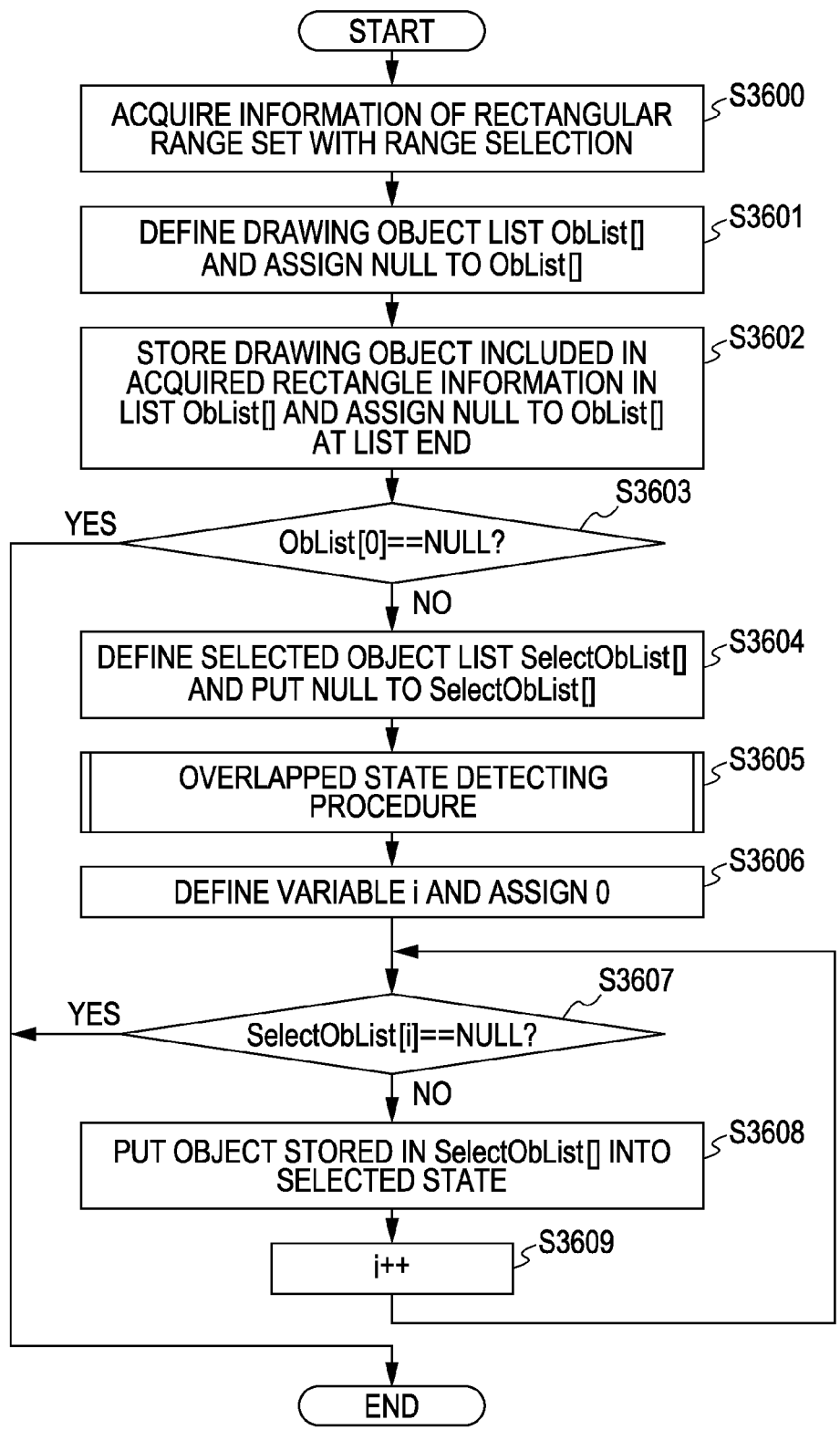
FIG. 36 is a flowchart showing in detail processing steps of an object selecting procedure in the first embodiment of the present invention.

FIG. 36 is a flowchart showing detailed processing steps of the object selecting procedure described above as the overall processing step S3502 in FIG. 35. The processing steps will be described below one by one.

The bookbinding application 104 acquires information (such as a position and a size) of a rectangle (rectangular area) set with range selection by the user (step S3600). More specifically, when the user performs mouse dragging, the range selection is executed. By recognizing the movement of the mouse, the CPU 201 recognizes the information of the rectangle set with the range selection and stores the rectangle information in the RAM 202. In step S3601, the bookbinding application 104 defines an object list ObList[ ] for storing information of an object drawn on a page and assigns NULL to ObList[0]. Thus, the step S3601 is an initialization process of ObList[ ]. In step S3602, the bookbinding application stores, in ObList[ ], the object which is drawn on the page and is included in the rectangle information acquired in step S3600. To that end, the bookbinding application determines whether the object drawn on the page is included in the rectangle information acquired in step S3600. Then, the bookbinding application stores the objects, which are included in the rectangle information, in ObList[ ] one by one. Further, the bookbinding application stores NULL, which indicates the end of an object list, in ObList[ ] at the list end. For example, when there are five objects included in the rectangle information, the bookbinding application stores information of five objects in ObList[0]-ObList[4] and further stores NULL in ObList[5]. In step S3603, the bookbinding application determines whether ObList[0] is equal to NULL. ObList[0] being equal to NULL means that no objects included in the rectangle information are present on the page. Accordingly, if the bookbinding application determines ObList[0]==NULL (i.e., that the object list [0] includes no object information), the processing steps of the object selecting procedure in FIG. 36 are brought to an end because an object to be selected is not present. On the other hand, if the bookbinding application determines ObList[0]!=0 (i.e., that the object list [0] includes the object information), it advances to step S3604. In addition, [!=0] is the same as [≠0]. In S3604, the bookbinding application defines a selected object list SelectObList[ ] for storing the object as a selection target, and assigns NULL to SelectObList[0]. Thus, the step S3604 is an initialization process of SelectObList[ ]. In step S3605, the bookbinding application executes the procedure for detecting the overlapped state of the objects. Details of the overlapped state detecting procedure will be described below with reference to FIGS. 37A-37D or 38A-38D. After completion of the overlapped state detecting procedure, the bookbinding application stores the information of the object, which is to be put into the selected state, in the selected object list SelectObList[ ]. In step S3606, the bookbinding application defines a variable i and assigns 0 to it. Thus, the step S3606 is an initialization process of the variable i. In step S3607, the bookbinding application determines whether the selected object list SelectObList[i] is equal to NULL. Stated another way, S3607 is a step in which the bookbinding application determines whether the object to be put into the selected state is present. If SelectObList[i] is determined as being equal to NULL in S3607, the bookbinding application recognizes that there are no drawing object to be put into the selected state, and then brings the processing of FIG. 36 to an end. Stated another way, if the bookbinding application determines SelectObList[i]==0, the processing of FIG. 36 is brought to an end because the object selecting process has been completed. If the system determines SelectObList[i] ≠0 (i.e., that the drawing object to be put into the selected state is present), the processing advances to step S3608. In S3608, the bookbinding application puts the object, which is stored in the selected object list SelectObList[i], into the selected state. After completion of the process of putting the object into the selected state, it advances to step S3609. In S3069, the bookbinding application increments the variable i. After completion of the incrementing process, it advances to step S3607. By repeating steps S3607-S3609, the bookbinding application puts all the objects stored in the selected object list SelectObList[ ] into the selected state. Thereafter, the processing steps of the object selecting procedure in FIG. 36 are brought to an end.

[Overlapped State Detecting Procedure]

FIGS. 37A-37D are flowcharts showing detailed processing steps of the overlapped state detecting procedure in S3605 of FIG. 36. Specifically, FIGS. 37A-37D show the processing executed when "FRONT-SIDE OBJECT SELECTION MODE" is set as the selection method in FIG. 39.

The bookbinding application 104 defines a variable N as indicating a selected object list for display, and assigns 0 to it (step S3700). In other words, the bookbinding application determines that the object assigned to the variable N is the selection target. Then, the bookbinding application defines a variable K as indicating an object which serves as a reference for detecting the overlapped state, and assigns 0 to it (step S3701). Thus, in the case of FIG. 37, the bookbinding application determines whether there is an object which is overlapped with the object corresponding to the variable K and which is arranged on the front side of the object corresponding to the variable K.

Figure 43A:
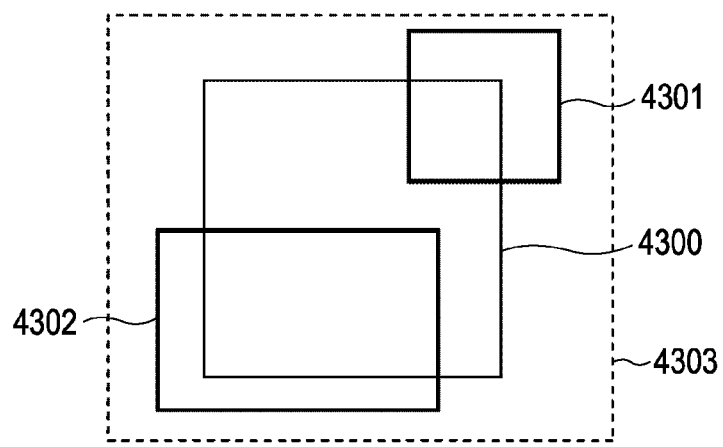
FIGS. 43A and 43B show one example of the object selection result in the present invention.

The bookbinding application 104 defines a list Over[ ] for managing the ID number of an object arranged on the front side, and assigns NULL to Over[0] (step S3702). Then, the bookbinding application defines a variable J as indicating an object to be determined. In other words, the bookbinding application determines the overlapped state between the object corresponding to variable J and the object corresponding to the variable K. Further, the bookbinding application defines a variable M as indicating an object overlapped with and arranged on the front side of the object, which corresponds to the variable K and serves as the reference for the detection of the overlapped state. Then, the bookbinding application assigns 0 to each of the variables J and M (step S3703). The bookbinding application determines whether the variable K and the variable J are equal to each other (step S3704). If the bookbinding application determines that the variable K and the variable J are equal to each other, there is no need of determining the overlapped state because the object serving as the reference for the detection of the overlapped state and the object set as the target of the overlap determination are the same. Therefore, the bookbinding application advances to step S3708. On the other hand, if the bookbinding application determines that the variable K and the variable J are not equal to each other, it advances to step S3705. In S3705, the bookbinding application determines the overlapped state between the object ObList[J] and the reference object ObList[K] (step S3705). To that end, the bookbinding application determines whether the actual data area of the object ObList[J] is overlapped with the actual data area of the object ObList[K] and is positioned on the front side of the latter. When the display order of ObList[J] is positioned closer to the top than ObList[K] and the actual data area of ObList[J] overlaps with a part of the actual data area of ObList[K], the bookbinding application determines that both the objects are in the overlapped state (S3705—Yes). The actual data area of each object is managed using an object table shown in FIG. 44. One example of the overlapped state of objects is shown in FIG. 43A. In FIG. 43A, numerals 4300, 4301 and 4302 indicate rectangle objects. Those objects are overlapped such that the object 4300 is positioned at the bottom and the objects 4301 and 4302 are positioned over 4300. Numeral 4303 indicates a rectangular area designated as the selection range by the user. When ObList[K] in step S3705 is the rectangle object 4300, the rectangle objects 4301 and 4302 are determined as being overlapped with the rectangle object 4300 in step S3705 because their actual data areas are overlapped with the actual data area of the rectangle object 4300 on the front side thereof.

If the bookbinding application 104 determines in S3705 that the objects are overlapped with each other, it advances to step S3706. In S3706, the bookbinding application assigns J to a management list Over[M] for managing the object in the overlapped state. In step S3707, the bookbinding application increments the variable M and assigns NULL to Over[M]. Then, the bookbinding application increments the variable J that indicates the object as the overlap determination target (step S3708). The bookbinding application determines whether the object ObList[J] is equal to NULL (step S3709). If the bookbinding application determines ObList[J] ==NULL (S3709—Yes), it advances to step S3710. If the system determines ObList[J] as being not equal to NULL, it advances to step S3704. By repeating S3704-S3709, the management number of each object, which has been determined as being overlapped with ObList[K] on the front side thereof is stored in Over[ ].

The bookbinding application 104 defines a selection flag SelectFlg used to finally determine the overlapped state of the object. The bookbinding application assigns, as an initial value, True to the selection flag SelectFlg set for the reference object (step S3710).

The bookbinding application 104 determines whether "DETERMINE OBJECT AREA BASED ON ACTUAL DRAWING AREA" 3909 is checked on the UI screen of FIG. 39B (step S3711). Since the check result in FIG. 39B is temporarily stored in the RAM 202, the bookbinding application can determine the presence of check by referring to the RAM 202. If the bookbinding application determines that "DETERMINE OBJECT AREA BASED ON ACTUAL DRAWING AREA" 3909 is checked, it advances to step S3719, and if no check is determined, it advances to step S3712.

The bookbinding application 104 determines based on the actual data area whether the object ObList[K] is completely hidden behind one or more objects positioned on the front side of the former (step S3712). In other words, the bookbinding application determines whether the actual data area of the drawing object is included in the actual data area of other drawing objects. As a result, the bookbinding application determines whether, for each drawing object, that drawing object is laid out on the rear side of the other drawing objects. More specifically, the bookbinding application stores, in Over[ ], the management number of each object positioned on the front side of the object ObList[K]. The bookbinding application obtains an OR area of the respective actual data areas of the objects ObList[Over[0]]–ObList[Over[M–1]] and determines whether the OR area completely covers the actual data area of the reference object ObList[K]. If the bookbinding application determines that ObList[K] is completely covered by the objects positioned on the front side, the reference object ObList[K] is recognized as an object not appearing on the front side. Because the actual data area of each object is stored in the object table shown in FIG. 44, the bookbinding application can execute the process of S3712 by referring to the object table.

In the case of FIGS. 37A-37D, the hidden object is excluded from the selection target. Therefore, if the reference object is determined as being hidden in step S3712, the bookbinding application sets False to the selection flag SelectFlg (step S3713). On the other hand, if the bookbinding application determines that ObList[K] is not completely covered by the front-side objects, it advances to step S3718.

After the process of S3713, the bookbinding application 104 determines whether "EDIT APPEARING OBJECT" 3908 is set on the UI screen of FIG. 39B (step S3714). If the determination result is Yes (S3714-Yes), the bookbinding application determines, based on the information of the objects ObList[Over[0]]–ObList[Over[M–1]], whether there is an object having the paint-out attribute set to "NO" or "TRANSPARENT COLOR" (step S3715). Because the paint-out attribute of each object is stored as display attribute information as shown in FIG. 44, the bookbinding application can make the determination of S3715 by referring to the object table shown in FIG. 44.

The bookbinding application 104 deletes, from ObList [Over[0]]–ObList[Over[M–1]], the object having been determined in step S3715 as an object for which the paint-out attribute set to "NO" or "TRANSPARENT COLOR". Then, the bookbinding application compares the actual data areas of ObList[Over[0]]–ObList[Over[M–1]], from which the object having the paint-out attribute set to "NO" or "TRANSPARENT COLOR" has been excluded, with the actual data area of ObList[K]. Based on the comparison result, it determines whether the reference object ObList[K] is hidden (step S3716). In other words, based on the actual data area information of each drawing object and the display attribute information of each drawing object, the bookbinding application determines whether, for each drawing object, that drawing object is laid out on the rear side of other drawing objects.

If the bookbinding application determines in S3716 that the object ObList[K] is hidden, it advances to step S3718. On the other hand, if the bookbinding application determines that the object ObList[K] is not hidden, it sets True to the selection flag SelectFlg (step S3717). Stated another way, when particular display attribute information is set to a second drawing object positioned on the front side of a first drawing object which has been determined as being laid out on the rear side of one or more other drawing objects, the bookbinding application determines that the first drawing object is not laid out on the rear side. The particular display attribute information means, as described above, that the paint-out is not set or the paint-out color is set to be transparent.

The following description is made of the process when the bookbinding application 104 determines in S3711 that "DETERMINE OBJECT AREA BASED ON ACTUAL DRAWING AREA" 3909 is checked.

The bookbinding application 104 determines whether the actual drawing area of the object ObList[K] is completely covered by the actual drawing area of one or more objects positioned on the front side of the former (step S3719). Because both the actual drawing data and the actual data area of each object are stored in the object table shown in FIG. 44, the bookbinding application can execute the process of S3719 by referring to the object table. Thus, with the process of S3712 or S3719, the bookbinding application determines, based on the overlapped state of plural drawing objects included in the designated selection range, whether, for each drawing object, that drawing object is laid out on the rear side of other drawing objects.

If the bookbinding application determines in S3719 that the actual drawing area of the object ObList[K] is hidden, the bookbinding application sets the selection flag SelectFlg=False for the object ObList[K] (step S3720).

On the other hand, if the bookbinding application determines that ObList[K] is not completely covered by the actual drawing areas of the front-side objects, it advances to step S3725. The process of S3725 is the same as that of S3718.

After the process of S3720, the bookbinding application 104 determines whether "EDIT APPEARING OBJECT" 3908 is set on the UI screen of FIG. 39B (step S3721). If the determination result is Yes, the bookbinding application executes a determination process (S3722) which is the same as S3715. Based on the determination result of S3722, the bookbinding application executes a similar process (S3723) to that of S3716. The process of S3723 differs from S3716 in that the comparison is made in S3723 based on the actual drawing area, while the comparison is made in S3716 based on the actual data area.

If the bookbinding application determines in S3723 that the actual drawing area of ObList[K] is hidden, it advances to step S3725. On the other hand, if the bookbinding application determines that the actual drawing area of ObList[K] is not hidden, it sets True to the selection flag SelectFlg (step S3724). Note that the processing from S3721 to S3724 is similar to the processing from S3714 to S3717.

Then, the bookbinding application 104 assigns ObList [K] to the selection object list SelectObList[N] (step S3726). Further, it increments the variable N and assigns NULL to the selection object list SelectObList[N] (step S3727). In other words, the bookbinding application always stores NULL at the end of the selection object list SelectObList[ ]. After the assignment of NULL, the bookbinding application increments the variable K (step S3728). Then, the bookbinding application determines whether the object list ObList[K] is equal to NULL (step S3729). If the object list ObList[K] is not equal to NULL, this means the presence of the object for which the detection of the overlapped state is to be executed. Accordingly, the bookbinding application returns to step S3703 to repeat the above-described processing. On the other hand, if the object list ObList[K] is equal to NULL (S3728—Yes), this means that the overlapped state detecting procedure is completed. Therefore, the flowcharts of FIGS. 37A-37D come to an end.

Figure 37B:
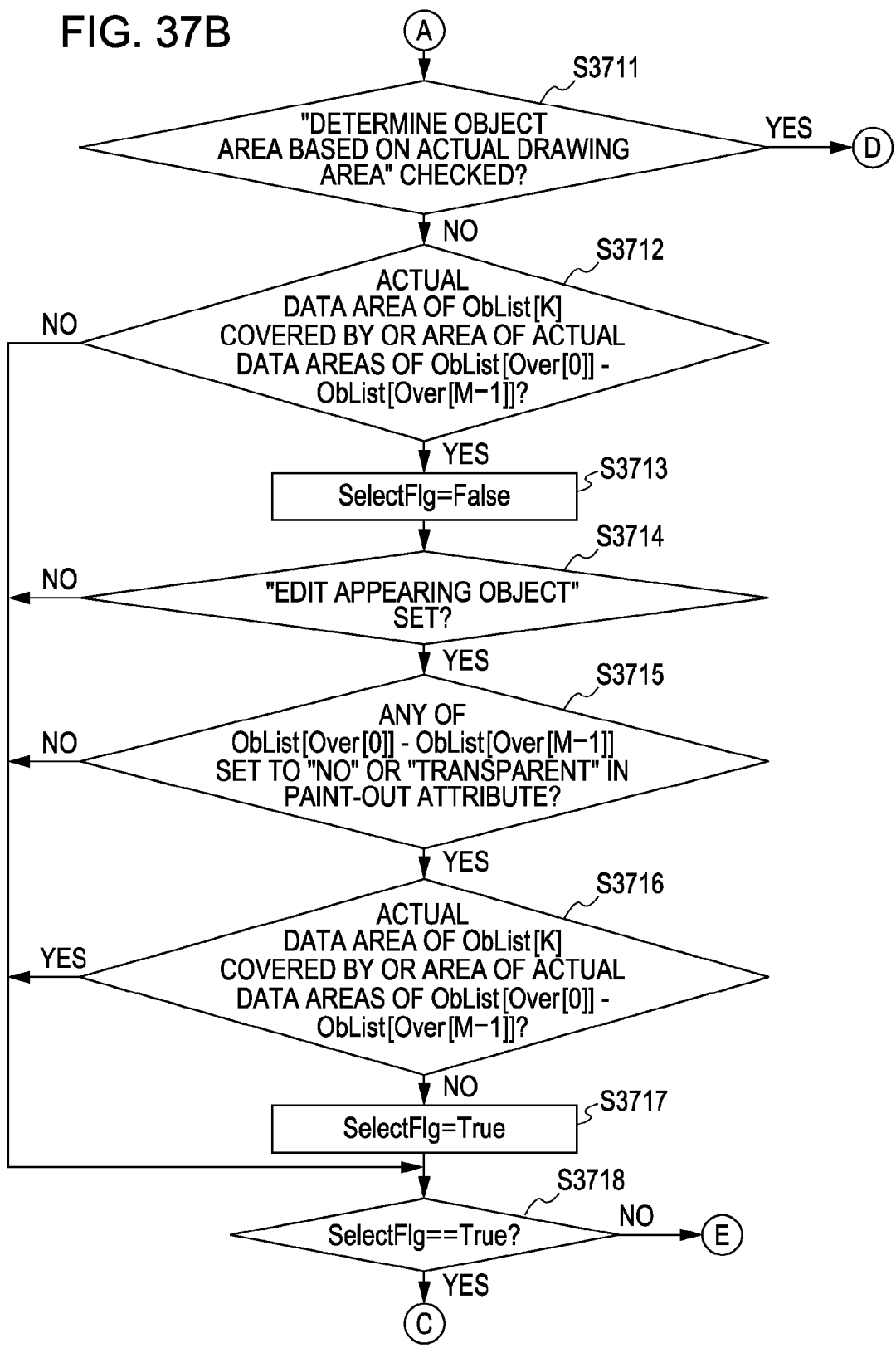
Figure 37D:
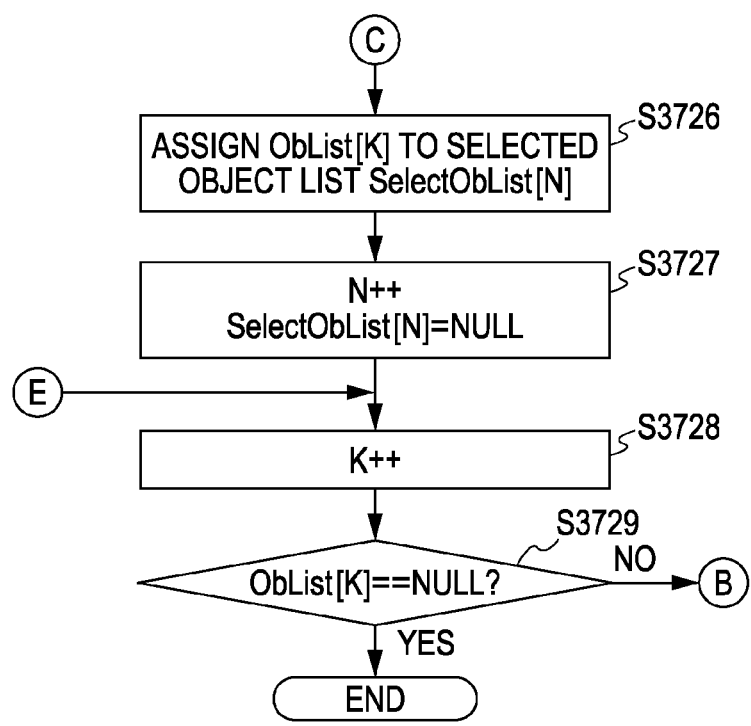

By executing the processing steps of FIGS. 37A-37D as described above, the bookbinding application 104 adds, to the selected object list, the reference object for which "True" is set to the selection flag. As a result, the object to be displayed is set as the selection object. Also, by determining the overlapped state of the objects based on the actual drawing area as shown in FIG. 37C, this embodiment is also adapted for, e.g., the case where the objects are overlapped in actual data, but they are not overlapped in display as a result of trimming (e.g., drawing objects 4008 and 4006 in FIG. 41 are overlapped in actual data as indicated by broken lines, but their actual drawing areas are not overlapped as indicated by solid lines). Even in such a case, by executing the processing of FIG. 37C, it is possible to determine the overlapped state, taking into account the result of, e.g., trimming. Thus, with the flowcharts of FIGS. 37A-37D, the bookbinding application 104 is able to decide, as the selection target, the drawing object which has been determined as being laid out on the front side of the other drawing objects, without setting, as the selection target, the drawing object which has been determined as being laid out on the rear side of the other drawing objects.

Figure 43B:
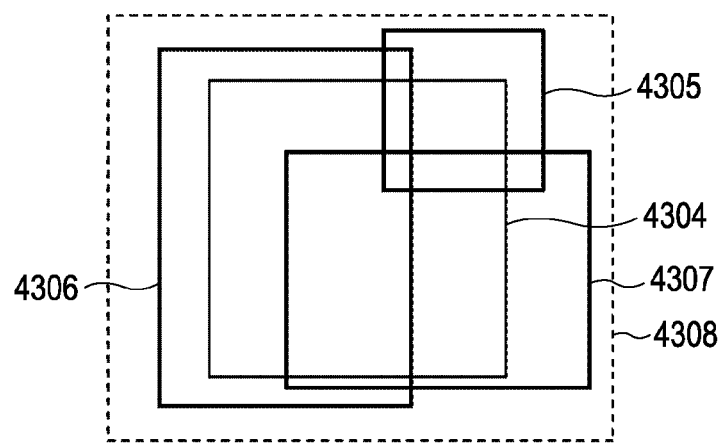

The process of S3712 in FIG. 37B will be described in more detail below with reference to FIGS. 43A and 43B. In FIG. 43A, it is assumed that rectangle objects 4301, 4302 and 4300 are displayed in this order from the front side. Namely, the rectangle object 4300 is positioned on the rearmost side. Also, in FIG. 43B, it is assumed that rectangle objects 4307, 4306, 4305 and 4304 are displayed in this order from the front side. Namely, the rectangle object 4304 is positioned on the rearmost side. In the case of FIG. 43A, ObList[K] corresponds to the rectangle object 4300 and ObList[Over[0]]–ObList[Over[M−1]] correspond to the rectangle objects 4301 and 4302. On that condition, an OR area of the actual data areas of the rectangle objects 4301 and 4302 does not completely cover the actual data area of the rectangle object 4300. In the case of FIG. 43A, therefore, the bookbinding application 104 determines in S3712 that the rectangle object 4300 is not hidden (S3712—No). Meanwhile, in the case of FIG. 43B, ObList[K] corresponds to the rectangle object 4304 and ObList[Over[0]]–ObList[Over[M−1]] correspond to the rectangle objects 4305, 4306 and 4307. On that condition, an OR area of the actual data areas of the rectangle objects 4305, 4306 and 4307 completely covers the actual data area of the rectangle object 4304. Therefore, the bookbinding application 104 determines that ObList[K] is covered by the group of objects ObList[Over[0]]–ObList[Over[M−1]].

Further, the user can select "EDIT APPEARING OBJECT" 3908 shown in FIG. 39B. In such a case, when the user designates the selection range 4308 as shown in FIG. 43B, the bookbinding application 104 determines that the reference object 4304 is covered by the group of other objects. However, if at least one of the rectangle objects 4305-4307 has the paint-out attribute set to "TRANSPARENT COLOR" or "NO", this means that a part of the reference object appears on display. In that case, therefore, the rectangle object 4304 becomes the selection target. Thus, the bookbinding application can decide, as the selection target, the object which is determined as being hidden on the rear side in terms of the display order, but which is displayed so as to appear on the screen.

FIGS. 38A-38D will be described below. FIGS. 38A-38D are flowcharts showing detailed processing steps of the overlapped state detecting procedure in S3605 of FIG. 36. More specifically, FIGS. 38A-38D show the processing executed when the selection method is set to the "REAR-SIDE OBJECT SELECTION MODE" 3904. The following description is made of the processing steps of FIGS. 38A-38D with regards to only steps differing from those in FIG. 37A-37D. Since the processing steps S3800-S3809 execute the same processing as S3700-S3709 in FIG. 37A, a description of those steps is omitted here.

The bookbinding application 104 defines a selection flag SelectFlg and assigns False to the flag SelectFlg (step S3810).

The processing steps S3811 and S3812 are similar to S3711 and S3712. If the bookbinding application 104 determines with the process of S3812 that the reference object is hidden on the rear side, True is set to the selection flag SelectFlg (step S3813). The process of S3815 is similar to that of S3719. If the bookbinding application determines with the process of S3815 that the actual drawing area of the reference object is hidden, True is set to the selection flag SelectFlg (step S3817). Steps S3818-S3820 execute similar processing to that in S3726-S3729. In the case of FIGS. 38A-38D, the bookbinding application decides, as the selection object, the drawing object which has been determined as being laid out on the rear side of the other drawing objects.

By executing the processing of FIGS. 38A-38D, it is possible, for example, to easily select and erase a group of drawing objects hidden on the rear side together. The drawing objects hidden on the rear side are not displayed, but their data remains, thus resulting in the disadvantage that the amount of drawing data is increased in total. By executing the processing of FIGS. 38A-38D in such a case, the drawing objects hidden on the rear side and not displayed can be easily selected and erased together. Thus, since it is possible to easily erase the objects which are not displayed and are considered by the user to be erased, the data amount can be reduced and more efficient processing can be realized.

FIGS. 40-42 are illustrations for explaining application examples of the present invention. FIG. 42B shows an example in which the determination method is not particularly designated. FIG. 40C shows the selection result when the "FRONT-SIDE OBJECT SELECTION MODE" is set and the determination method is set to "EDIT APPEARING OBJECT". FIG. 40D shows an example in which the determination method is set to "DETERMINE OBJECT AREA BASED ON ACTUAL DRAWING AREA". The examples shown in those figures will be described below.

Figure 40A:
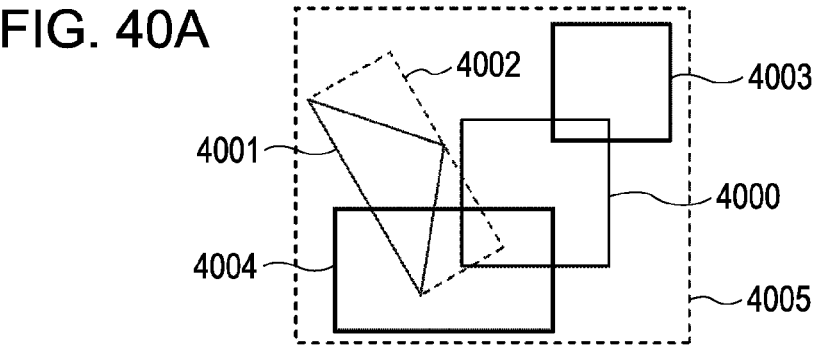
FIGS. 40A-40D show one example of the object selection result in the present invention.
Figure 40B:
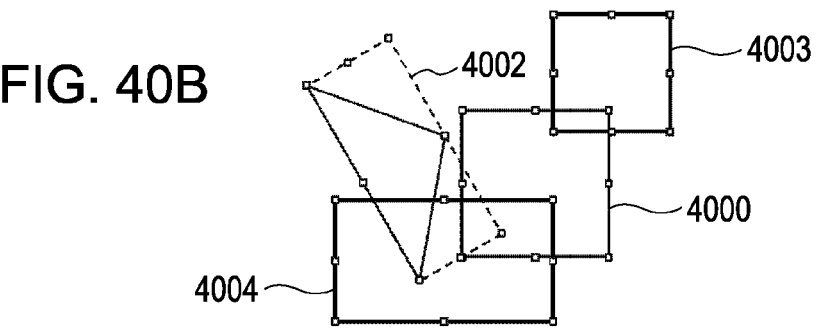
Figure 40C:
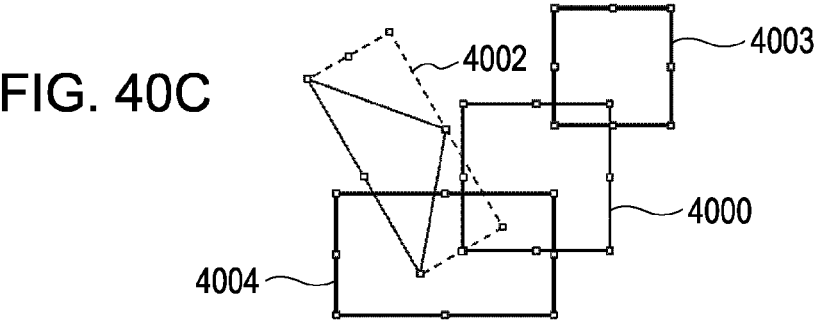
Figure 40D:
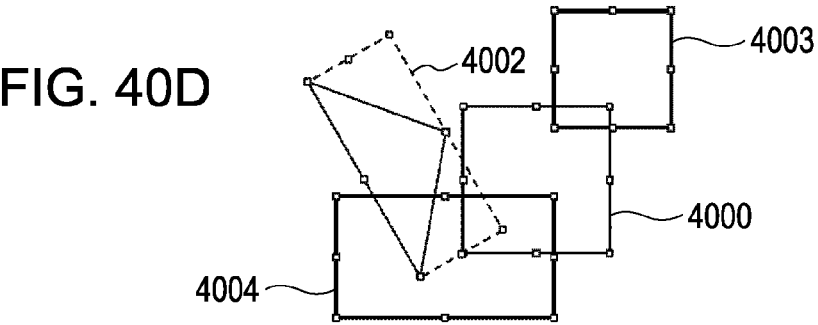

Numerals 4000, 4003 and 4004 in FIG. 40A indicate rectangle objects. Numeral 4001 indicates a rotated triangle object, and 4002 indicates the actual data area of the triangle object 4001. Numeral 4001 also represents the actual drawing area of the triangle object. A broken line 4005 indicates a rectangular range set with the range selection by the user. Because the range-selection rectangle 4005 is set as a range including all the actual data areas of the laid-out objects, there is a possibility that the laid-out objects are all selected. Further, the rectangle objects 4003 and 4004 are positioned over both the rectangle object 4000 and the triangle object 4001 while overlapping with them. In FIG. 40B representing the case where the selection method is set to the "ORDINARY SELECTION MODE", all the objects 4000 and 4002-4004 become the selection targets in the illustrated layout example. Also, in FIGS. 40C and 40D, the actual data/drawing area of any object is not completely covered by the other objects overlapping with the relevant object on the front side thereof. Therefore, all the objects are put into the selected state.

Figure 41A:
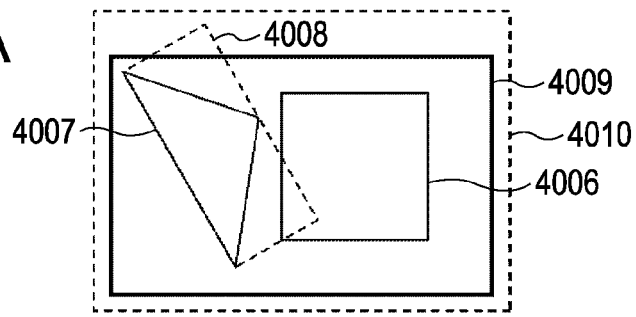
FIGS. 41A-41D show one example of the object selection result in the present invention.
Figure 41B:
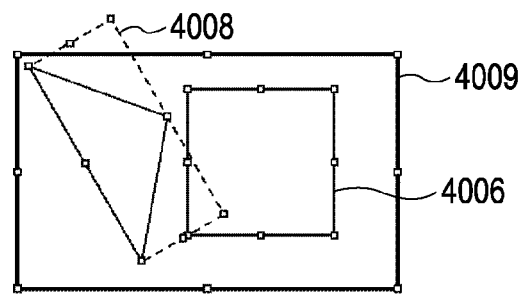
Figure 41C:
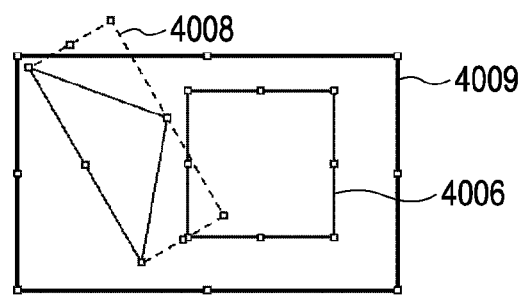

Numerals 4006 and 4009 in FIG. 41A indicate rectangle objects. Numeral 4007 indicates a rotated triangle object, and 4008 indicates the actual data area of the triangle object 4007. Numeral 4007 also represents the actual drawing area of the triangle object. A broken line 4010 indicates a rectangular range set with the range selection by the user. Because the range-selection rectangle 4010 is set as a range including all the actual data areas of the laid-out objects, there is a possibility that the laid-out objects are all selected. Further, the rectangle object 4009 is positioned over both the rectangle object 4006 and the triangle object 4007 while overlapping with them. In addition, it is assumed that the paint-out attribute of the rectangle object 4009 is set to "NO". Thus, in the example of FIGS. 41A-41D, although the objects 4006, 4007 and 4009 are displayed in terms of display on the screen, the objects 4006 and 4007 are included in the actual data area and the actual drawing area of the object 4009. FIG. 41B represents the case where the selection method is set to the "ORDINARY SELECTION MODE". In this case, all the objects included in the selection range 4010 become the selection targets. Accordingly, the objects 4006, 4008 and 4009 are put into the selected state and selection handles indicating the selected state are displayed. FIG. 41C represents the case where the "FRONT-SIDE OBJECT SELECTION MODE" is set and the determination method is set to "EDIT APPEARING OBJECT". In the illustrated layout example, the actual data area of the rectangle object 4006 is completely covered by the actual data area of the rectangle object 4009. Therefore, the rectangle object 4006 is not the front-side object and it does not become the selection target. However, since the paint-out attribute of the rectangle object 4009 is set to "NO", the rectangle object 4006 is displayed so as to appear on the screen. Consequently, the bookbinding application 104 determines that the rectangle object 4006 is also the selection target, and decides the objects 4006, 4007 and 4009 as the selection targets.

Figure 41D:
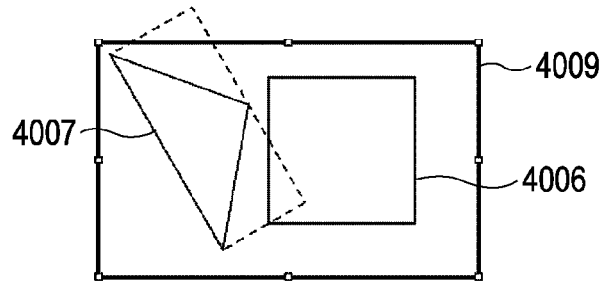

FIG. 41D represents the case where the "FRONT-SIDE OBJECT SELECTION MODE" is set and the determination method is set to "DETERMINE OBJECT AREA BASED ON ACTUAL DRAWING AREA". In the illustrated layout example, the actual drawing areas of both the rectangle object 4006 and the triangle object 4007 are completely covered by the actual drawing area of the rectangle object 4009. Therefore, only the rectangle object 4009 is the selection target and the selection handles indicating the selected state are displayed for the rectangle object 4009 alone.

Figure 42A:
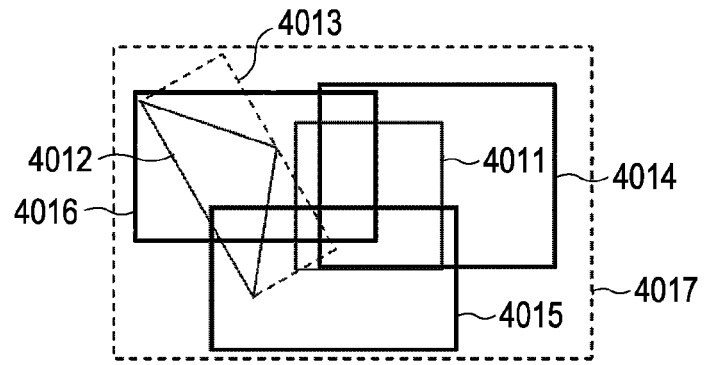
FIGS. 42A-42D show one example of the object selection result in the present invention.
Figure 42B:
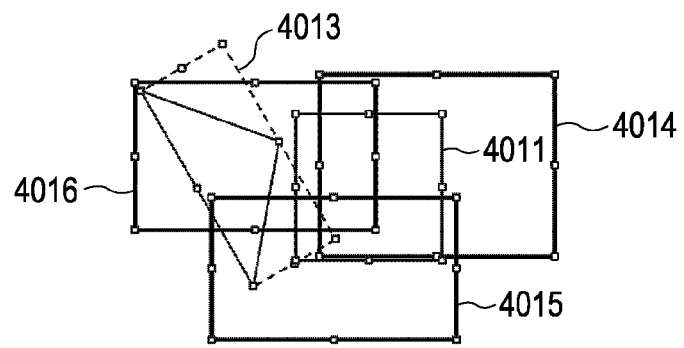
Figure 42C:
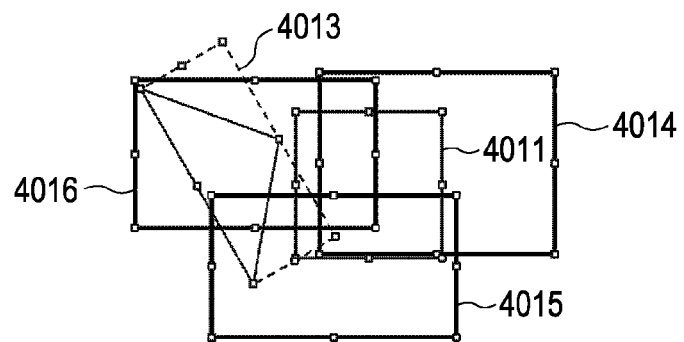
Figure 42D:
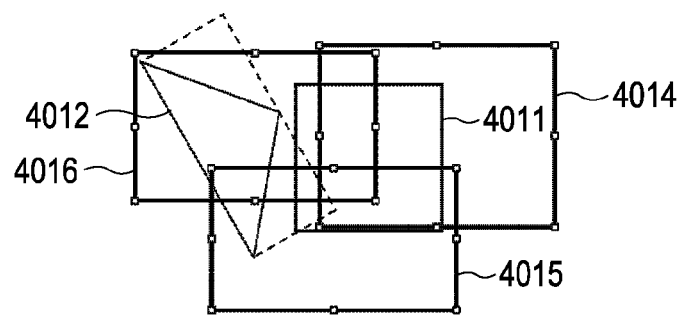

Numerals 4011, 4014, 4015 and 4016 in FIG. 42A indicate rectangle objects. Numeral 4012 indicates a rotated triangle object, and 4013 indicates the actual data area of the triangle object 4012. Numeral 4012 also represents the actual drawing area of the triangle object. Numeral 4017 indicates a rectangular range set with the range selection by the user. Because the rectangular selection range 4017 is set as a range including all the actual data areas of the laid-out objects, there is a possibility that the laid-out objects are all selected. Further, the rectangle objects 4014, 4015 and 4016 are positioned over both the rectangle object 4011 and the triangle object 4012 while overlapping with them. In addition, it is assumed that the paint-out attribute of each of the rectangle objects 4014, 4015 and 4016 is set to "NO". FIG. 42B represents the case where the selection method is set to the "ORDINARY SELECTION MODE". In this case, the bookbinding application 104 determine that the objects (4011 and 4013-4016) included in the selection range 4017 are all the selection targets. FIG. 42C shows the selection result when the "FRONT-SIDE OBJECT SELECTION MODE" is set and the determination method is set to "EDIT APPEARING OBJECT". In this case, the bookbinding application determines that the actual data area of the rectangle object 4011 is completely covered by the actual data areas of the rectangle objects 4014, 4015 and 4016. However, since the paint-out attribute of each of the rectangle objects 4014, 4015 and 4016 is set to "NO", the bookbinding application determines that there are no objects covering the rectangle object 4011. Consequently, the rectangle object 4011 is also decided as the selection target. FIG. 42D represents the case where the "FRONT-SIDE OBJECT SELECTION MODE" is set and the determination method is set to "DETERMINE OBJECT AREA BASED ON ACTUAL DRAWING AREA". In the illustrated layout example, the actual drawing areas of both the rectangle object 4011 and the triangle object 4012 are completely covered by the actual drawing areas of the rectangle objects 4014, 4015 and 4016. Therefore, the bookbinding application decides that the rectangle object 4011 and the triangle object 4012 are objects not qualified for the selection target.

The detailed processing executed upon selection of the "FRONT-SIDE OBJECT SELECTION MODE" in FIG. 39 will be described below with reference to FIGS. 37A-37D, 41A-41D and 44. FIG. 44 is an object table for holding the drawing information of the objects 4006, 4007 and 4009 shown in FIGS. 41A-41D, the drawing information being stored in the RAM 202.

As shown in FIG. 44, the object table holds the information regarding the actual drawing area, the actual data area, the display attribute, and the order of formation for each object. While this embodiment uses, as the object information, three items of information shown in FIG. 44, other suitable items, e.g., color attribute information per object, may also be stored. The term "order of formation" means the order in which the object have been formed, and the order is defined such that the object having a smaller number is positioned nearer to the rearmost side. In the example of FIG. 44, more specifically, the object 4007 is arranged under the object 4009, and the object 4006 is arranged under the objects 4009 and 4007.

In steps S3700-S3704 of FIG. 37A, the bookbinding application 104 executes preparations for the determination process. It is assumed in the following description that the objects 4006, 4007 and 4009 are selected in this order. Therefore, the first reference object is 4006. In step S3705, the bookbinding application determines whether the object 4007 is positioned on the front side of the object 4006 and is overlapped with it. The bookbinding application can realize the determination process of S3705 by referring to the object information shown in FIG. 44. In other words, because the bookbinding application can recognize, based on the object table of FIG. 44, that the object 4007 is positioned on the front side of the object 4006 and has the actual data area overlapped with that of the object 4006, the determination result Yes is obtained in S3705. Accordingly, the bookbinding application sets the comparison target object 4007 as Over[0]=object 4007.

Then, the bookbinding application 104 increments the comparison target object in step S3708 and compares the object 4009 with the object 4006. Similarly to the above-described process of S3705, the bookbinding application can determine, based on the object table of FIG. 44, that the objects 4009 is positioned on the front side of the object 4006 and is overlapped with it. As a result, the bookbinding application sets the comparison target object 4009 as Over[1]=object 4009 and sets the selection flag "True" for the reference object 4006.

Then, the bookbinding application 104 determines in step S3711 whether "DETERMINE OBJECT AREA BASED ON ACTUAL DRAWING AREA" in FIG. 39 is set. The description is continued here on an assumption that "DETERMINE OBJECT AREA BASED ON ACTUAL DRAWING AREA" is not set.

In step S3712, the bookbinding application 104 calculates an OR area of the actual data areas of the objects which have been extracted as objects arranged on the front side of the reference object. In this example, the objects 4007 and 4009 are extracted as the objects arranged on the front side of the reference object. Therefore, the bookbinding application specifies the OR area formed by the actual data areas of both the rectangle objects 4007 and 4009 by using the object information shown in FIG. 44. Also, in step S3712, the bookbinding application determines whether the reference object 4006 is covered by the OR area formed by the objects 4007 and 4009 which have been determined as being positioned on the front side of the reference object 4006 and as having the actual data areas overlapped with that of the reference object 4006. In this embodiment, the bookbinding application sets "True" to the selection flag for the selection-target object. Because of the determination that the reference object 4006 is covered by the OR area formed by the objects 4007 and 4009, the reference object 4006 is excluded from the selection target and "False" is set to the selection flag. By repeating the above-described processing for all the objects, the bookbinding application can specify the objects to be selected.

Then, the bookbinding application 104 determines in step S3714 whether "EDIT APPEARING OBJECT" in FIG. 39 is selected. The description is continued here on an assumption that "EDIT APPEARING OBJECT" is selected. As seen from FIG. 44, the display attributes of the rectangle object 4007 is set to "NO PAINT-OUT", and the display attributes of the rectangle object 4009 is set to "TRANSPARENT". Accordingly, the bookbinding application handles, as not-existing objects, the rectangle objects 4007 and 4009 which have been extracted as objects arranged on the front side of the reference object. Hence the rectangle objects 4007 and 4009 are deleted from Over[ ]. Thereafter, the bookbinding application determines again whether the actual data area of the reference object is covered by the actual data areas of the other objects (step S3716). Since the rectangle objects 4007 and 4009 (which have been extracted as the overlapping objects through the flowcharts of FIGS. 41A-41D) are now deleted, there are no objects concealing the reference object 4006. Accordingly, the bookbinding application 104 sets "True" to the selection flag for the reference object 4006 (step S3717).

By repeating the above-described processing for all the drawing objects included in the selection range, the bookbinding application 104 decides the drawing objects to be set as the selection targets.

While the overlapped state of the objects is determined by using the object table of FIG. 44 in this embodiment, the overlapped state may be determined by other methods. One example of the other methods is as follows. The bookbinding application 104 calculates a circumscribed rectangular area of the reference object currently selected, and also calculates a circumscribed rectangular area of another object positioned on the front side of the reference object. By comparing the circumscribed rectangular areas of both the objects, the bookbinding application determines whether the circumscribed rectangular area of the reference object has a portion not overlapping with that of another object. If the presence of the not-overlapping portion is determined, an area indicating the not-overlapping portion is held. As a result of executing such comparison for all the objects positioned on the front side of the reference object, if the area indicating the not-overlapping portion is blank, the reference object is determined as not appearing in display on the screen, and if that area is not blank, the reference object is determined as appearing in display on the screen. Thus, in the case of the "FRONT-SIDE OBJECT SELECTION MODE" in FIG. 39 being selected, if the area indicating the not-overlapping portion of the currently selected reference object is not blank, that reference object is selected. On the other hand, when the "REAR-SIDE OBJECT SELECTION MODE" is selected, the bookbinding application sets, as the selection target, the reference object for which the area indicating the not-overlapping portion is blank.

Second Embodiment

[Overall Processing Steps]

Figure 45:
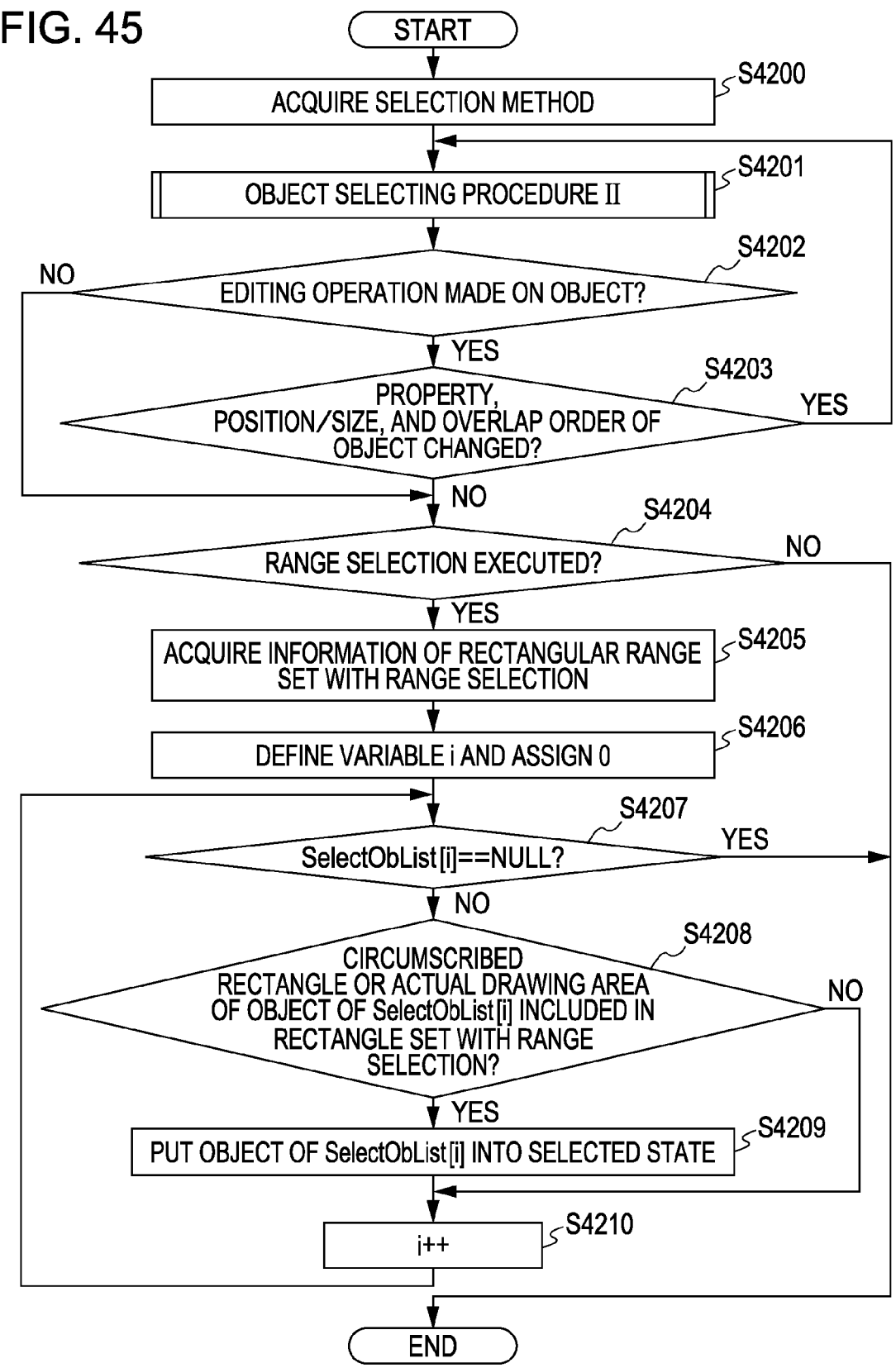
FIG. 45 is a flowchart showing overall processing in a second embodiment of the present invention.

FIG. 45 is a flowchart showing overall processing steps in a second embodiment of the present invention. The second embodiment differs from the first embodiment in that the bookbinding application 104 previously extracts, from among objects existing on an entire page, those ones which are qualified for the selection target. Thereafter, when the user executes the range selection, the extracted objects are set as determination targets. The processing steps of FIG. 45 will be described below. In step S4200, the bookbinding application acquires the selection method. The process of S4200 is similar to that of S3500 in FIG. 35 related to the first embodiment. Then, the bookbinding application executes the object selecting procedure according to the present invention (step S4201). Because the object selecting procedure in this second embodiment differs from that described in the first embodiment, it is referred to as "object selecting procedure II" hereinafter. The object selecting procedure II will be described in detail later. The bookbinding application checks whether editing operations have been executed on objects laid out on the page by the user (step S4202). As described above with reference to FIG. 44, the object information of each object is held in the RAM 202. By comparing the current object information of each object with the object information of the same object which is held in the RAM 202 as shown in FIG. 44, the bookbinding application determines that the editing operations have been executed, if the object information is changed.

The bookbinding application 104 determines whether the editing operations executed on the object include change in any of property, position/size, and overlap order (step S4203). If any of the editing operations shown in S4203 is executed, there is a possibility that the object set as the selection target is changed. This means that if the bookbinding application determines that any of the editing operations shown in S4203 has been executed, the object selecting procedure has to be executed again. Accordingly, if the bookbinding application determines in S4203 that any of property, position/size, and overlap order has been executed, it advances to step S4201. If the other editing operations are executed, it advances to step S4204. The editing operations determined in S4203 are not limited to the above-described examples. If any of editing operations is executed which may cause change of the selection target object having been selected with the object selecting procedure in S4201, the bookbinding application also returns to S4201.

In step S4204, the bookbinding application 104 determines whether the range selection has been made by the user. If the bookbinding application determines that the range selection has been made, it advances to step S4205. If the bookbinding application determines that the range selection has not been made, the processing steps according to the present invention are no longer applied and therefore the entire processing flow of FIG. 45 is brought to an end.

Each of the determination steps S4202, S4203 and S4204 is branched depending on an operation event applied from the user. Therefore, the bookbinding application 104 can execute each of those determination steps by recognizing the event applied from the user. In step S4205, the bookbinding application acquires the information (such as position and size) of a rectangle set with the range selection by the user. In step S4206, the bookbinding application defines a variable i and assigns 0 to it. After initialization of the variable i, it advances to step S4207. In S4207, the bookbinding application determines whether the selected object list SelectObList[i] ==NULL is satisfied. If SelectObList[i]==NULL is determined, this means that the process of putting the object into the selected state is completed. Accordingly, the overall processing flow of FIG. 45 is brought to an end. If SelectObList[i]≠NULL is determined, this means that the process of putting the object into the selected state is not yet completed. Accordingly, the bookbinding application advances to step S4208. The bookbinding application determines whether the actual data area (circumscribed rectangle) or the actual drawing area of the selected object of SelectObList[i] is completely included in the range-selection rectangle (step S4208). If the bookbinding application determines that the actual data area or the actual drawing area of the selected object of SelectObList[i] is completely included in the range-selection rectangle (step S4208—Yes), the bookbinding application puts the relevant object into the selected state (step S4209). On the other hand, if the bookbinding application determines that the actual data area or the actual drawing area of the selected object of SelectObList[i] is not completely included in the range-selection rectangle, the bookbinding application excludes the selected object from the selection target. Then, the bookbinding application increments the selected object list SelectObList[i] without putting the selected object into the selected state (step S4210). By repeating steps S4207-S4210, the bookbinding application executes the process of putting each object, which is qualified for the selection target, into the selected state. Thus, by executing the overall processing steps of FIG. 45, the bookbinding application can put only the desired object into the selected state in accordance with the selection method and the determination method which are designated by the user.

[Object Selecting Procedure II]

Figure 46:
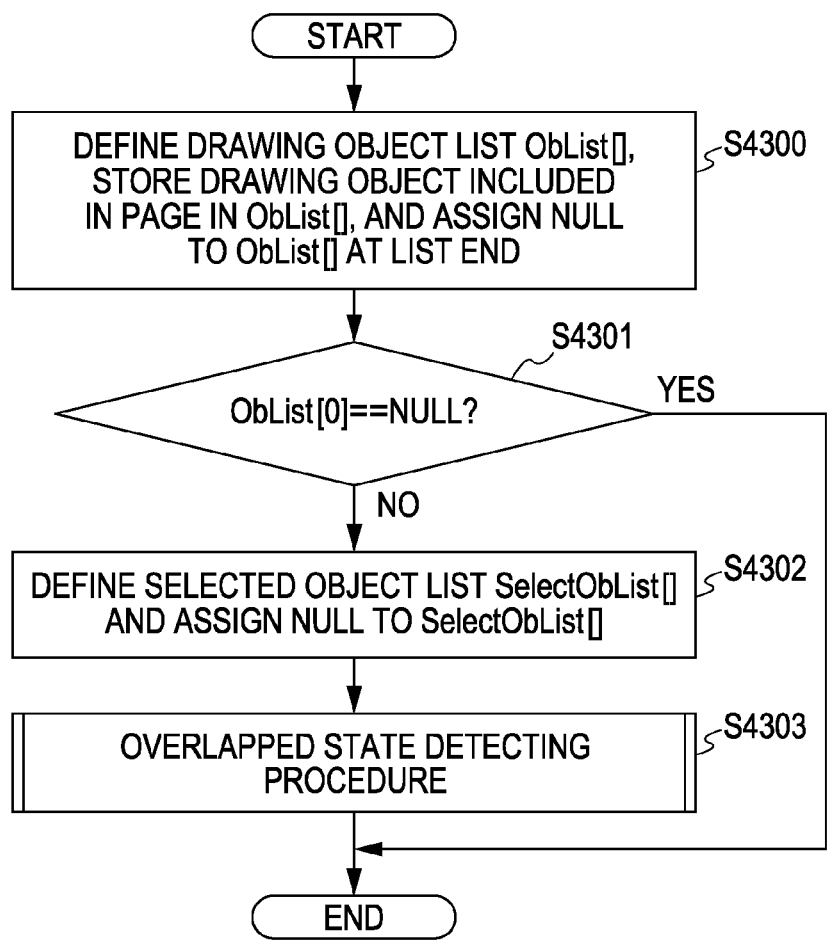
FIG. 46 is a flowchart executed with an object selecting procedure II in the second embodiment of the present invention.

FIG. 46 is a flowchart showing detailed processing steps of the object selecting procedure II executed in S4201 of FIG. 45. The detailed processing steps will be described next. In step S4300, the bookbinding application 104 defines the drawing object list ObList[ ] and stores all objects existing on a page in ObList[ ] in sequence. Also, the bookbinding application stores NULL in ObList[ ] at the list end after storing all the objects existing on the page. In step S4301, the bookbinding application determines whether ObList[0]==NULL is satisfied. If ObList[0]==NULL is satisfied, this means that there is no object existing on the page. Therefore, the processing flow of FIG. 46 is brought to an end. If ObList[0]==NULL is not satisfied, the bookbinding application advances to step S4302. In S4302, the bookbinding application defines the selected object list SelectObList[ ] and assigns NULL to SelectObList[0]. After initialization of the selected object list SelectObList[ ], it advances to step S4303. In S4303, the bookbinding application executes the overlapped state detecting procedure for each object. Since the processing flow of the overlapped state detecting procedure in S4303 is the same as that described above with reference to FIGS. 37A-37D and 38A-38D in the first embodiment, a description thereof is omitted here.

Third Embodiment

[Overall Processing Steps]

Figure 47:
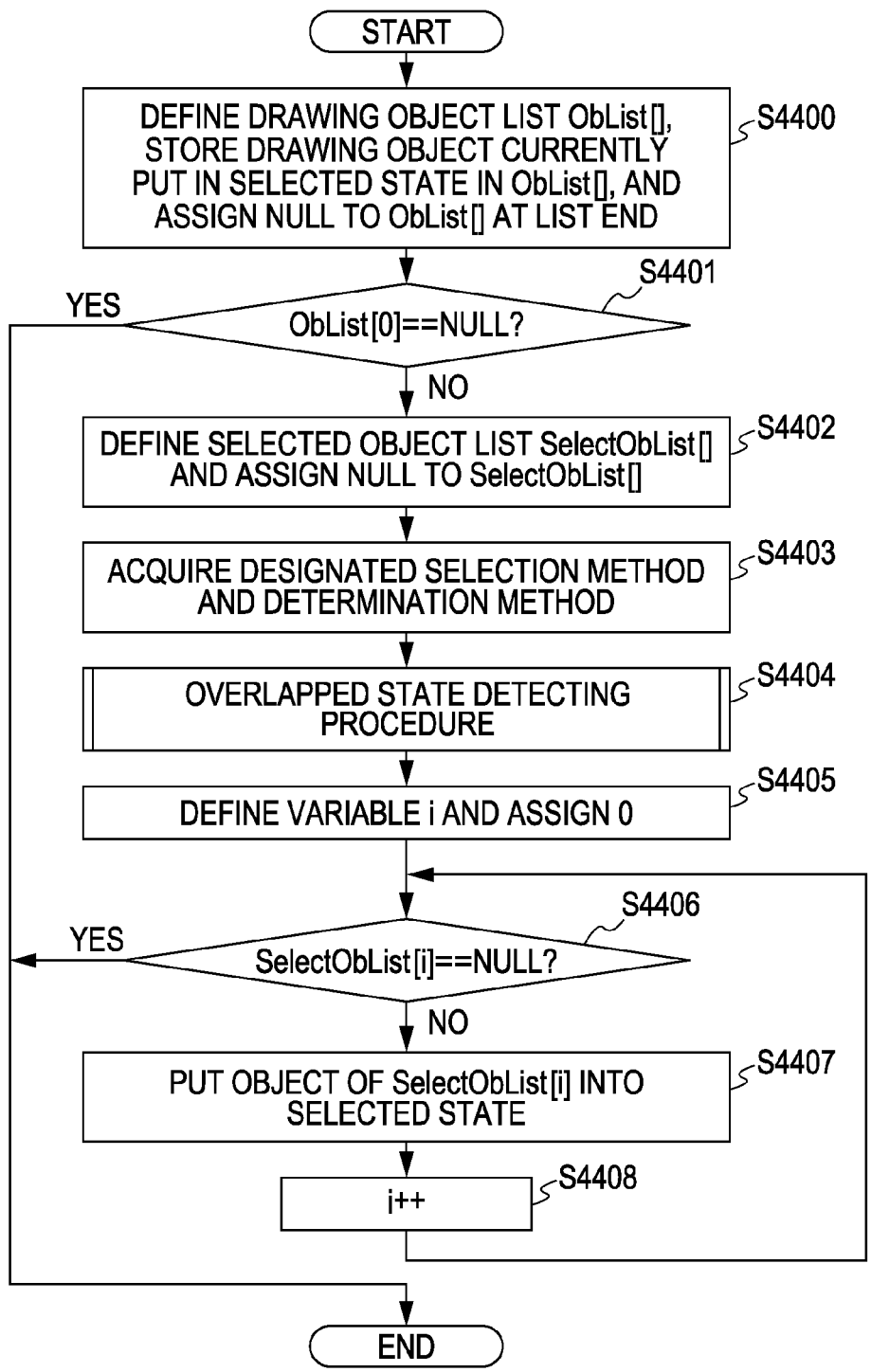
FIG. 47 is a flowchart showing overall processing in a third example of the present invention.

A third embodiment relates to a method for putting only the desired object into the selected state by employing the object selection method and the object determination method according to the present invention when the range selection or the like has been made by the user and objects have already been put into the selected state. FIG. 47 is a flowchart showing overall processing steps in this third embodiment. The processing steps will now be described one by one.

Figure 48A:
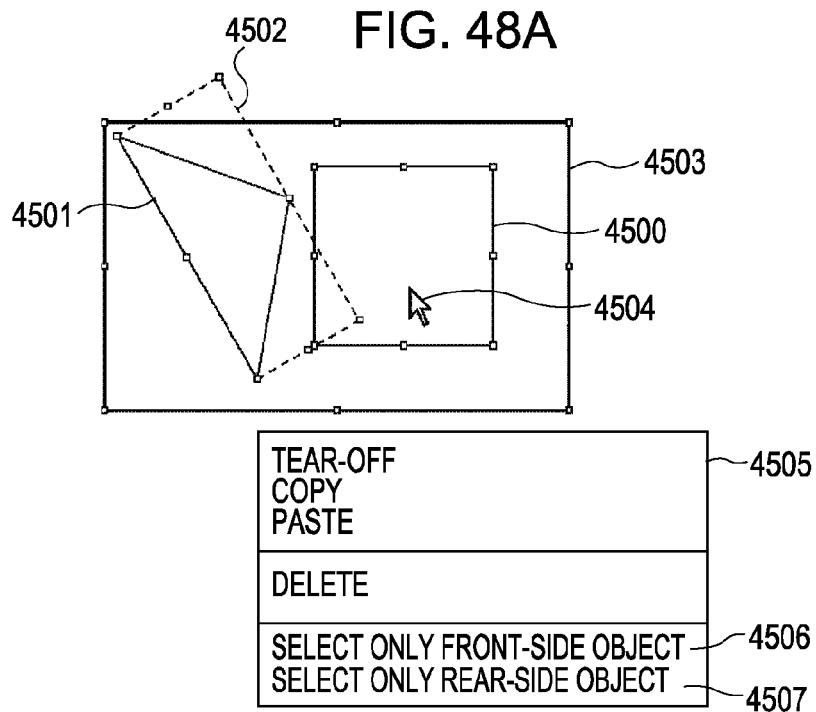
FIGS. 48A and 48B show respectively an example of a switching menu UI for designating switching of a selection method and an example of a menu UI for designating a determination method in the third embodiment of the present invention.
Figure 48B:
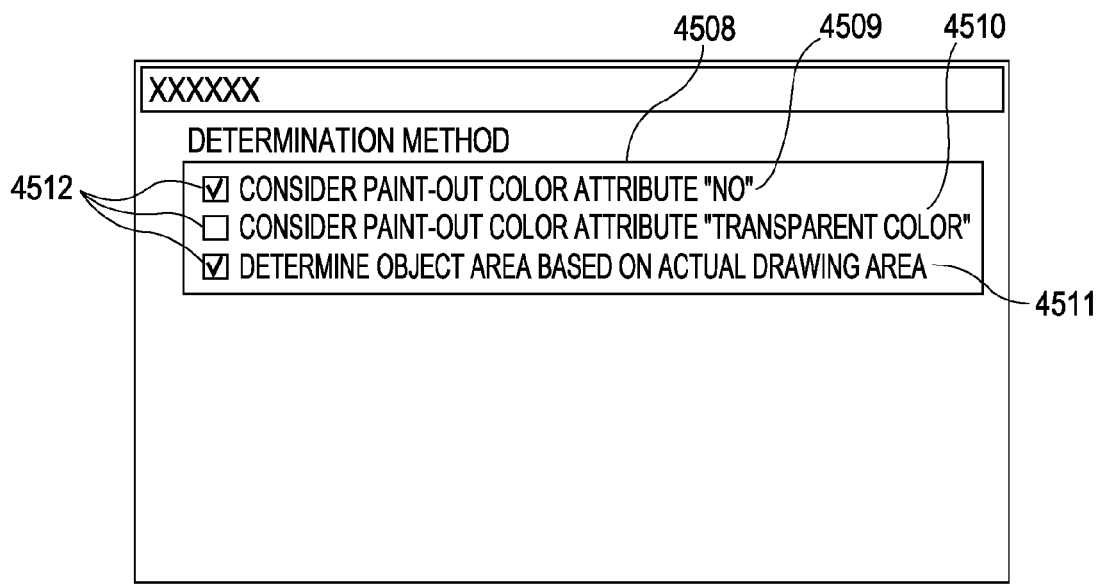

In step S4400, the bookbinding application 104 defines the drawing object list ObList[ ] and stores all objects currently put in the selected state in ObList[ ] in sequence. Also, the bookbinding application stores NULL in ObList[ ] at the list end after storing all the objects currently put in the selected state. In step S4401, the bookbinding application determines whether ObList[0]==NULL is satisfied. If ObList[0]==NULL is satisfied, this means that there is no object currently put in the selected state. Hence the object selecting process according to this embodiment is not executed. Therefore, the processing flow of FIG. 47 is brought to an end. If ObList[0]==NULL is not satisfied, the bookbinding application advances to step S4402. In S4402, the bookbinding application defines the selected object list SelectObList[ ] and assigns NULL to SelectObList[0]. In step S4403, the bookbinding application acquires the object selection method and the object determination method designated by the user. The kinds of the selection method and the determination method are as per described above with reference to FIG. 39. The user can designate the selection method and the determination method by using the dialog format described above in connection with the first embodiment. As an alternative, a menu format shown in FIGS. 48A and 48B may also be used because, in this third embodiment, the selection method and the determination method are designated when the objects have already been put in the selected state. In FIG. 48A, numerals 4500 and 4503 indicate rectangle objects. Numeral 4501 indicates a triangle object and also represents the actual drawing area of the triangle object. Numeral 4502 indicates the actual data area of the triangle object 4501. The objects 4500-4503 are ones currently put in the selected state. Numeral 4504 indicates a mouse pointer used for executing various operations by the user. Numeral 4505 indicates a menu list displayed by the bookbinding application 104. The menu list 4505 is displayed, for example, when a predetermined operation is executed. As one exemplary method, the menu list 4505 is displayed when the user clicks a right button of the mouse pointer 4504 when the objects are put in the selected state. A menu item 4506 represents a method of selecting only objects appearing on the front side (i.e., front-side objects), and a menu item 4507 represents a method of selecting only objects behind on the rear side (i.e., rear-side objects). The desired selection method can be instructed to the bookbinding application 104 by selecting one of the menu items 4506 and 4507 with the mouse pointer 4504. In addition, the determination method may be designated from a menu bar, indicated by 4508 in FIG. 48B, which is displayed by the bookbinding application.

After acquiring the selection method and the determination method designated by the user, the bookbinding application 104 advances to step S4404. In S4404, the bookbinding application executes the overlapped state detecting procedure described above with reference to FIGS. 38A-38D and 39. Then, in step S4405, the bookbinding application defines a variable i and assigns 0 to it. After initialization of the variable i, it advances to step S4406. In S4406, the bookbinding application determines whether the selected object list SelectObList[i]==NULL is satisfied. If SelectObList[i]==NULL is determined, this means that the process of putting the object into the selected state is completed. Accordingly, the overall processing flow of FIG. 47 is brought to an end. If SelectObList[i]≠NULL is determined, the bookbinding application advances to step S4407. In S4407, the bookbinding application puts the selected object of SelectObList[i] into the selected state.

After the process of putting the object into the selected state, the bookbinding application 104 advances to step S4408. In S4408, the bookbinding application increments the variable i. After the process of incrementing the variable i, the bookbinding application advances to step S4406. By repeating steps S4406-S4408, the bookbinding application executes the process of putting each object, which is qualified for the selection target, into the selected state. Thus, by executing the overall processing steps of FIG. 47, the bookbinding application can put only desired ones among the objects, which have been selected by the use with the range selection, into the selected state in accordance with the selection method and the determination method designated by the user.

The present invention includes the following. A software program for realizing the features of the above-described embodiments (i.e., a program corresponding to the flowcharts, shown in the figures, which represent the embodiments) is directly or remotely supplied to a system or an apparatus. Then, a computer incorporated in the system or the apparatus reads and executes the program code thus supplied, thereby achieving the features of the above-described embodiments.

Therefore, the program code installed in the computer to realize the functions and the processing required in the present invention with the computer also constitutes in itself an implement for practicing the present invention. In other words, the present invention includes the computer program itself used to realize the functions and the processing required in the present invention.

In that case, the program may have any of various forms, e.g., object code, a program executed by an interpreter, and script data supplied to the OS, so long as the program has the required functions.

Recording media for providing the program may be, e.g., a Floppy (registered trade name) disk, a hard disks, and an optical disk. Other examples of the recording media include a magneto-optical disk (MO), CD-ROM, CD-R, CD-RW, a magnetic tape, a nonvolatile memory card, ROM, DVD (DVD-ROM, DVD-R), etc.

Further, the above-mentioned program may be supplied through the steps of connecting a client computer to a homepage on the Internet by using a browser in the client computer, and downloading the computer program according to the present invention in itself or a file, which contains the computer program in compressed form and which has the automatic installing function, to a recording medium, e.g., a hard disk, from the connected homepage. As another method, program code constituting the program according to the present invention may be divided into a plurality of files, and those files may be downloaded from different homepages. In other words, the present invention includes a WWW server for downloading, to a plurality of users, a program file which realizes the functions and the processing required in the present invention with a computer.

Alternatively, the program may be supplied as follows. The program according to the present invention is encrypted and stored in a storage medium, e.g., CD-ROM, for distribution to users. The user who clears predetermined conditions is allowed to download key information necessary for decryption from a homepage. The user decrypts and executes the encrypted program by using the downloaded key information, thus installing the program in the computer.

The features of the above-described embodiments are realized with the computer executing the read program. Also, the features of the above-described embodiments can be realized in such a manner that, for example, an OS operating on the computer executes a part or the whole of actual processing in accordance with instructions from the read program.

In addition, the features of the above-described embodiments may be realized as follows. The program read from a recording medium is written in a function expansion board inserted in a computer or a memory incorporated in a function expansion unit connected to the computer. Then, a CPU or the like incorporated in the function expansion board or the function expansion unit executes a part or the whole of actual processing in accordance with instructions from the read program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

What is claimed is:

1. An information processing apparatus capable of executing editing on a plurality of drawing objects, the apparatus including:
   a memory;
   a processor coupled to the memory, the processor configured to control at least:
   a designating unit configured to designate a selection range;
   a determining unit configured to determine, for each of drawing objects included in the selection range designated by the designating unit, whether the drawing object is laid out on a rear side of one or more other drawing objects, based on an overlapped state of the drawing objects; and
   a deciding unit configured to decide whether the drawing object determined by the determining unit to be laid out on the rear side of the other objects is to be a selection target based on an actual drawing area for each of the drawing objects.

2. The information processing apparatus according to claim 1, wherein the actual drawing area is an area where an object is present.

3. The information processing apparatus according to claim 1, wherein in a case where an actual drawing area mode is selected, the deciding unit decides whether the drawing object determined by the determining unit to be laid out on the rear side of the other objects to be a selection target based on an actual drawing area for each of the drawing objects.

4. An information processing apparatus capable of executing editing on a plurality of drawing objects, the apparatus including:
   a memory;
   a processor coupled to the memory, the processor configured to control at least:
   a designating unit configured to designate a selection range;
   a determining unit configured to determine, for each of drawing objects included in the selection range designated by the designating unit, whether the drawing object is laid out on a rear side of one or more other drawing objects, based on an overlapped state of the drawing objects; and
   a deciding unit configured to decide whether the drawing object determined by the determining unit to be laid out on the rear side of the other objects is to be a selection target based on display attribute information of each of the drawing objects.

5. The information processing apparatus according to claim 4, wherein the deciding unit decides, for a first drawing object which is determined as being laid out on the rear side of the other drawing objects, that the first drawing object is the selection target when particular display attribute information is set for a second drawing object which is laid out on a front side of the first drawing object.

6. The information processing apparatus according to claim 5, wherein the particular display attribute information is given by paint-out setting that paint-out is not set or a paint-out color is set to be transparent for the second drawing object.

7. An information processing method for use in an information processing apparatus capable of executing editing on a plurality of drawing objects, the method including:
   a designating step of designating a selection range;
   a determining step of determining, for each of drawing objects included in the selection range designated by the designating step, whether the drawing object is laid out on a rear side of one or more other drawing objects, based on an overlapped state of the drawing objects; and
   a deciding step of deciding whether the drawing object determined by the determining step to be laid out on the rear side of the other objects is to be a selection target based on an actual drawing area for each of the drawing objects.

8. An information processing method for use in an information processing apparatus capable of executing editing on a plurality of drawing objects, the method including:
   a designating step of designating a selection range;
   a determining step of determining, for each of drawing objects included in the selection range designated by the designating step, whether the drawing object is laid out on a rear side of one or more other drawing objects, based on an overlapped state of the drawing objects; and
   a deciding step of deciding whether the drawing object determined by the determining step to be laid out on the rear side of the other objects is to be a selection target based on display attribute information of each of the drawing objects.

9. The information processing method according to claim 8, wherein in the deciding step decides, for a first drawing object which is determined as being laid out on the rear side of the other drawing objects, that the first drawing object is the selection target when particular display attribute information is set for a second drawing object which is laid out on a front side of the first drawing object.

10. The information processing method according to claim 9, wherein the particular display attribute information is given by paint-out setting that paint-out is not set or a paint-out color is set to be transparent for the second drawing object.

11. A computer-readable storage medium storing computer executable process steps, the computer executable process steps causing a computer to execute editing on a plurality of drawing objects, the executable computer process steps comprising:
    a designating step of designating a selection range;
    a determining step of determining, for each of drawing objects included in the selection range designated by the designating step, whether the drawing object is laid out on a rear side of one or more other drawing objects, based on an overlapped state of the drawing objects; and
    a deciding step of deciding whether the drawing object determined by the determining step to be laid out on the rear side of the other objects is to be a selection target based on an actual drawing area for each of the drawing objects.

12. A computer-readable storage medium storing computer executable process steps, the computer executable process steps causing a computer to execute editing on a plurality of drawing objects, the executable computer process steps comprising:
    a designating step of designating a selection range;
    a determining step of determining, for each of drawing objects included in the selection range designated by the designating step, whether the drawing object is laid out on a rear side of one or more other drawing objects, based on an overlapped state of the drawing objects; and a deciding step of deciding whether the drawing object determined by the determining step to be laid out on the rear side of the other objects is to be a selection target based on display attribute information of each of the drawing objects.

13. A computer-readable storage medium storing computer executable process steps according to claim 12, wherein in the deciding step decides, for a first drawing object which is determined as being laid out on the rear side of the other drawing objects, that the first drawing object is the selection target when particular display attribute information is set for a second drawing object which is laid out on a front side of the first drawing object.

14. A computer-readable storage medium storing computer executable process steps according to claim 13, wherein the particular display attribute information is given by paint-out setting that paint-out is not set or a paint-out color is set to be transparent for the second drawing object.

* * * * *